(12) United States Patent
Wang et al.

(10) Patent No.: US 11,005,888 B2
(45) Date of Patent: May 11, 2021

(54) ACCESS CONTROL POLICY SYNCHRONIZATION FOR SERVICE LAYER

(71) Applicant: CONVIDA WIRELESS, LLC, Wilmington, DE (US)

(72) Inventors: Chonggang Wang, Princeton, NJ (US); Hongkun Li, Malvern, PA (US); Xu Li, Plainsboro, NJ (US); Dale N. Seed, Allentown, PA (US); Quang Ly, North Wales, PA (US); Catalina Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/720,100

(22) Filed: Sep. 29, 2017

(65) Prior Publication Data

US 2018/0288098 A1 Oct. 4, 2018

Related U.S. Application Data

(60) Provisional application No. 62/401,623, filed on Sep. 29, 2016.

(51) Int. Cl.
| | | |
|---|---|---|
| *H04L 29/00* | (2006.01) | |
| *H04L 29/06* | (2006.01) | |
| *G06F 16/27* | (2019.01) | |
| *G06F 16/901* | (2019.01) | |
| *H04W 4/70* | (2018.01) | |

(52) U.S. Cl.
CPC .............. *H04L 63/20* (2013.01); *G06F 16/27* (2019.01); *G06F 16/9024* (2019.01); *H04L 63/102* (2013.01); *H04W 4/70* (2018.02)

(58) Field of Classification Search
CPC ........ H04L 63/20; G06F 16/27; G06F 16/9024
USPC .............................................................. 726/1
See application file for complete search history.

(56) References Cited

U.S. PATENT DOCUMENTS

| | | | |
|---|---|---|---|
| 8,407,242 B2* | 3/2013 | Jackson | G06F 16/2477 707/769 |
| 2011/0035650 A1 | 2/2011 | Jardine-Skinner et al. | |
| 2012/0158771 A1 | 6/2012 | Jackson et al. | |
| 2015/0172320 A1* | 6/2015 | Colombo | H04L 63/20 726/1 |
| 2016/0191295 A1 | 6/2016 | Dong et al. | |

(Continued)

FOREIGN PATENT DOCUMENTS

| | | |
|---|---|---|
| CN | 102955915 A | 3/2013 |
| CN | 102972003 A | 3/2013 |
| CN | 104735055 A | 6/2015 |

(Continued)

OTHER PUBLICATIONS

SPARQL 1.1 Update, W3C Recommendation, http://www.w3.org/TR/sparql11-update, Mar. 21, 2013, 26 pages.

(Continued)

*Primary Examiner* — Morshed Mehedi
*Assistant Examiner* — Michael D Anderson
(74) *Attorney, Agent, or Firm* — BakerHostetler

(57) ABSTRACT

Methods, systems, and apparatus in a service layer environment may create, update, or delete access control policy triples whenever an access control policy (ACP) resource is created, updated, or deleted. In addition, methods address potentially frequent and unnecessary ACP triple management.

20 Claims, 39 Drawing Sheets

(56) References Cited

U.S. PATENT DOCUMENTS

2017/0011092 A1* 1/2017 Huddleston ......... G06F 16/2455

FOREIGN PATENT DOCUMENTS

| CN | 105101059 A | 11/2015 | | |
|---|---|---|---|---|
| KR | 10-2008-0071213 A | 8/2008 | | |
| WO | 2006/078430 A2 | 7/2006 | | |
| WO | WO-2017123712 A1 * | 7/2017 | .............. | H04W 4/70 |

OTHER PUBLICATIONS

SPARQL 1.1 Query Language, W3C Recommendation, http://www.w3.org/TR/2013/REC-sparql11-query-20130321, Mar. 21, 2013, 89 pages.

SPARQL 1.1 Overview, W3C Recommendation, http://www.w3.org/TR/sparql11-overview, Mar. 21, 2013, 6 pages.

Secretary et al., "Aubergine-v-2014-08", TP-2014-0477R02-AUBERGINE-V-2014-08.ZIP, ONEM2M, vol. Technical Plenary, TP, Aug. 4, 2014, pp. 1-297.

RIF Overview, W3C Working Group Note, http://www.w3.org/TR/rif-overview, Feb. 5, 2013, 9 pages.

RDF Schema 1.1, W3C Recommendation, http://www.w3.org/TR/rdf-schema, Feb. 25, 2014, 15 pages.

RDF 1.1 Concepts and Abstract Syntax, W3C Recommendation, http://www.w3.org/TR/2014/REC-rdf11-concepts-20140225, Feb. 25, 2014, 23 pages.

OWL 2 Web Ontology Language Document Overview, W3C Recommendation, http://www.w3.org/TR/owl-overview, Dec. 11, 2012, 11 pages.

OneM2M Technical Specification, oneM2M-TS-0001-V2.10.0, Functional Architecture, Aug. 30, 2016, 427 pages.

OneM2M Technical Report, oneM2M-TR-0007-V2.11.1, Study of Abstraction and Semantics Enablements, Aug. 30, 2016, 182 pages.

Interdigital et al., "Ontology-based ACP for Semantic Queries", MAS-2006-0171R01-ACP_For_Semantics_R2.Doc, ONEM2M, vol. WG5—Management, Abstraction and Semantics, MAS, Jul. 19, 2016, pp. 1-9.

Hongkun, "Enabling Semantics in an M2M/lot Service Delivery Platform", 2016 IEEE Tenth International Conference on Semantic Computing (ICSC), IEEE, Feb. 4, 2006, pp. 206-213.

Description of W3C Technology Stack Illustration, http://www.w3.org/Consortium/techstack-desc.html, Oct. 16, 2018, 1 page.

Alaya et al., "Toward Semantic Interoperability in oneM2M Architecture", IEEE Communications Magazine, Dec. 2015, pp. 35-41.

* cited by examiner

Access Control Ontology

@prefix rdf:    <http://www.w3.org/1999/02/22-rdf-syntax-ns#> .
@prefix rdf:    <http://www.w3.org/2000/01/rdf-schema#> .
@prefix xsd:    <http://www.w3.org/2001/XMLSchema#> .
@prefix acp:    <http://acessControlPolicy.org/> .
@prefix ex:     <http://example.org/> .
@prefix m2m:    <http://oneM2M.org/> .

acp:acessControlPolicy rdf:type rdfs:Class .
acp:accessCpmtrolRule rdf:type rdfs:Class .

acp:hasACRule         rdf:Property ;
                      acp:accessControlPolicy ;
                      acp:accessControlRule .

acp:hasACOriginator   rdf:Property ;
                      acp:accessControlRule ;
                      m2m:AE_ID, m2m:CSE_ID, xsd:anyURI .

acp:hasACContexts     rdf:Property ;
                      acp:accessControlRule ;
                      m2m:ipv4, m2m:ipv6, m2m:countryCode, rdfs:Literal .

acp:hasACOperations   rdf:Property ;
                      acp:accessControlRule ;
                      m2m:accessControlOperations, rdfs:Literal .

acp:AppliedTo         rdf:Property ;
                      acp:accessControlPolicy ;
                      xsd:anyURI, rdfs:Literal, m2m:ID, ex:resourceGroup .

FIG. 17

| | | |
|---|---|---|
| Line #1 | @PREFIX | acp: <http://accessControlPolicy.org>. |
| Line #2 | acp:acp1 | rdf:type acp:accessControlPolicy . |
| Line #3 | acp:acp1 | acp:hasACPRule acp:acr11 . |
| Line #4 | acp:acr11 | rdf:type acp:accessControlRule . |
| Line #5 | acp:acr11 | acp:hasACOriginator "AE-ID-1". |
| Line #6 | acp:acr11 | acp:hasACOperations "DISCOVERY". |

FIG. 25

```
Line #1    @PREFIX   sd:                     <http://semanticDescriptor.org>.

Line #2    sd:sd1                rdf:type              sd:semanticDescriptor .
Line #3    sd:tripleInstance11   rdf:type              sd:sdOriginalTriple .
Line #4    sd:tripleInstance11   sd:describedIn        sd:sd1 .
Line #5    sd:tripleInstance11   sd:hasSubject         sd:S1 .
Line #6    sd:tripleInstance11   sd:hasProperty        sd:P1 .
Line #7    sd:tripleInstance11   sd:hasObject          sd:O1 .
```

FIG. 30

```
Line #1    @PREFIX   acp:    <http://accessControlPolicy.org>.
Line #2    @PREFIX   sd:     <http://semanticDescriptor.org>.

Line #3    acp:acp1    rdf:type       acp:accessControlPolicy .
Line #4    sd:sd1      rdf:type       sd:semanticDescriptor .
Line #5    acp:acp1    acp:appliedTo  sd:sd1 .
```

FIG. 31

ACCESS CONTROL POLICY SYNCHRONIZATION FOR SERVICE LAYER

CROSS-REFERENCE TO RELATED APPLICATIONS

This application claims the benefit of U.S. Provisional Patent Application No. 62/401,623, filed on Sep. 29, 2016, entitled "Access Control Policy Synchronization for Service Layer," the contents of which are hereby incorporated by reference herein.

BACKGROUND

Semantic Web

The Semantic Web is an extension of the Web through standards by the World Wide Web Consortium (W3C). The standards promote common data formats and exchange protocols on the Web, most fundamentally the Resource Description Framework (RDF).

The Semantic Web involves publishing in languages specifically designed for data: Resource Description Framework (RDF), Web Ontology Language (OWL), and Extensible Markup Language (XML). These technologies are combined to provide descriptions that supplement or replace the content of Web documents via web of linked data. Thus, content may manifest itself as descriptive data stored in Web-accessible databases, or as markup within documents, particularly, in Extensible HTML (XHTML) interspersed with XML, or, more often, purely in XML, with layout or rendering cues stored separately.

Semantic Web Stack

The Semantic Web Stack illustrates the architecture of the Semantic Web specified by W3C, as shown in FIG. 1. The functions and relationships of the components, as shown in FIG. 1, are discussed below. XML provides an elemental syntax for content structure within documents, yet associates no semantics with the meaning of the content contained within. XML is not at present a necessary component of Semantic Web technologies in most cases, as alternative syntaxes exist, such as Turtle. Turtle is the de facto standard but has not been through a formal standardization process. XML Schema is a language for providing and restricting the structure and content of elements contained within XML documents. RDF is a simple language for expressing data models, which refers to objects ("web resources") and their relationships in the form of subject-predicate-object, e.g., S-P-O triple or RDF triple. An RDF-based model can be represented in a variety of syntaxes, e.g., RDF/XML, N3, Turtle, and RDFa. RDF is a fundamental standard of the Semantic Web.

RDF Graph is a directed graph where the edges represent the "predicate" of RDF triples while the graph nodes represent "subject" and/or "object" of RDF triples. In other words, the linking structure as described in RDF triples forms a directed RDF Graph. RDF Schema (e.g., RDF Schema 1.1.) extends RDF and is a vocabulary for describing properties and classes of RDF-based resources, with semantics for generalized-hierarchies of such properties and classes. OWL adds more vocabulary for describing properties and classes: among others, relations between classes (e.g. disjointness), cardinality (e.g. "exactly one"), equality, richer type of properties, characteristics of properties (e.g. symmetry), and enumerated classes.

SPARQL (e.g., SPARQL 1.1) is a protocol and query language for semantic web data sources, to query and manipulate RDF graph content (e.g., RDF triples) on the Web or in an RDF store (e.g., a Semantic Graph Store). SPARQL 1.1 Query (a query language for RDF graph) can be used to express queries across diverse data sources, whether the data is stored natively as RDF or viewed as RDF via middleware. SPARQL contains capabilities for querying required and optional graph patterns along with their conjunctions and disjunctions. SPARQL also supports aggregation, subqueries, negation, creating values by expressions, extensible value testing, and constraining queries by source RDF graph. The results of SPARQL queries can be result sets or RDF graphs. SPARQL 1.1 Update is an update language for RDF graphs. It uses a syntax derived from the SPARQL Query Language for RDF. Update operations are performed on a collection of graphs in a Semantic Graph Store. Operations are provided to update, create, and remove RDF graphs in a Semantic Graph Store. RIF is the W3C Rule Interchange Format. It's an XML language for expressing Web rules that computers can execute. RIF provides multiple versions, called dialects. It includes a RIF Basic Logic Dialect (RIF-BLD) and RIF Production Rules Dialect (RIF PRD).

Semantic Search and Semantic Query

Relational Databases contain relationships between data in an implicit manner. For example the relationships between customers and products (stored in two content-tables and connected with an additional link-table) only come into existence in a query statement (e.g., SQL is used in the case of relational databases) written by a developer. Writing the query demands the exact knowledge of the database schema. Many relational databases are modeled as in a hierarchical database in which the data is organized into a tree-like structure. The data is stored as records which are connected to one another through links. A record in the hierarchical database model corresponds to a row (or tuple) in the relational database model and an entity type corresponds to a table (or relation—parent & child). A search or query of a record may be conducted by SQL or non-SQL search engines.

As shown in FIG. 2, a hierarchical database model mandates that each child record has only one parent, whereas each parent record can have one or more child records. In order to retrieve data from a hierarchical database the whole tree needs to be traversed starting from the root node. This structure is simple but inflexible because the relationship is confined to a one-to-many relationship.

Linked-Data contain all relationships between data in an explicit manner. In the above mentioned example described for relational database, no query code needs to be written. The correct product for each customer can be fetched automatically. Whereas this simple example is trivial, the real power of linked-data comes into play when a network of information is created (customers with their geo-spatial information like city, state and country; products with their categories within sub- and super-categories). Now the system can automatically answer more complex queries and analytics that look for the connection of a particular location with a product category. The development effort for this query is omitted. Executing a semantic query is conducted by walking the network of information and finding matches (also called data graph traversal).

Semantic Search seeks to improve search accuracy by understanding searcher intent and the contextual meaning of terms as they appear in the searchable dataspace, whether on the Web or within a closed system, to generate more relevant results. Semantic search systems consider various points including context of search, location, intent, variation of words, synonyms, generalized and specialized queries, concept matching, and natural language queries to provide relevant search results. Major web search engines like Google and Bing incorporate some elements of Semantic Search. Semantic Search uses semantics to produce highly relevant search results. In most cases, the goal is to deliver the information queried by a user rather than have a user sort through a list of loosely related keyword results. For example, semantics may be used to enhance a record search or query in a hierarchical relational database.

Semantic query allows for queries and analytics of associative and contextual nature. Semantic queries enable the retrieval of both explicitly and implicitly derived information based on syntactic, semantic and structural information contained in data. They are designed to deliver precise results (possibly the distinctive selection of one single piece of information) or to answer more wide open questions through pattern matching and digital reasoning.

Semantic queries work on named graphs, linked-data, or triples. This enables the query to process the actual relationships between information and infer the answers from the network of data. This is in contrast to semantic search, which uses semantics in unstructured text to produce a better search result (e.g., natural language processing).

From a technical point of view semantic queries are precise relational-type operations much like a database query. They work on structured data and therefore have the possibility to utilize comprehensive features like operators (e.g. >, <, and =), namespaces, pattern matching, subclassing, transitive relations, semantic rules, and contextual full text search. The semantic web technology stack of W3C offers SPARQL to formulate semantic queries in syntax similar to SQL. Semantic queries are used in triple stores, graph databases, semantic wikis, natural language, and artificial intelligence systems.

Another aspect of semantic queries is that the type of the relationship can be used to incorporate intelligence into the system. The relationship between a customer and a product has a fundamentally different nature than the relationship between a neighborhood and its city. The latter enables the semantic query engine to infer that a customer living in Manhattan is also living in New York City whereas other relationships might have more complicated patterns and "contextual analytics." This process is called inference or reasoning and is the ability of the software to derive new information based on given facts.

oneM2M Functional Architecture

The oneM2M standard (neM2M-TS-0001 oneM2M Functional Architecture—V2.9.0) under development defines a Service Layer called common service entity (CSE). The purpose of the service layer is to provide "horizontal" services that can be utilized by different "vertical" M2M systems and applications. The CSE supports the reference points as shown in FIG. 3. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). An NSE provides underlying network services to the CSEs, such as device management, location services, and device triggering.

CSE contains multiple logical functions called common service functions (CSFs), such as "Discovery" and "Data Management & Repository." FIG. 4 illustrates some of the CSFs defined by oneM2M.

The oneM2M architecture enables the types of nodes as shown in FIG. 3. An applications service node (ASN) is a Node that contains one CSE and contains at least one application entity (AE). An ASN may reside in an M2M end device. An application dedicated node (AND) is a node that contains at least one AE and does not contain a CSE. There may be zero or more ADNs in the Field Domain of the oneM2M System. Example of physical mapping: an Application Dedicated Node could reside in a constrained M2M Device. A middle node (MN) is a Node that contains one CSE and contains zero or more AEs. There may be zero or more MNs in the Field Domain of the oneM2M System. A MN may reside in an M2M Gateway. A infrastructure node (IN) is a node that contains one CSE and contains zero or more AEs. There is exactly one IN in the Infrastructure domain per oneM2M Service Provider. A CSE in an IN may contain CSE functions not applicable to other node types. Example of physical mapping: an IN could reside in an M2M Service Infrastructure. A non-oneM2M node (NoDN) is a node that does not contain oneM2M Entities (neither AEs nor CSEs). Such nodes represent devices attached to the oneM2M system for interworking purposes, including management.

Access Control Policy in oneM2M

As shown in FIG. 5, the <accessControlPolicy> resource is comprised of privileges and selfPrivileges attributes which represent a set of access control rules defining which entities (defined by accessControlOriginators) have the privilege to perform certain operations (defined by accessContolOperations) within specified contexts (defined by accessControlContexts) and are used by CSEs to make Access Decision for specific resources. For a particular privileges attribute, an access control rule defines which AE/CSE is allowed for which operation. So for sets of access control rules is permitted if it is permitted by one or more access control rules in the set. For a resource that is not of <accessControlPolicy> resource type, the common attribute accessControlPolicyIDs for such resources contains a list of identifiers which link that resource to <accessControlPolicy> resources. The CSE Access Decision for such a resource shall follow the evaluation of the set of access control rules expressed by the privileges attributes defined in the <accessControlPolicy> resources. The selfPrivileges attribute represents the set of access control rules for the <accessControlPolicy> resource itself. The CSE access decision for <accessControlPolicy> resource shall follow the evaluation of the set of access control rules expressed by the selfPrivileges attributes defined in the <accessControlPolicy> resource itself.

The <accessControlPolicy> resource contains the attributes specified in Table 1. The set of Access Control Rules represented in privileges and selfPrivileges attributes are comprised of 3-tuples described in more detail below: accessControlOriginators, accessControlContexts, and accessControlOperations.

TABLE 1

Attributes of <accessControlPolicy> Resource

| Attributes of <accessControlPolicy> | Multiplicity | RW/RO/WO | Description | <accessControlPolicyAnnc> Attributes |
|---|---|---|---|---|
| privileges | 1 | RW | A set of access control rules that applies to resources referencing this <accessControlPolicy> resource using the accessControlPolicyIDs attribute. | MA |
| selfPrivileges | 1 | RW | A set of access control rules that apply to the <accessControlPolicy> resource itself. | MA |

The accessControlOriginators is a mandatory parameter in an access-control-rule-tuple. It represents the set of Originators that shall be allowed to use this access control rule. The set of Originators is described as a list of parameters, where the types of the parameter can vary within the list. Table 2 describes the supported types of parameters in accessControlOriginators.

TABLE 2

Types of Parameters in accessControlOriginators

| Name | Description |
|---|---|
| domain | A SP domain or SP sub-domain |
| originatorID | CSE-ID, AE-ID or the resource-ID of a <group> resource that contains the AE or CSE that represents the Originator. |
| all | Any Originators are allowed to access the resource within the accessControlOriginators constraints |

When the originatorID is the resource-ID of a <group> resource which contains <AE> or <remoteCSE> as members, the Hosting CSE of the resource shall check if the originator of the request matches one of the members in the memberIDs attribute of the <group> resource (e.g. by retrieving the <group> resource). If the <group> resource cannot be retrieved or doesn't exist, the request shall be rejected.

The accessControlContexts is an optional parameter in an access-control-rule-tuple that contains a list, where each element of the list, when present, represents a context that is permitted to use this access control rule. Each request context is described by a set of parameters, where the types of the parameters can vary within the set. Table 3 describes the supported types of parameters in accessControlContexts.

The following Originator accessControlContexts shall be considered for access control policy check by the CSE.

TABLE 3

Types of Parameters in accessControlContexts

| Name | Description |
|---|---|
| accessControlTimeWindow | Represents a time window constraint which is compared against the time that the the request is received at the Hosting CSE. |
| accessControlLocationRegion | Represents a location region constraint which is compared against the location of the Originator of the request. |
| accessControlIpIPAddress | Represents an IP address constraint or IP address block constraint which is compared against the IP address of the Originator of the request. |

The accessControlOperations is a mandatory parameter in an access-control-rule-tuple that represents the set of operations that are authorized using this access control rule. Table 4 describes the supported set of operations that are authorized by accessControlOperations.

The following accessControlOperations shall be considered for access control policy check by the CSE.

TABLE 4

Types of parameters in accessControlOperations

| Name | Description |
|---|---|
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

The accessControlPolicyIDs is a common attribute of many oneM2M resources as defined in oneM2M-TS-0001 oneM2M Functional Architecture—V2.9.0. This attribute contains a list of identifiers of an <accessControlPolicy> resource. The privileges attribute defined in the <accessControlPolicy> resource that are referenced determines who is allowed to access the resource containing this attribute for a specific purpose (e.g. Retrieve, Update, Delete, etc.).

If a resource type does not have an accessControlPolicyIDs attribute definition, then the accessControlPolicyIDs for that resource is governed in a different way, for example, the accessControlPolicyIDs associated with the parent may apply to a child resource that does not have an accessControlPolicyIDs attribute definition, or the privileges for access are fixed by the system. Refer to the corresponding resource type definitions and procedures to see how access control is handled in such cases.

If a resource type does have an accessControlPolicyIDs attribute definition, but the (optional) accessControlPolicyIDs attribute is not set, or it is set to a value that does not correspond to a valid, existing <accessControlPolicy> resource, or it refers to an <accessControlPolicy> resource that is not reachable (e.g. because it is located on a remote CSE that is offline or not reachable), then the system default access privileges shall apply.

All resources are accessible if and only if the privileges (i.e. stored as privileges or selfPrivileges attribute of <accessControlPolicy> resource) allow it, therefore all resources shall have an associated AccessControlPolicyIDs attribute, either explicitly (setting the attribute in the resource itself) or implicitly (either by using the parent privileges or the system default policies). Which means that the system shall provide a default access privileges in case that the Originator does not provide a specific accessControlPolicyIDs during the creation of the resource.

Semantic Enablement in oneM2M

The <semanticDescriptor> resource as shown in FIG. 6 is used to store a semantic description pertaining to a resource and potentially sub-resources. Such a description may be provided according to ontologies. The semantic information is used by the semantic functionalities of the oneM2M system and is also available to applications or CSEs. The <semanticDescriptor> resource shall contain the attributes specified in Table 5.

semantic filtering, an additional value for the request operation filter criteria has been proposed in neM2M TR-0007-Study_on_Abstraction_and_Semantics_Enablement-V2.11.0 section 8.5.4, with the definition shown in the table below. Multiple instances may be used, which according to the general rules for evaluating filter criteria, means that an "OR" semantics applies, i.e. the overall result for the semantics filter criteria is true if one or more of the semantic filters matches the semantic description. Note that semantics in the table below is defined in neM2M TR-0007-Study_on_Abstraction_and_Semantics_Enablement-V2.11.0 and it corresponds to request parameter semanticFilter in oneM2M-TS-0001 oneM2M Functional Architecture—V2.9.0. When the SPAQRL query contained in the semanticFilter parameter matches semantic triples in one of child resource <semanticDescriptor>s of a parent resource, it means this semantic filtering is successful and corresponding parent resource will be returned.

TABLE 6 semantics Filter Criteria

| | | |
|---|---|---|
| semantics | 0 . . . n | The semantic description contained in one of the <semanticDescriptor> child resources matches the specified semantic filter. |

TABLE 5

Attributes of <semanticDescriptor> Resource

| Attributes of <semanticDescriptor> | Multiplicity | RW/ RO/ WO | Description |
|---|---|---|---|
| descriptorRepresentation | 1 | RW | Indicates the type used for the serialization of the descriptor attribute, e.g. RDF serialized in XML. |
| semanticOpExec | 0 . . . 1 | RW | This attribute cannot be retrieved. Contains a SPARQL query request for execution of semantic operations on the descriptor attribute e.g. SPARQL update as described in oneM2M TS-0004. |
| descriptor | 1 | RW | Stores a semantic description pertaining to a resource and potentially sub-resources. Such a description shall be according to subject-predicate-object triples as defined in the RDF graph-based data model (see W3C RDF 1.1). The semantic description can be fully and partially updated by an Originator. The elements of such triples may be provided according to ontologies. Examples of such descriptors in RDF can be found in oneM2M TR-0007. |
| ontologyRef | 0 . . . 1 | WO | A reference (URI) of the ontology used to represent the information that is stored in the descriptor attribute. If this attribute is not present, the ontologyRef from the parent resource is used if present. |
| relatedSemantics | 0 . . . 1(L) | WO | List of URIs for resources containing related semantic information to be used in processing semantic queries. The URI(s) may reference either a <group> resource or other <semanticDescriptor> resources. |

Semantic Filtering Proposals in oneM2M—Generic filtering is supported by having filter criteria specified in a request operation (oneM2M-TS-0001 oneM2M Functional Architecture—V2.9.0 section 8.1.2). In order to provide for The proposal above uses the following assumptions: the semantic descriptions are specified as RDF triples (representation, e.g. RDF/XML, Turtle, description format had not been fully specified in oneM2M yet); the semantics filter criteria will be used for SPARQL requests to be executed on semantic descriptions.

Below is a semantic filtering example giving in oneM2M TR-0007.

Example 1: Filter for AE Resources Representing Devices that Measure Temperature Semantic Descriptor of Device 1 AE

| my:MyDevice1 | rdf:type | base:Device |
| my:MyDevice 1 | base:hasService | my:MyService1 |
| my:MyService1 | base:hasFunctionality | my:MyFunctionality 1 |
| my:MyFunctionality 1 | rdf:type | base:Measuring |
| my:MyFunctionality 1 | base:refersTo | my:MyAspect1 |
| my:myAspect1 | rdf:type | aspect:Temperature |

Semantic Descriptor of Device 2 AE

| my:MyDevice2 | rdf:type | base:Device |
| my:MyDevice2 | base:hasService | my:MyService2 |
| my:MyService2 | base:hasFunctionality | my:myFunctionality2 |
| my:myFunctionality2 | rdf:type | base:Controlling |
| my:myFunctionality2 | base:refersTo | my:myAspect2 |
| my:myAspect2 | rdf:type | aspect:Temperature |

SPARQL Request 1

```
SELECT ?device
    WHERE { ?device rdf:type base:Device .
        ?device base:hasService ?service .
        ?service base:hasFunctionality ?functionality .
        ?functionality rdf:type base:Measuring .
        ?functionality base:refersTo ?aspect .
        ?aspect rdf:type instance:Temperature }
```

SPARQL Execution Results
(On Device1 semantic description)→my:myDevice1
(On Device 2 semantic description)→empty This means that the AE resource that is described by my:myDevice1 will be included in the result set, whereas the AE resource described by my:myDevice2 will not be included.

In some cases the relevant semantic information for a single search may be distributed among different <semanticDescriptor> resources. The example provided in FIG. 7 illustrates this case. The box represents the scope of a semantic filter, i.e., this is the information required for evaluating it. The semantic graph representing subject-predicate-object relations is shown, with different parts of this graph (represented by ovals) being stored in different <semanticDescriptor> resources. Semantic filtering needs to be applied to (parts of) the complete semantic graph, which raises the problem that several different parts of the graph have to be put together for the execution of the semantic operation.

This problem is not generally apparent in the realm of the Semantic Web, since the URI identifying class instances can be directly de-referenced so the concept (i.e. class, relationship) information can be found based on its URI. In the oneM2M case, only resources that can be accessed and semantics are stored as resource content.

Currently SPARQL 1.1, supports federated queries using the SERVICE keyword, where the URL of a remote SPARQL endpoint can be specified. For this approach, a requestor would a-priori know which semantic descriptors contain the semantic instances required for the search, making this approach not generally applicable when the semantic descriptors are distributed in resource trees.

A solution for enabling semantic filtering on semantic descriptions stored across <semanticDescriptor> resources presented in introduces an annotation link in the form of a resourceDescriptorLink OWL annotation property. This annotation property can be specified for any class instance and its value is the URL of a <semanticDescriptor> resource, where additional RDF triples for the given class instance can be found. The following example uses the classes and relationships defined in the oneM2M Base Ontology (FIG. 8) in order to create the graphs in FIG. 9.

This solution entails the following functional flow for the SPARQL-based semantic filtering engine at the receiver: 1) The semantic filter formulated as a SPARQL request is executed on the content of the semantic descriptor resource of the candidate resource; 2) If in the course of the execution a class instance with one or more resourceDescriptorLink annotations is encountered, the execution is halted; 3) The content of each of the <semanticDescriptor> resources the semanticDescriptorLink references is added to the content on which the SPARQL request is being executed (lazy evaluation, alternative: fetch everything before execution, but may result in fetching unnecessary information); 4) The execution of the SPARQL request is continued on the enlarged content; and 5) Access Control for Data Resources and Semantic Triples—Hierarchically Layered Access control for semantic information provided as semantic triples is discussed in this section. The content in this section is supported in current oneM2M TR-0007. While the current oneM2M architectural view is exclusively based on resources, these can be implemented in different ways. Especially for managing semantic triples, triple stores are the straightforward choice. This has implications for how the access control to resources and triples is handled. In this section different implementation options are discussed assuming a hierarchical structuring divided between a semantic layer and a data layer.

As shown in FIG. 10 and FIG. 11, data resources and semantic triples may be integrated in a hierarchically layered architecture with a Data Layer containing the data resources and related functions and a Semantic Layer containing semantic triples and related semantic functions.

The upper layer, i.e. the Data Layer in FIG. 10 and the Semantic Layer in FIG. 11, controls and manages the Access Control Policies (ACPs). The lower layer, i.e. the Semantic Layer in FIG. 10 and the Data Layer in FIG. 11, supports the upper layer with semantic graphs or raw data respectively. The layers may reside on different CSEs, but integration on the same CSE may be more performance efficient.

FIG. 10 shows a conventional data resource driven scheme for M2M scenarios. Resource Discovery through the data resource tree may be supported by the semantic leaves (e.g., distributed graph stores) in the Semantic Layer. The ACPs are maintained under <semanticDescriptor> resources in the Data Layer.

FIG. 11 shows a conventional semantics driven scheme for Semantic Web scenarios. Semantic Query may be conducted in the Semantic Layer with the return of the URI or URL of the data resources in the Data Layer. Semantic Resource Discovery may also be realized with the return of the data resources in the Data Layer via proper mapping between these two layers. The triples in the Semantic Layer are associated with their specific ACPs. A data resource in the Data Layer is addressed by a triple (e.g. via its URI or URL) associated with an ACP.

Access Control for Data Resources and Semantic Triples—Parallel

Looking beyond the currently supported semantic functionality, a more advanced architecture may be needed. In the following the concepts of Data Entity and Semantic Entity are introduced that may be used in different configurations, supporting more advanced semantic functionality like semantic mash-up and the possible interaction with other semantic platforms like the semantic web.

FIG. 12 shows an exemplary scheme for intelligent IoT scenarios, which has more advanced data and semantics features or functions. As illustrated in FIG. 12, a parallel architecture may have a Data Entity and a Semantic Entity. A Data Entity or a Semantic Entity may each have its own Access Control Policies (ACPs) for managing the access control within its scope. The semantic triples or data resources in the Data Entity may be exposed to the Semantic Entity with specific ACPs associated. For example, a Semantic Publication function in the Data Entity may expose semantic triples to the Central Graph Store in the Semantic Entity with the corresponding ACPs associated with the triples. Or, for example, a Data Annotation function in the Data Entity may expose data and associated ACPs to the Central Graph Store via the local temporary or caching Relational Data Base Management System (RDBMS) and Semantic Reasoning and Mapping functions in the Semantic Entity.

The data resources or semantic triples in the Semantic Entity may also be exposed to the Data Entity with specific ACPs associated. For example, a Semantic Mash-up function in the Semantic Entity may expose new data resources and related ACPs from the semantic mash-up to the Data Entity. Or, for example, a Semantic Annotation function in the Semantic Entity may expose semantic triples and related ACPs to the <semanticDescriptor> resources in the Data Entity.

FIG. 12 shows that a Data Entity and a Semantic Entity may reside on different CSEs. But a Data Entity and a Semantic Entity may also reside on the same CSE. FIG. 13 shows a logical resource tree with both a Data Entity and a Semantic Entity.

Indirect Access Control Via Resource Tree for Centralized Graph Store

Another approach is actually semantic filtering based on graph store. In this approach, the access control will be first enforced over oneM2M resource tree to find all allowed <semanticDescriptor> resources; this step will introduce lots of overhead since all <semanticDescriptor> resources will be searched against access control policies. Then, the allowed <semanticDescriptor> will be added into SPARQL's query pattern. After that, the new SPARQL will be executed over the semantic graph store. Some assumptions are considered in this solution: 1) There is a centralized graph store to store the triples in all <semanticDescriptor>s; and 2) based on the query request with a target URL or URI in the resource tree, the scope of the query is limited to the triples in both the <semanticDescriptor>s as child resources in the sub-tree under the target URL and the relevant <semanticDescriptor>s linked to the <semanticDescriptor>s under the target URL.

In this solution, the triples in the <semanticDescriptor>s will be stored in one graph of a graph store. To retain the effect of ACPs in the resource tree, the <semanticDescriptor> is used as the anchor to link the ACPs in the resource tree to the access control used during the query on the semantic repository. The procedure of this solution are described as follows.

Pre-steps before semantic query process:
1. The CSE hosting the graph store creates an internal ontology with class SemanticDescriptor and atomDescription, and the property describedIn, hasSubject hasObject and hasProperty
2. For each <semanticDescriptor> with ACP in the resource tree(s), the CSE hosting the graph store creates a corresponding semantic descriptor instances in the semantic graph store using IRI/URL of the respective <semanticDescriptor>. The semantic descriptor instances are the instances of the predefined class SemanticDescriptor.
3. The CSE hosting the graph store adds triples in the semantic graph storestore to associate the semantic triples found in the <semanticDescriptor>s with the created semantic descriptor instances. The triples in the <semanticDescriptor>s in the resource tree(s) of other CSEs should be notified to the CSE hosting the graph store. Considering that one subject can be described in multiple <semanticDescriptor>s with different ACPs, the association should be implemented with each triple for classification, and the association triples are added based on each triple described in the <semanticDescriptor>. FIG. 14 shows the association between the triple and the semantic descriptor instance.

For example, for an SD original triple in <semanticDescriptor> described as "classX propertyY classZ" (S-P-O), the following association triples (i.e. SD Relationship Triple) need to be added to define the relationship between this SD original triple and the <semanticDescriptor> resource.

atomDescriptionA hasSubject classX
atomDescriptionA hasObject classZ
atomDescriptionA hasProperty propertyY
atomDescriptionA describedIn SemanticDescriptorA The process after receiving the semantic query request with SPARQL statement.
1. The receiver CSE finds the <semanticDescriptor>s where the Originator (AE ID or CSE ID) is allowed to use for querying based on the ACPs in the resource tree and the target URI of the request.
2. The receiver CSE identifies the corresponding SemanticDescriptor instances (same IRI/URL with the <semanticDescriptor>) in the semantic graph store.
3. In the received original SPAQRL semantic query statements, the receiver CSE adds new sentences to indicate that the target variable triples are associated with the identified SemanticDescriptor instances as follows: 1) find the variables and their relevant triples in the SPARQL query; 2) create atomDescription variables for each triple with variables in the query; 3) associate the atomDescription variables with each triple with variables in the query; and add the sentence to associate the atomDescription variables and the identified SemanticDescriptor instances. FIG. 15 shows the association between the triple with variables and the semanticDescriptor instances.

For example, the original SPAQRL query is

```
SELECT ?device ?operation
WHERE {
?device rdf:type m2m:WashMachine.
?device m2m:hasOperation ?operation.
}
```

If the allowed SemanticDescriptor instance after enforcing access control policies is SemanticDescriptorA, then the modified SPAQRL query is given as

```
SELECT ?device ?operation
WHERE {
?device rdf:type m2m:WashMachine.
?device m2m:hasOperation ?operation.
?atom1 temp:hasSubject ?device.
?atom1 temp:hasObject ?operation
?atom1 temp:hasProperty m2m:hasOperation
?atom2 temp:hasSubject ?device
?atom2 temp:hasObject m2m:WashMachine
?atom2 temp:hasProperty rdf:type
?atom1 temp:desribedIn SemanticDescriptorA(IRI/URL).
?atom2 temp:desribedIn SemanticDescriptorA(IRF/URL).
}
```

4. The receiver CSE sends the modified SPARQL semantic query statement to the CSE hosting the graph store for querying the graph store.

5. The receiver CSE compiles a response based on the semantic query results received from the CSE hosting the graph store.

Direct Access Control for Semantic Query Via Centralized Semantic Graph Store

The <accessControlPolicy> indicated by the accessControlPolicyIDs attribute of <semanticDescriptor> may be used for direct access control in the Semantic Graph Store when executing SPARQL operations as part of semantic queries. One existing approach is to implement access control policies directly in the Semantic Graph Store, which makes it more efficient and scalable to control the access to a centralized semantic graph store. This approach contains the following main steps.

1) Construct Access Control Rules specified by <accessControlPolicy> in the Semantic Graph Store. Note that <accessControlPolicy> is specified by the accessControlPolicyIDs attribute of <semanticDescriptor> resource.
2) Associate targeted SD Original Triples (i.e. RDF triples as described by the descriptor attribute of <semanticDescriptor> but stored in the Semantic Graph Store) with their accessControlPolicyIDs or <accessControlPolicy> with related Access Control Rules.
3) Semantic triple operations are conducted with the selected semantic triples which are associated with the Access Control Rules allowing the Originator to operate.

FIG. 16 below gives an example of access control policy for two <semanticDescriptor> resources, where there are two access control policies (i.e. <accessControlPolicy1> and <accessControlPolicy2>). The access to <semanticDescriptor1> is controlled by <accessControlPolicy1> and <accessControlPolicy2>, while the access to <semanticDescriptor2> is only controlled by <accessControlPolicy2>.

An existing ACP Ontology shown in FIG. 17 is proposed to construct ACP Triples based on oneM2M <accessControlPolicy> resource, which defines two new classes: accessControlPolicy and accessControlRule. In addition, five new properties (i.e. hasACPRule, hasACOriginator, hasACOperations, hasACContexts and appliedTo) are defined. hasACPRule is used to link an accessControlPolicy instance with an accessControlRule instance. Properties hasACOriginator, hasACOperations and hasACContexts (optional) basically describe an accessControlRule instance and are used to specify who can issue what operations under which conditions. Property appliedTo is used to describe which <semanticDescriptor> resource an accessControlPolicy instance can be applied to (i.e., bind <accessControlPolicy> and <semanticDescriptor>). Note that this ontology is defined by following how oneM2M <accessControlPolicy> resource is specified in oneM2M-TS-0001, where an access-control-rule-tuple consists of parameters such as accessControlOriginators, accessControlOperations, and accessControlContexts.

SUMMARY oneM2M Service Layer provides <semanticDescriptor> resources to annotate semantic information in triples to a regular resource. The triples in each <semanticDescriptor> resource may be stored in a Semantic Graph Store (SGS). The access control to oneM2M resources is governed by <accessControlPolicy> which defines Access Control Policies (ACP), while access to triples in the SGS can be directly controlled by adding additional ACP Triples to the SGS. ACP Triples basically model ACPs defined in <accessControlPolicy> resource. Currently, how to synchronize <accessControlPolicy> in the resource tree with ACP Triples in the SGS is still a pending issue. Disclosed herein are methods, systems, and apparatuses that may address some of these issues, such as enhanced ACP ontology, management of ACP triples, management of SD-related triples, proxy-based management of ACP-related and SD-related triples, and performance of semantic queries.

For enhanced ACP ontology, new property is disclosed for accessControlPolicy class in existing ACP ontology. This new property allows an accessControlPolicy instance to be associated with an individual SD Original Triple.

With regard to managing ACP triples, disclosed herein are methods, systems, and apparatus for maintaining synchronization between <accessControlPolicy> resources at a hosting CSE and ACP Triples at the SGS. In an example method, in order to maintain synchronization, a hosting CSE may perform the following: 1) when a new <accessControlPolicy> resource is created, the hosting CSE generates new ACP triples according to ACP ontology and stores these new ACP triples in the SGS; 2) when the privileges attribute of an existing <accessControlPolicy> resource is updated, the hosting CSE also generates new ACP Triples and updates corresponding old ACP Triples at the SGS accordingly; and 3) when an existing <accessControlPolicy> resource is deleted, the hosting CSE removes corresponding ACP triples and ACP binding triples, if any at the SGS which are related to the same <accessControlPolicy> resource are deleted. It is also contemplated herein to create or update ACP Triples of an <accessControlPolicy> resource only when needed. With regard to management of SD-related triples, it includes when and how to create/update/delete ACP-SD Triples, SD Relationship Triples, and SD Original Triples.

For proxy-based management of ACP-related and SD-related triples, a hosting CSE which supports SPARQL and has an interface to the SGS may act as a proxy for other hosting CSEs (which have no interface to the SGS). This hosting CSE is responsible for adding or updating ACP-related and SD-related Triples to the SGS for these other hosting CSEs.

For performance of semantic queries, when a query initiator (e.g., an oneM2M AE or CSE) sends a semantic query request to the hosting CSE, the hosting CSE converts this semantic query request (which could be a RESTful Retrieve operation or a SPARQL request) to a new SPARQL request. As a part of this translation, the identifier of the query initiator may be added into the query pattern of the new SPARQL request. Then the Hosting CSE transmits the new SPARQL request to the SGS.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 17 illustrates an Existing ACP Ontology;
FIG. 25 illustrates exemplary ACP Triples for <acp1> Resource;
FIG. 30 illustrates exemplary SD Relationship Triples;
FIG. 31 illustrates exemplary ACP-SD Binding Triples.

DETAILED DESCRIPTION OF ILLUSTRATIVE EXAMPLES

Figure 2:
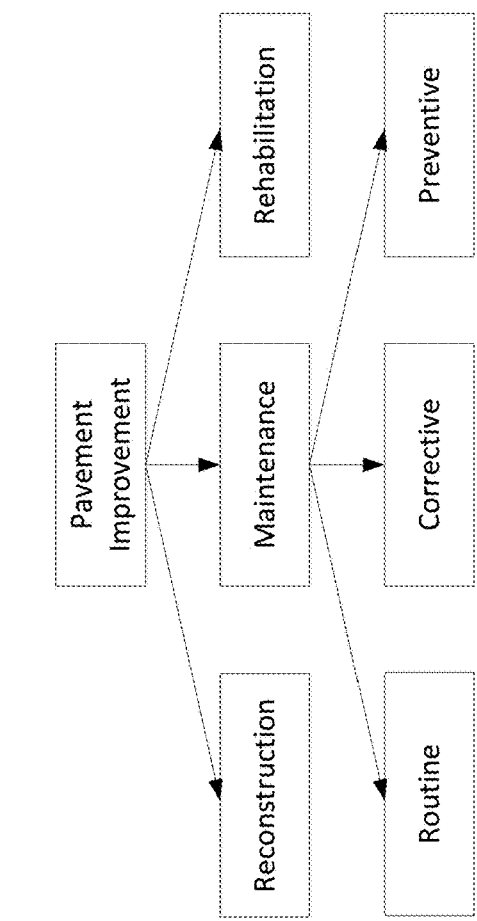
FIG. 2 illustrates an exemplary Hierarchical Database.
Figure 1:
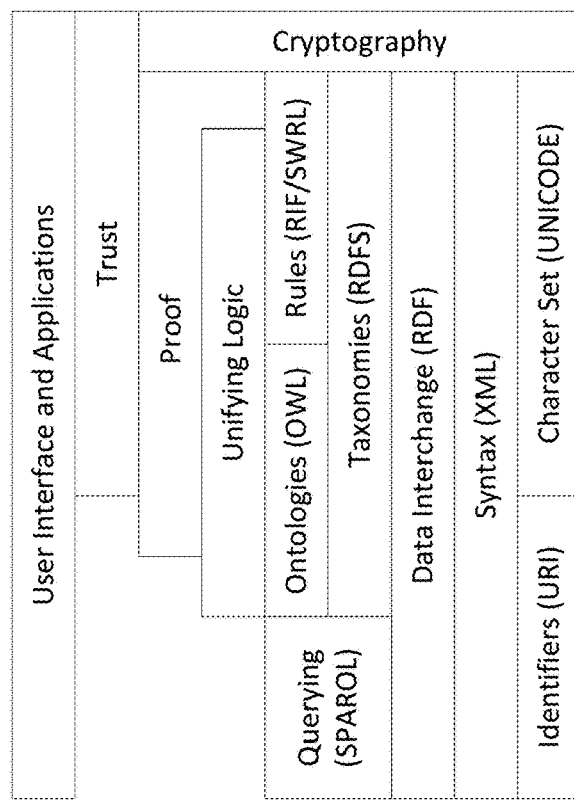
FIG. 1 illustrates an Architecture of the Semantic Web.
Figure 3:
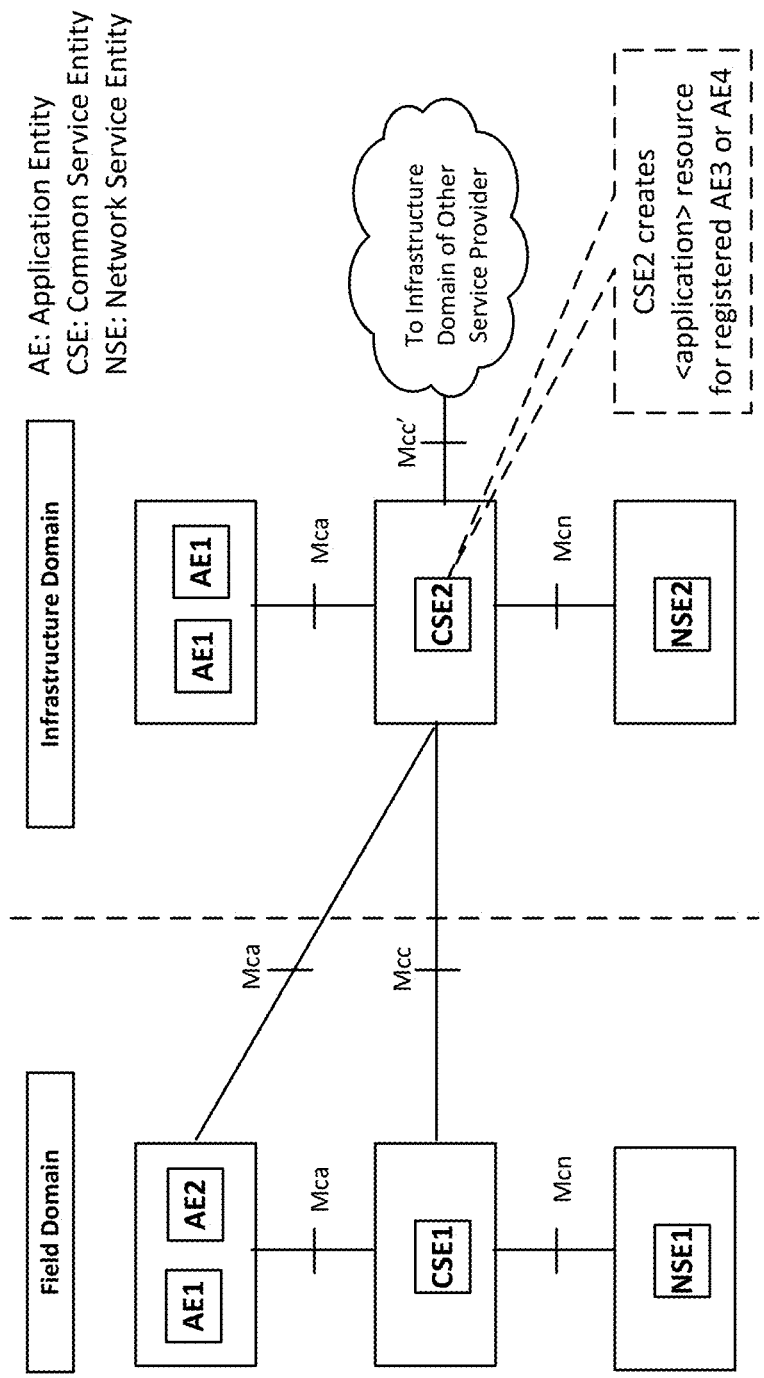
FIG. 3 illustrates oneM2M Architecture.
Figure 4:
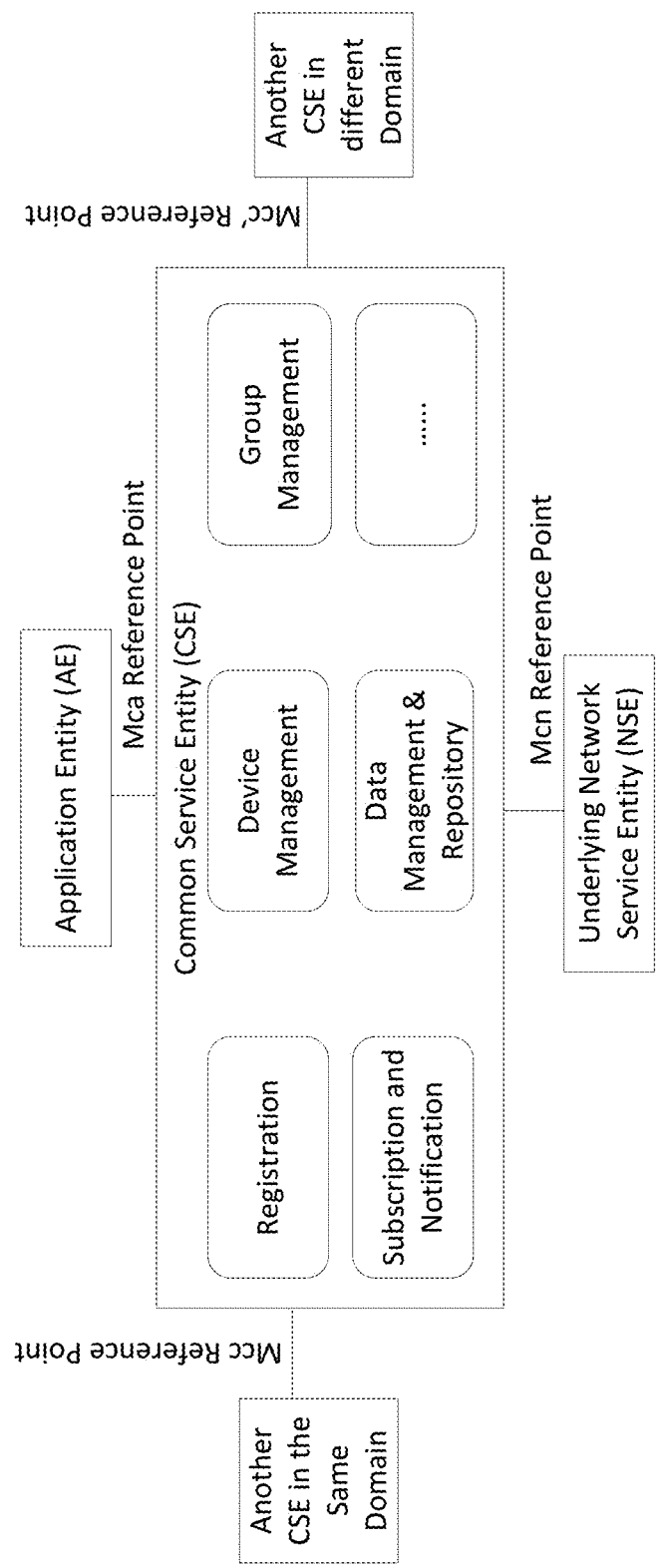
FIG. 4 illustrates oneM2M Common Service Functions.
Figure 5:
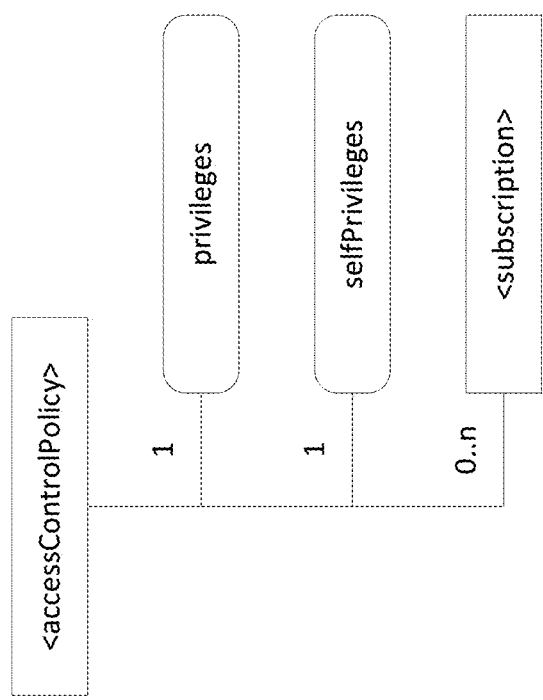
FIG. 5 illustrates Structure of <accessControlPolicy> Resource.
Figure 6:
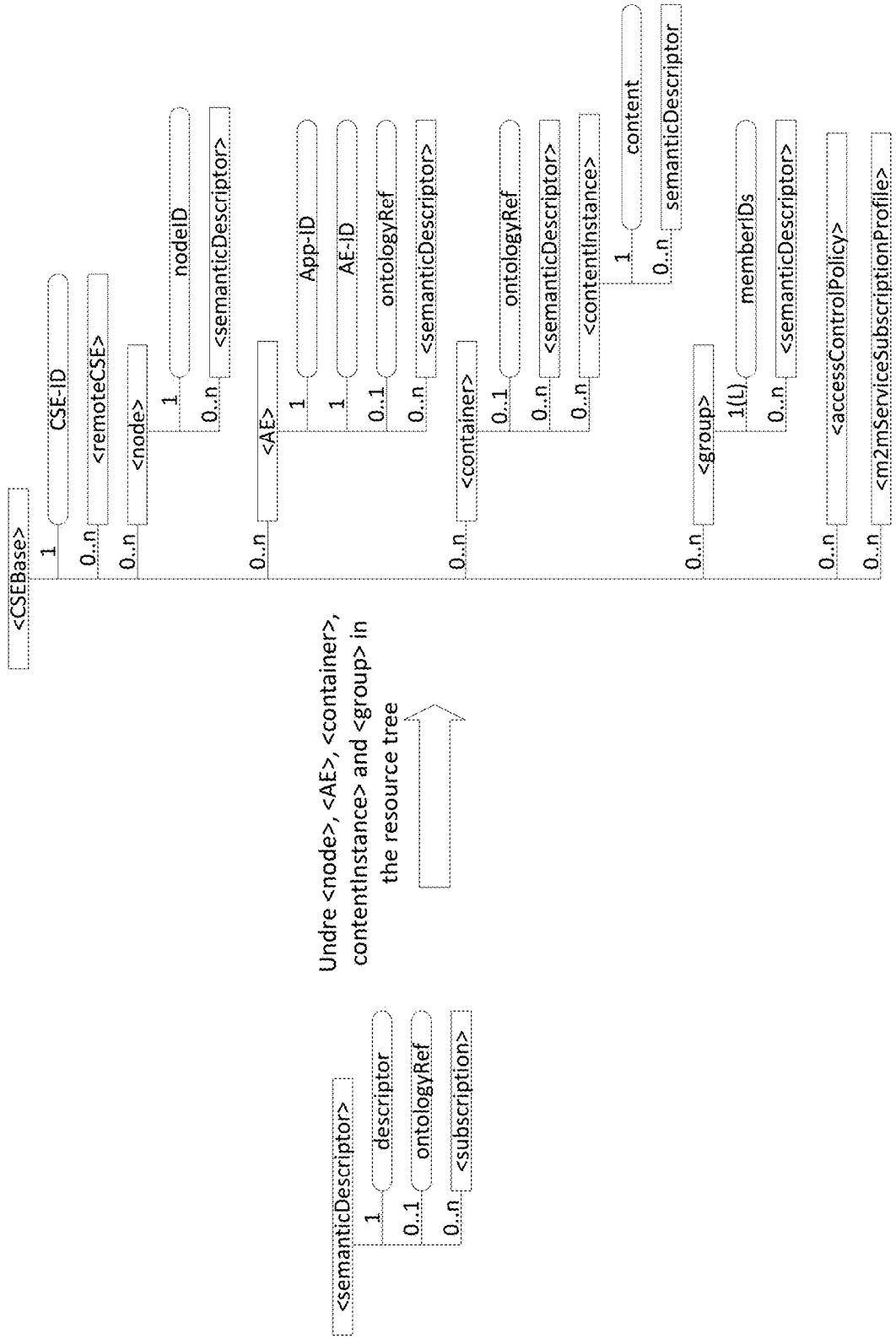
FIG. 6 illustrates a Structure of <semanticDescriptor> Resource in a Resource Tree.
Figure 7:
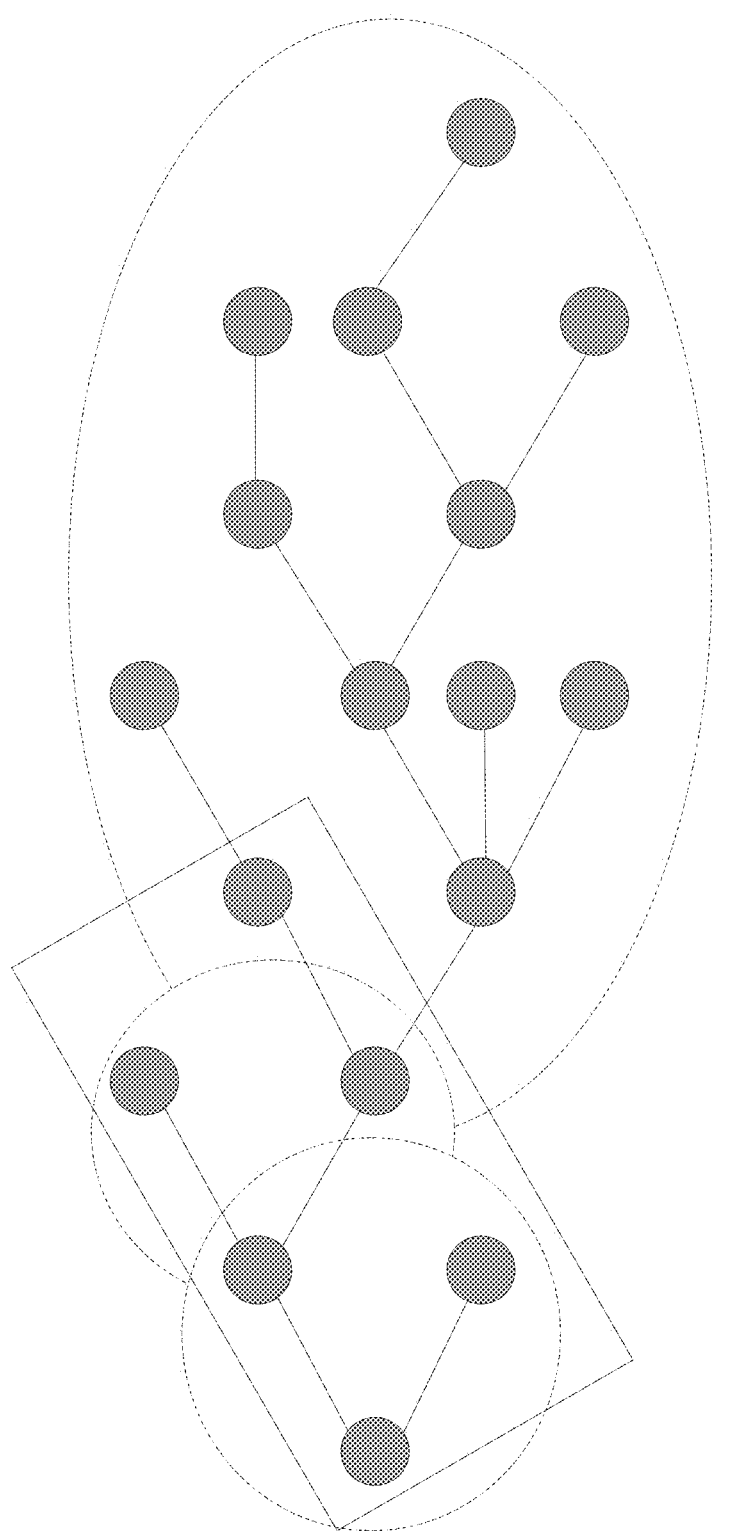
FIG. 7 illustrates an example Scope of semantic filter across semantic information stored in different resources.
Figure 8:
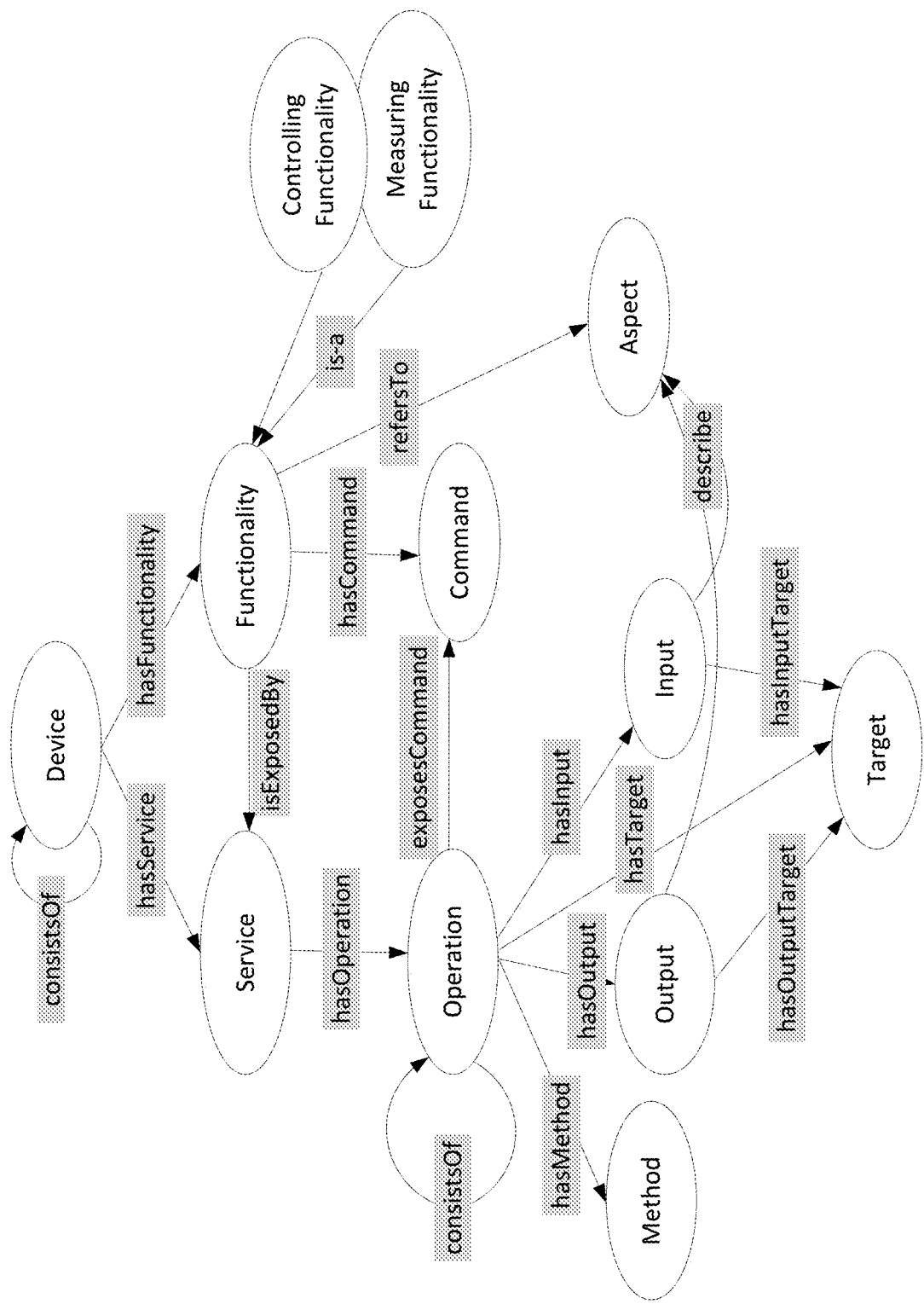
FIG. 8 illustrates an exemplary oneM2M Base Ontology.
Figure 9:
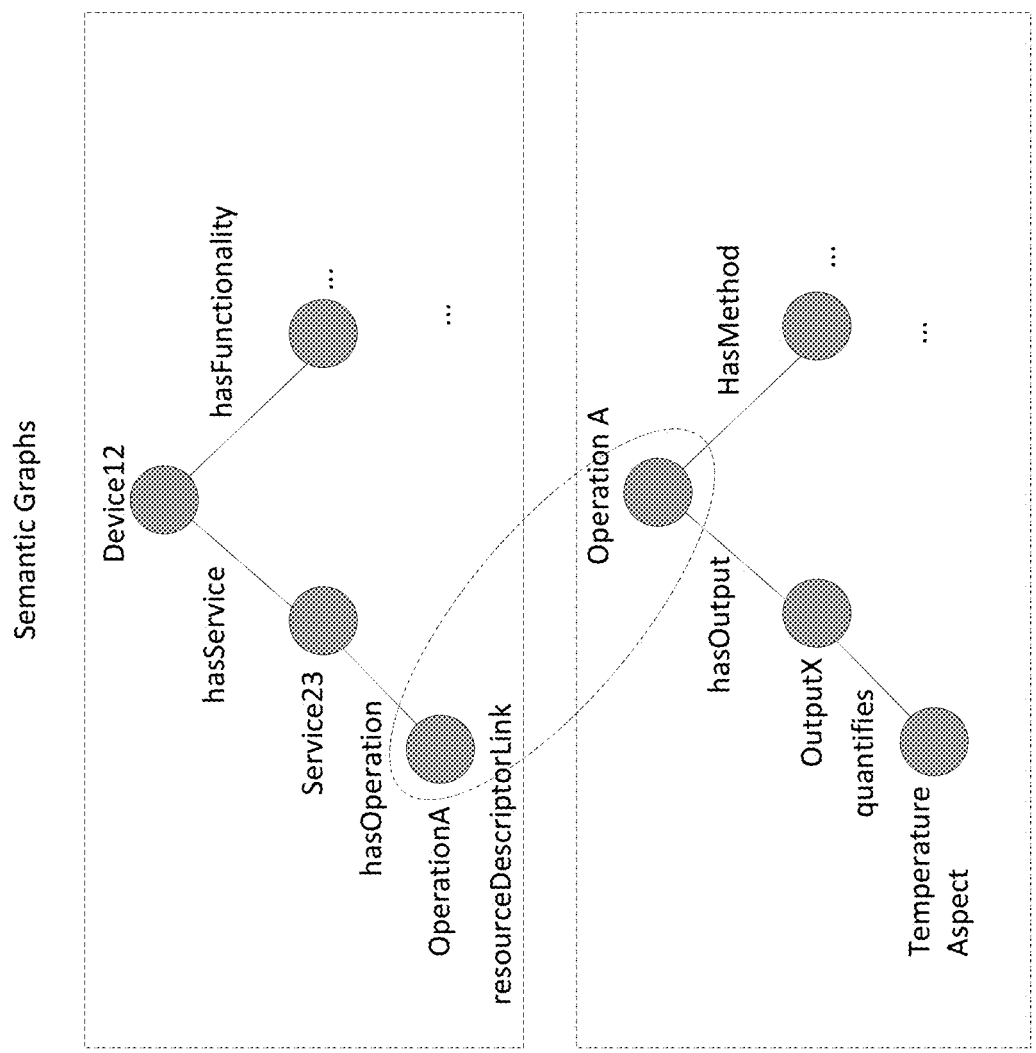
FIG. 9 illustrates an exemplary resourceDescriptionLink.
Figure 10:
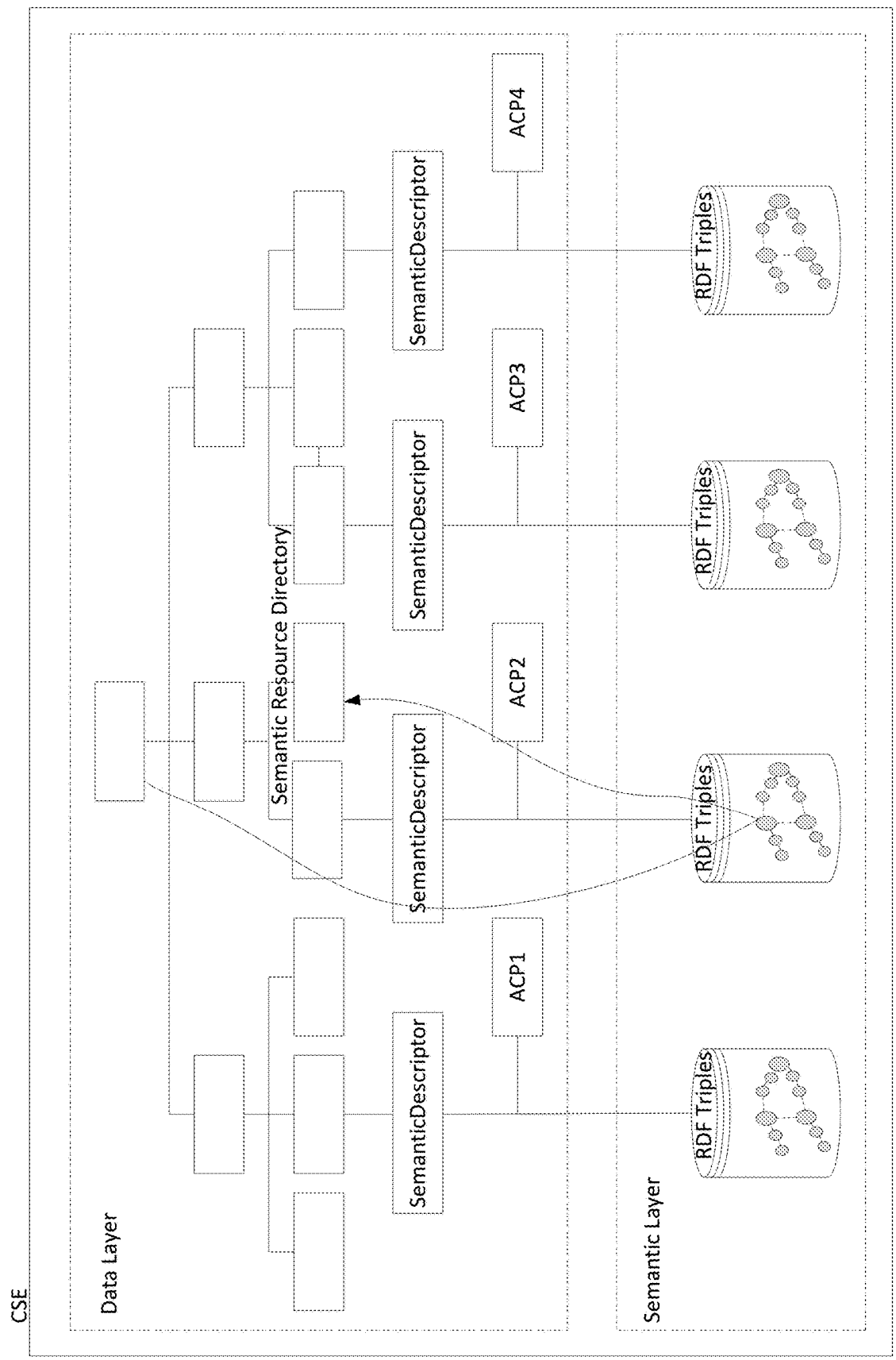
FIG. 10 illustrates Access Control in a Hierarchically Layered Structure—Controlled by the Data Layer.
Figure 11:
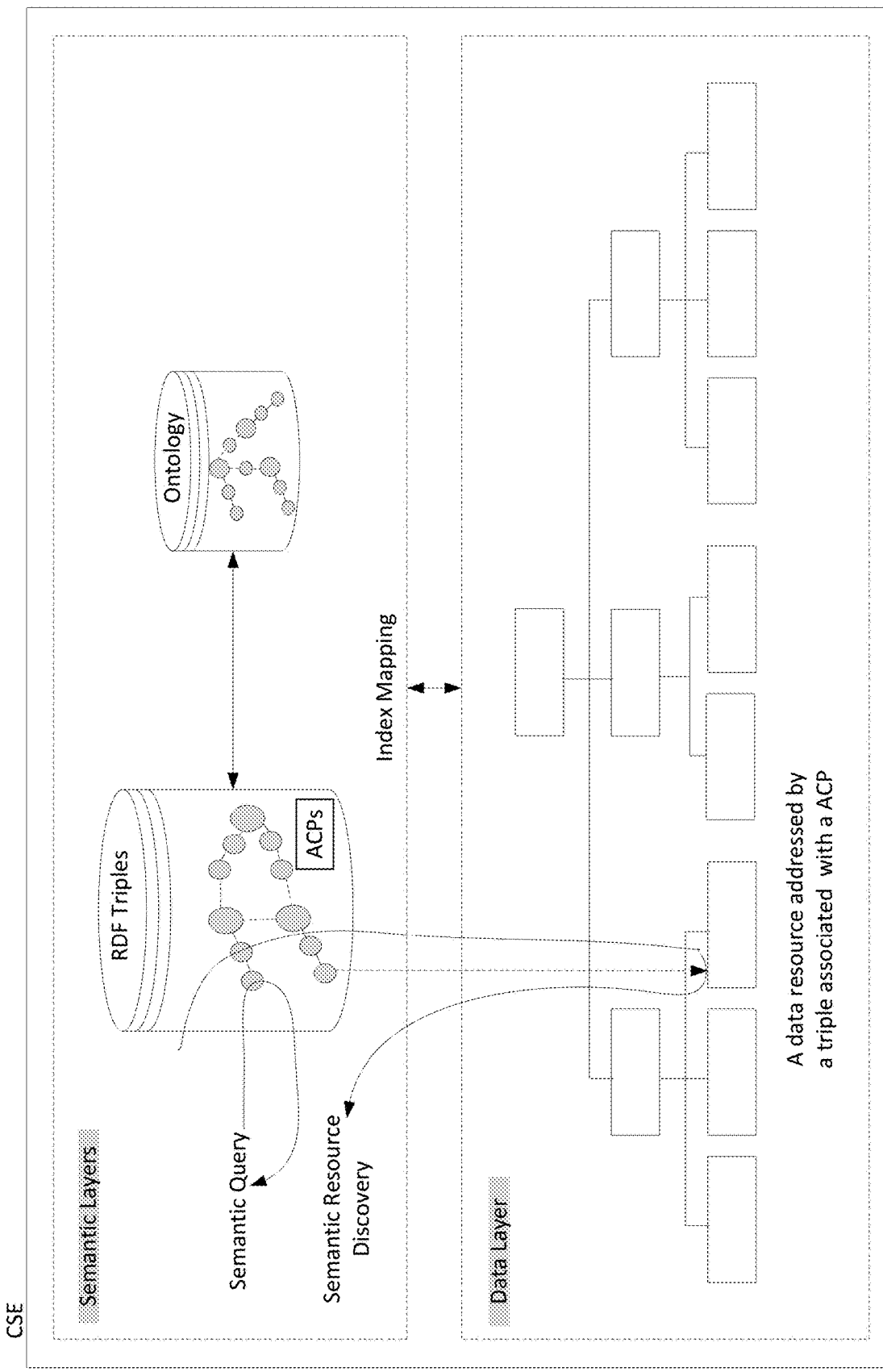
FIG. 11 illustrates Access Control in a Hierarchically Layered Structure—Controlled by the Semantic Layer.
Figure 12:
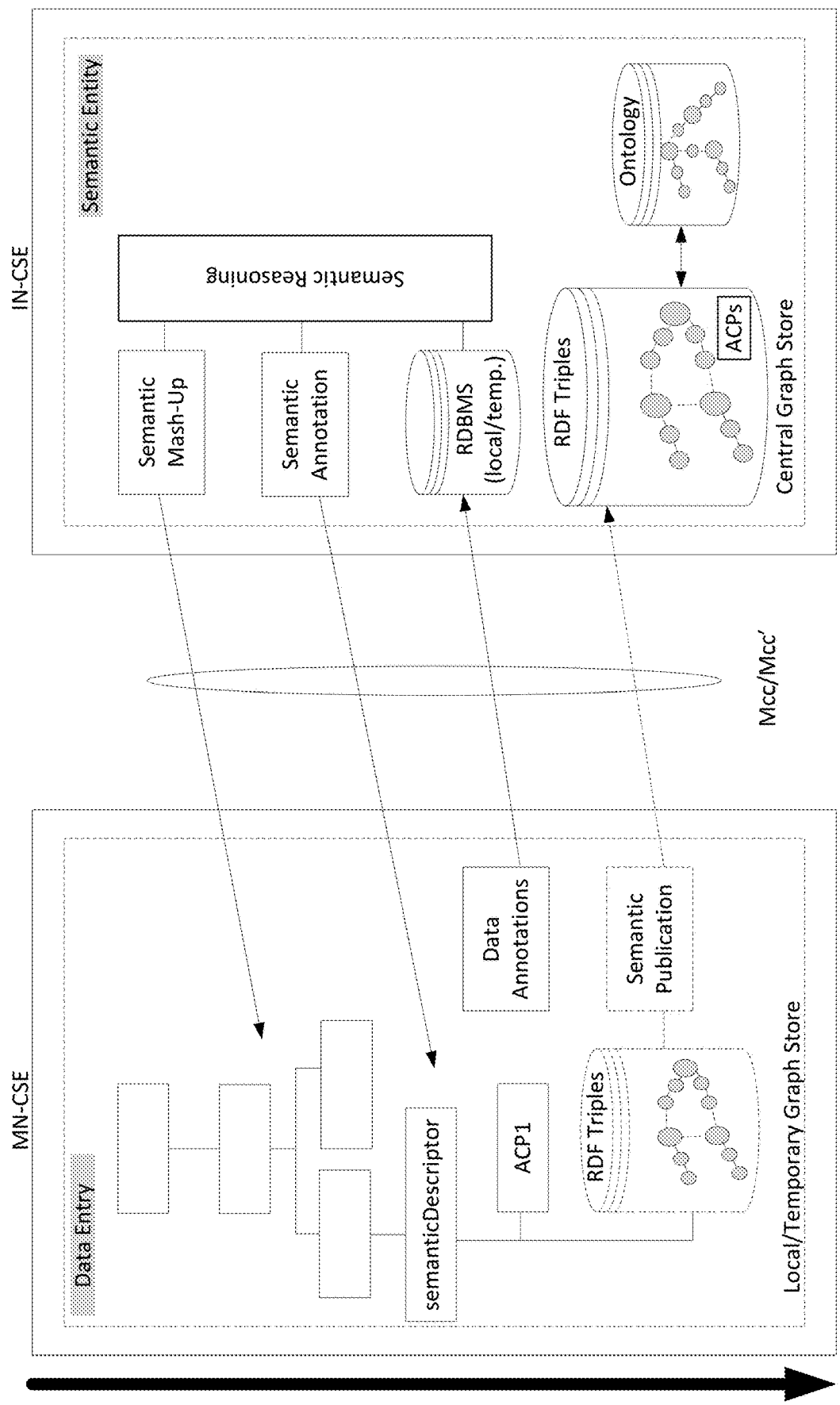
FIG. 12 illustrates Access Control in a Parallel Structure.
Figure 13:
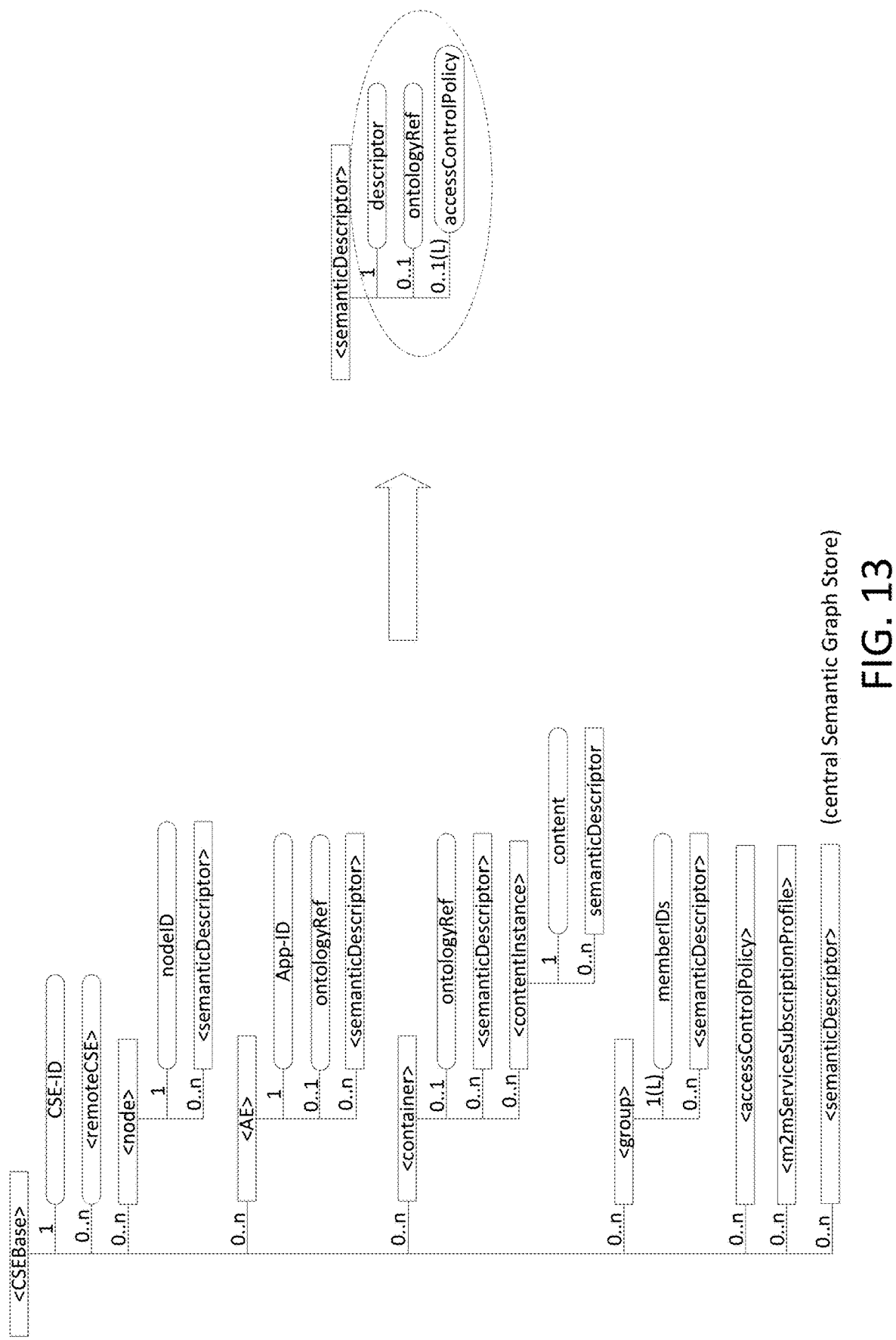
FIG. 13 illustrates Logic Resource Tree with both a Data Entity and a Semantic Entity.
Figure 14:
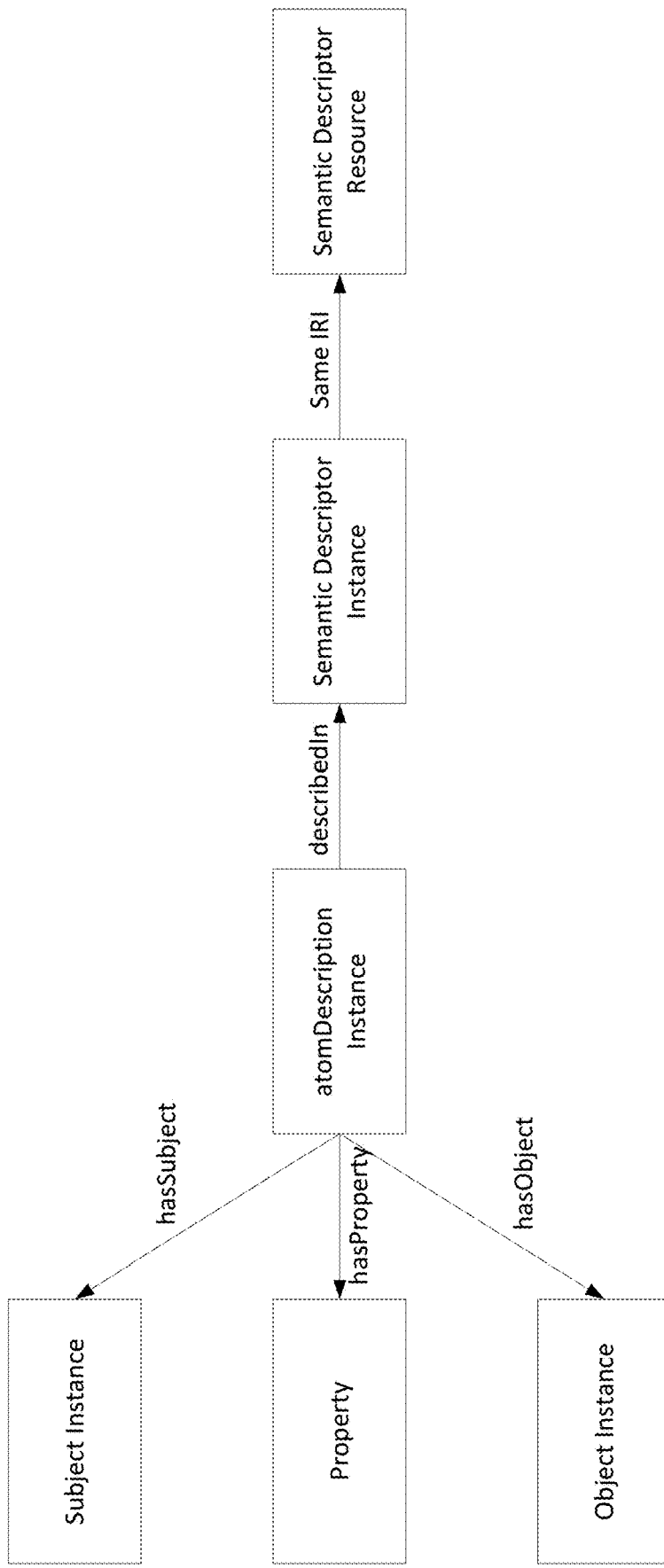
FIG. 14 illustrates The Association between the SD Original Triple and the semanticDescriptor Instance.
Figure 15:
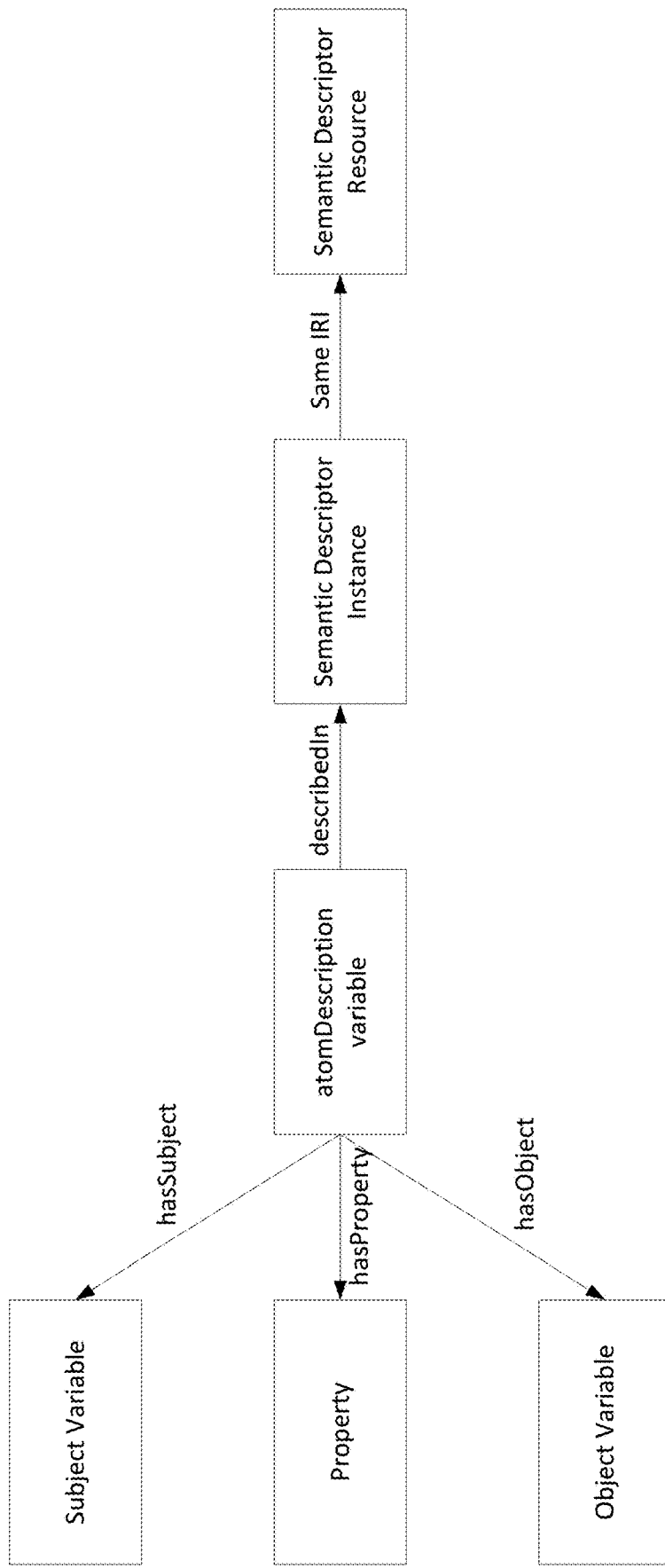
FIG. 15 illustrates Association between the SD Original Triple with Variables in SPARQL Query and the SemanticDescriptor Instance.
Figure 16:
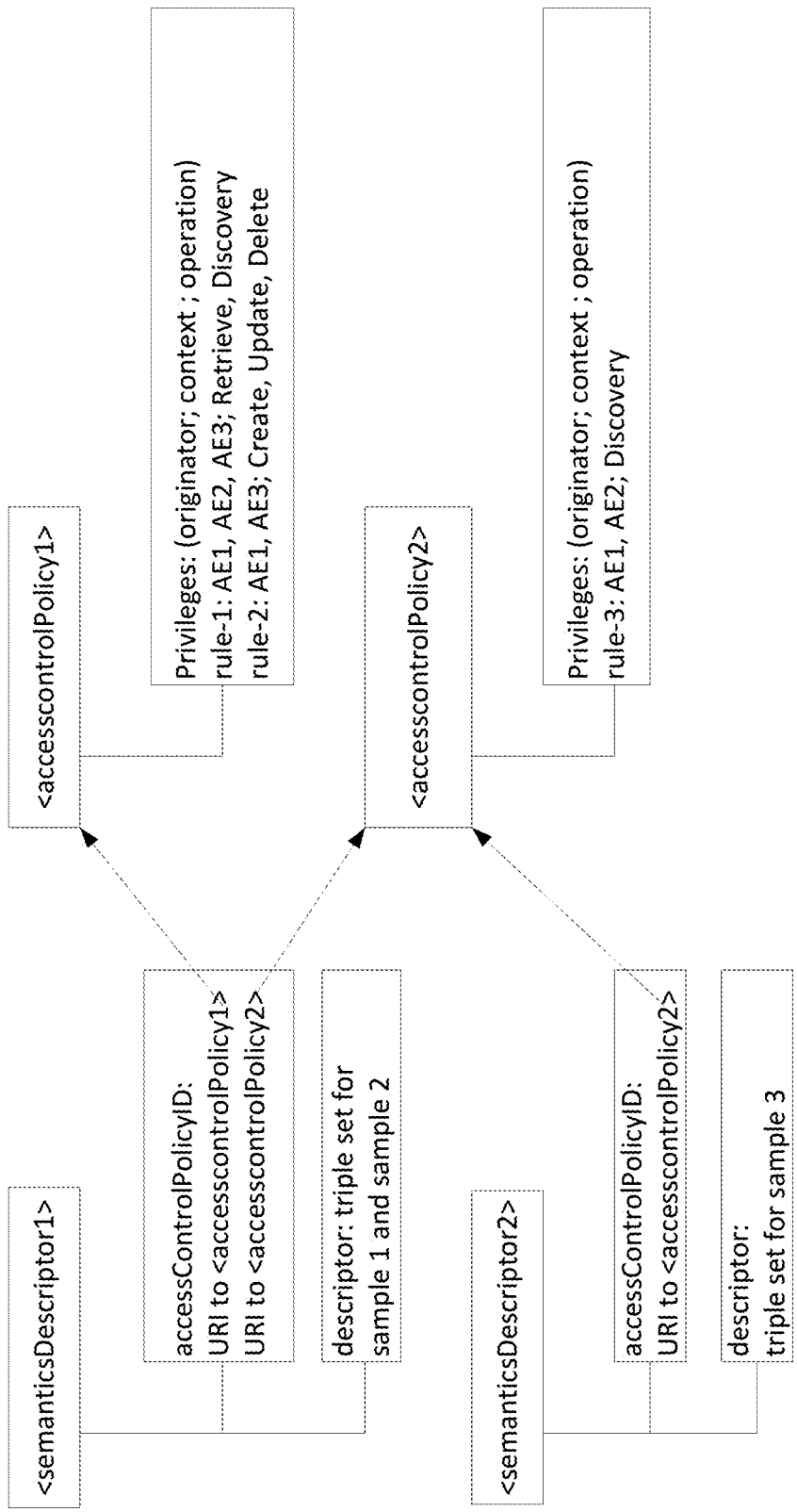
FIG. 16 illustrates Examples of Access Control Policy for <semanticDescriptor>.

Disclosed herein is access control for semantic queries, access control policy synchronization, and semantic query. In summary, the following subject matter is discussed: 1) a property for accessControlPolicy class for access control policy (ACP) ontology, which allows an accessControlPolicy instance applied to an individual semantic descriptor (SD) original triple; 2) management of ACP Triples, which includes when and how to create ACP Triples, update ACP Triples, or delete ACP Triples; 3) management of SD-Related triples, which includes when and how to create/update/delete ACP-SD Triples, SD Relationship triples, and SD Original Triples; 4) proxy-based management of ACP-related and SD-related triples; 5) a hosting CSE which has an interface to the SGS and may act as a proxy for other CSEs which may no talk to the SGS directly, to manage ACP-related and SD-related triples for those CSEs; and 6) performance of semantic queries as translated into a SPARQL request.

Table 7 provides definitions for commonly used terminology used herein.

TABLE 7

| Terminology | |
|---|---|
| <accessControlPolicy> | <accessControlPolicy> is an oneM2M resource, which defines access control rules for accessing other oneM2M resource via its privileges attribute, or access control rules for accessing itself via its selfPrivileges attribute. |
| ACP Initiator | ACP Initiator is an M2M Application (e.g. an oneM2M AE) or an M2M Service Layer (e.g. an oneM2M CSE) which sends a request to create an <accessControlPolicy> resource, retrieve an <accessControlPolicy> resource, update an <accessControlPolicy> resource, and/or delete an <accessControlPolicy> resource. |
| ACP Ontology | ACP Ontology is used to model access control policies (e.g. oneM2M <accessControlPolicy> resource). The ACP Ontology defines two classes: accessControlPolicy and accessControlRule. Using ACP Ontology, an access control policy can be described as triples, referred to as ACP Triples. |
| ACP Query Patterns | When the Service Layer (e.g. an oneM2M CSE) receives a SPARQL request which could be included in a RESTful Retrieve operation, the Service Layer will add more new query patterns (e.g., triples) into the received original SPARQL request in order to directly enforce access control in the SGS. These new query patterns are referred to as ACP Query Patterns. Then the Service Layer sends the modified SPARQL request to the SGS. |
| ACP-SD Binding Triples | ACP-SD Binding Triples are generated according to the ACP Ontology and used to describe which accessControlPolicy can be applied to which semanticDescriptor. For oneM2M, such binding relationship can be obtained from the resource <semanticDescriptor>'s accessControlPolicy IDs attribute. |
| ACP Triples | ACP Triples are generated according to the ACP Ontology to describe access control policies (e.g. oneM2M <accessControlPolicy> resources) |
| SD Initiator | SD Initiator is an M2M Application (e.g. an oneM2M AE) or an M2M Service Layer (e.g. an oneM2M CSE) which sends a request to create a <semanticDescriptor> resource, retrieve a <semanticDescriptor> resource, update a <semanticDescriptor> resource, or delete a <semanticDescriptor> resource. |
| SD Original Triples | SD Original Triples are triples or RDF statements as included in the descriptor attribute of an oneM2M <semanticDescriptor> resource. |
| SD Relationship Triples | SD Relationship Triples are used to describe the belonging relationship between each SD Original Triple and the corresponding <semanticDescriptor> resource. |
| Semantic Graph Store | Semantic Graph Store (SGS) is a semantic repository which maintains ACP Triples, ACP-SD Binding Triples, SD Original Triples, and SD Relationship Triples. SGS supports SPARQL interface to enforce semantic operations over these triples. |
| <semanticDescriptor> | <semanticDescriptor> is an oneM2M resource, which is usually added as a child resource of another oneM2M parent resource (e.g. <contentInstance>) to describe its semantic information or metadata. <semanticDescriptor> has descriptor attribute which contains SD Original Triples; it also has accessControlPolicyIDs attribute which points to <accessControlPolicy> resources for describing access control policies and rules for manipulating this parent resource. |

Figure 18:
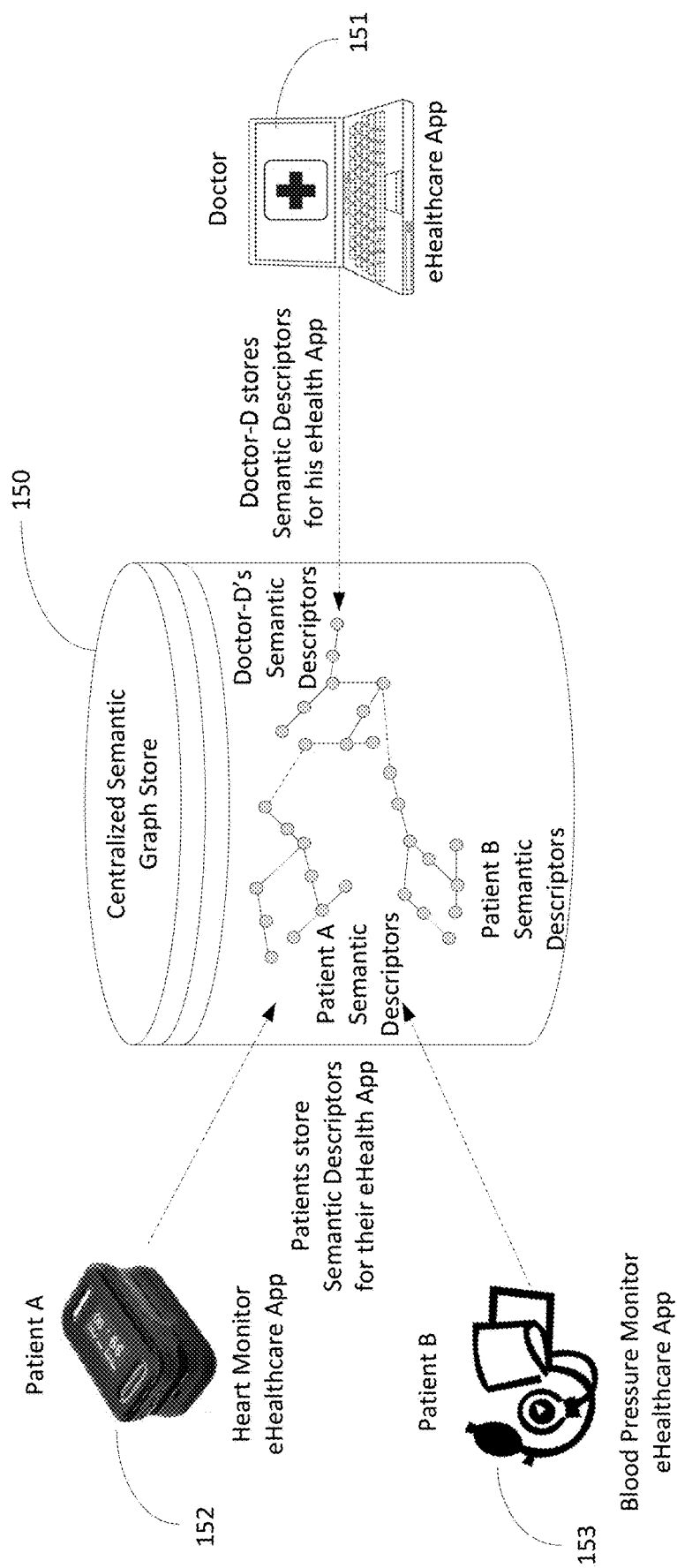
FIG. 18 illustrates Semantic Descriptors in Centralized Semantic Graph Store.

Below is additional context of an environment associated with the methods, systems, and apparatuses of access control policy (ACP) synchronization in the service layer. As shown in FIG. 18, the semantic descriptions in the form of RDF triples (e.g., semantic descriptors) are deposited at a centralized RDF triple database (e.g., Semantic Graph Store). For example, doctor 151 and patients of doctor 151 (e.g., patient 152 and patient 153) may store their semantic descriptors into a centralized RDF triple store or Semantic Graph Store 150 (SGS 150). Doctor 151, patient 152, and patient 153 are applications that may be accessed and particularly controlled by the respective parties of doctor and patients. Doctor 151 may conduct a semantic query over his patients' semantic descriptors if the patients grant permission to doctor 151 to do so. Patient 152 or patient 153 may also conduct a semantic query over their own semantic descriptors and some of the semantic descriptors of doctor 151, if doctor 151 grants permission to patient 152 or patient 153. The doctor 151 and patient 152 may not conduct a semantic query over each other's semantic descriptors if no permission is granted. Doctor 151 may update or delete his semantic descriptors and some of the semantic descriptors of patient 152 or patient 153 if the permissions are granted by patient 152 or patient 153. Patient 152 or patient 153 may update or delete his or her own semantic descriptors as well as some of the semantic descriptors for doctor 151, if permission is granted by doctor 151. Although it is not shown in the FIG. 18, the health related real data about patient 152 and patient 153 will be maintained in a service layer (e.g. an M2M server); the ACP for those real health data is also stored in the service layer. When the ACP in the service layer changes, it is required to update SGS 150 with the new ACP so that SGS 150 synchronizes the ACP of its maintained triples with the ACP of real health data stored in the service layer.

Figure 19:
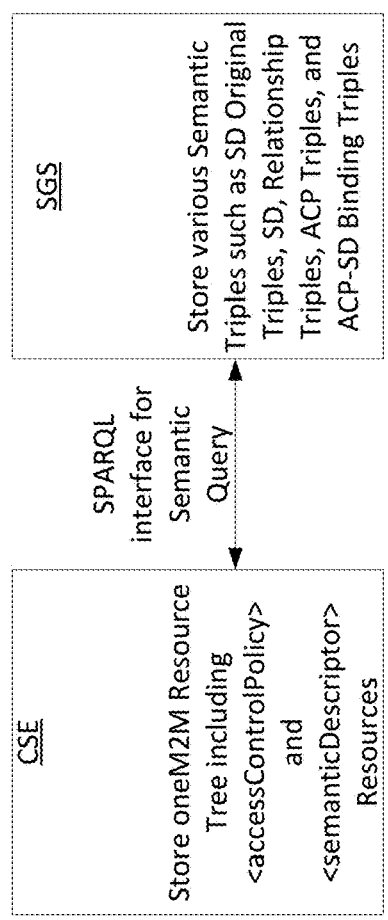
FIG. 19 illustrates an exemplary Resource Tree in CSE vs Triples in SGS.

FIG. 19 illustrates a conventional configuration that maintains a resource tree at a common service entity (CSE) while storing semantic triples in an SGS. The resource tree includes various resources, such as <semanticDescriptor> and <accessControlPolicy>. The <accessControlPolicy> defines access control rules to access <semanticDescriptor> resource. Semantic triples stored in an SGS include semantic descriptor (SD) original triples (coming from <semanticDescriptor> resource), SD relationship triples, ACP triples, and ACP-SD binding triples. SD relationship triples were introduced to facilitate indirect access control for semantic discovery via resource tree, while ACP Triples and ACP-SD binding triples are proposed for direct access control for semantic discovery as described in the background.

While there are conventional solutions for controlling the access to semantic triples, an existing problem is how to achieve ACP synchronization and other ACP functionalities between the service layer and the SGS. The following issues are discussed in more detail herein: 1) when and how to create ACP Triples at an SGS; 2) when and how to create ACP Binding Triples at an SGS; 3) when and how to update ACP Triples at an SGS; 4) when and how to update ACP-SD Binding Triples at an SGS; 5) when and how to update SD Relationship Triples in an SGS; or 6) when and how to trigger and execute semantic queries at an SGS.

Figure 20:
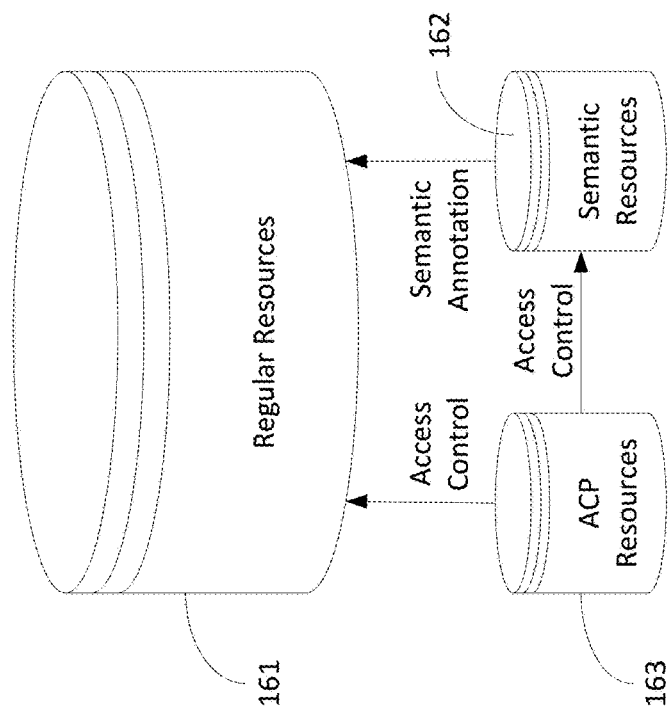
FIG. 20 illustrates exemplary an exemplary Resources Stored at a Service Layer.

FIG. 20 illustrates resources stored at a service layer. The service layer may maintain multiple types of resources, such as regular resources 161, semantic resources 162, and ACP resources 163. Regular resources 161 are the resources which implement other service layer functionalities and maintain regular data. A regular resource 161 may associate with one or multiple semantic resources 162 or ACP resources 163 by adding them as child resource or adding their uniform resource identifiers (URIs) as its attributes. For example, if regular resource 161 has semantics resource 162 as its child resource, semantics resource 162 basically annotates extra semantic information about regular resource 161. Instead of directly adding semantics resource 162 as its child resource, regular resource 161 may alternatively add a link which points to semantics resource 162 (e.g., adding semantics resource 162's URI as an attribute of regular resource 161). Similarly, regular resource 161 may have ACP resource 163 as its child resource. Then the access to regular resource 161 may be controlled by access control policies described in ACP resource 163. Instead of directly adding ACP resource 163 as its child resource, regular resource 161 may alternatively add a link which points to ACP resource 163 (e.g., adding ACP resource 163's URI as an attribute of regular resource 161).

With continued reference to FIG. 20, semantic resources 162 are the resources which maintain semantic information (e.g. RDF triples) for describing regular resources 161. Semantic resource 162 may associate with one or multiple ACP Resources by adding them as its child resource or adding their URIs as its attributes. For example, semantics resource 162 may have ACP resource 163 as its child resource. Then access to semantics resource 162 will be controlled by access control policies described in ACP resource 163. Instead of directly adding ACP resource 163 as its child resource, semantics resource 162 may alternatively add a link which points to ACP resource 163 (e.g., adding ACP resource 163's URI as an attribute of semantics resource 162).

ACP Resources 163 are the resources that define access control policies for accessing regular resources 161 or accessing semantic resources 162, for example. ACP Resource 163 may also associate with one or multiple regular resources 161 or semantic resources 162 by adding them as its child resource or adding their URIs as its attributes. For example, ACP resource 163 may have a semantics resource 162 as its child resource. Then access to semantics resource 162 will be controlled by access control policies described in ACP resource 163. Instead of directly adding semantics resource 162 as its child resource, ACP resource 163 may alternatively add a link which points to semantics resource 162 (e.g., adding semantics resource 162's URI as an attribute of ACP resource 163).

Figure 21:
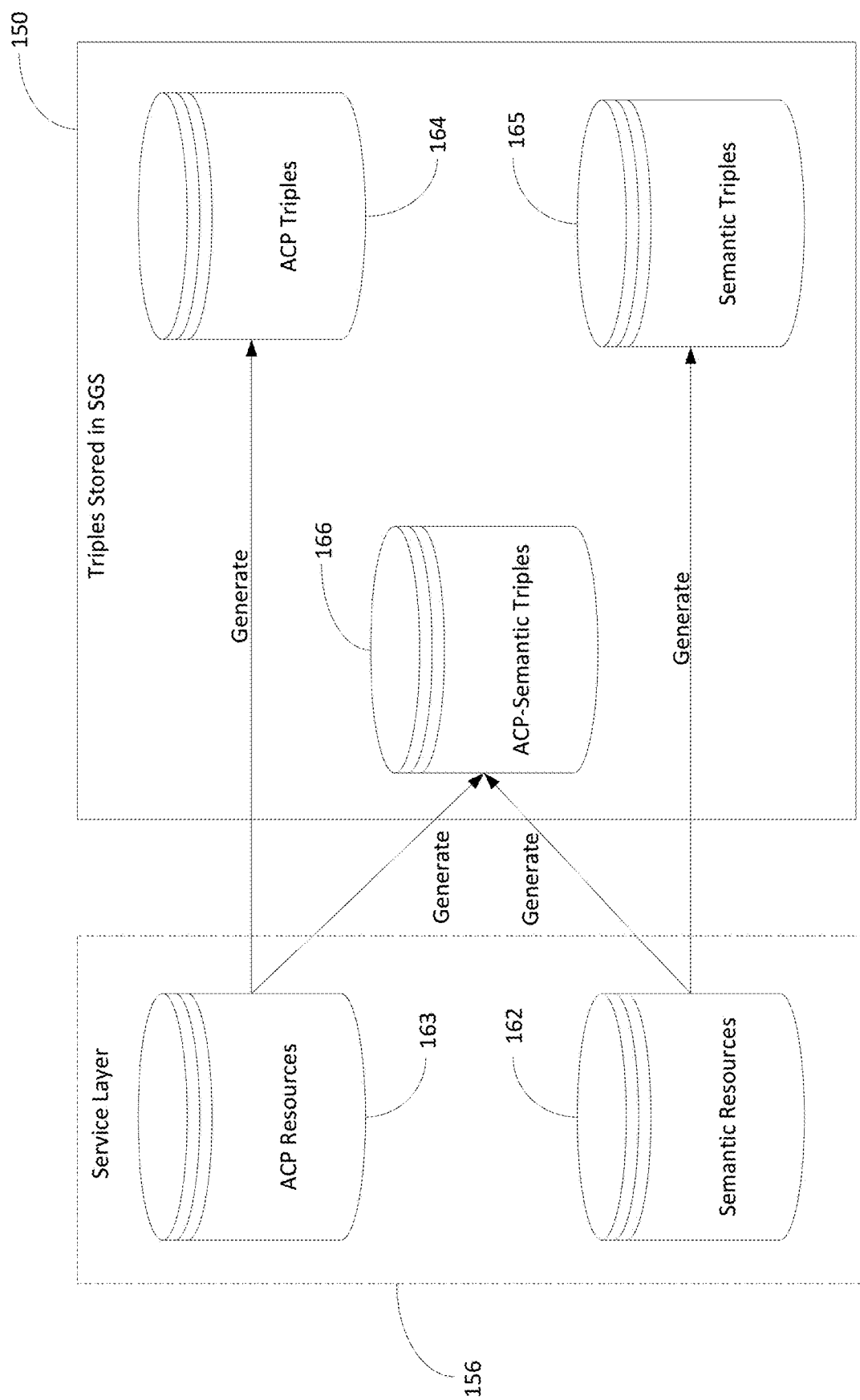
FIG. 21 illustrates exemplary Triples Stored in an SGS.

FIG. 21 illustrates that some triples may be generated based on these service layer resources (e.g., semantics resource 162 or ACP resources 163) and stored in SGS 150. ACP Triples 164 are generated based on ACP resources 156. In other words, ACP Triples 164 may be used for modeling ACP resources 163. Semantic triples 165 are from semantic resources 162. In addition, additional triples (e.g., semantic triples 165) may be generated for describing relationship between semantic resource 162 and each triple it includes. ACP-Semantic triples 166 (e.g., ACP-semantic binding triples) are used for describing relationship between ACP resources 163 or semantic resources 162. ACP-Semantic triples 166 may describe which ACP Resources 163 may be applicable to which semantic resources 162.

It is understood that the entities performing the steps illustrated herein, such as FIG. 22-FIG. 37, may be logical entities. The steps may be stored in a memory of, and executing on a processor of, a device, server, or computer system such as those illustrated in FIG. 39C or FIG. 39D. In an example, with further detail below with regard to the interaction of M2M devices ACP initiator 172 or SD initiator 173 of FIGS. 24 and 29 may reside on M2M terminal device 18 of FIG. 39A, while hosting CSE 171 and SGS 170 of FIG. 24 and FIG. 29 may reside on M2M gateway device 14 of FIG. 39A. CSE171 and SGS170 could reside on an M2M server.

Figure 22:
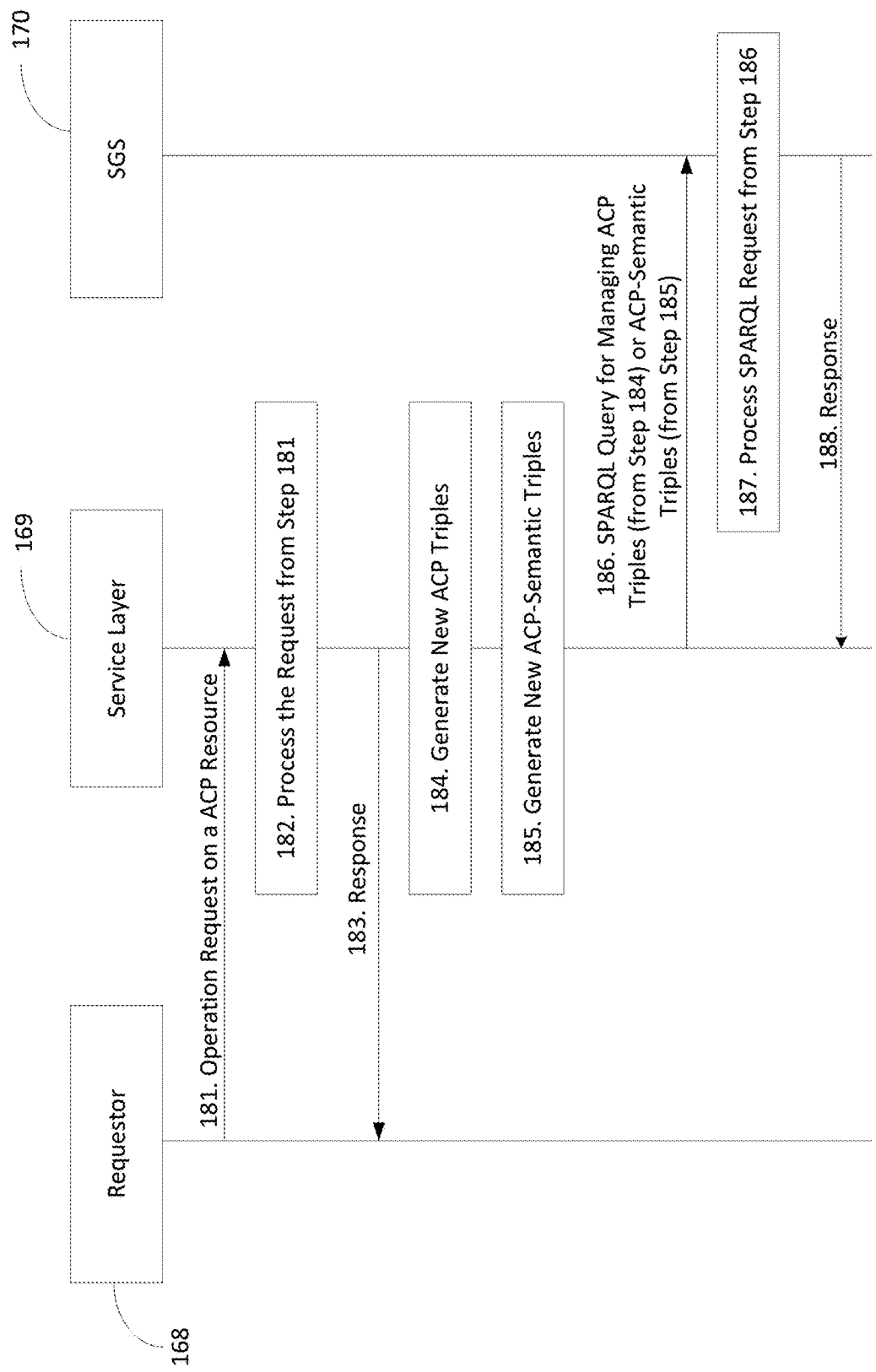
FIG. 22 illustrates exemplary General Procedure for Managing ACP Triples (and ACP-Semantic Triples)
Figure 23:
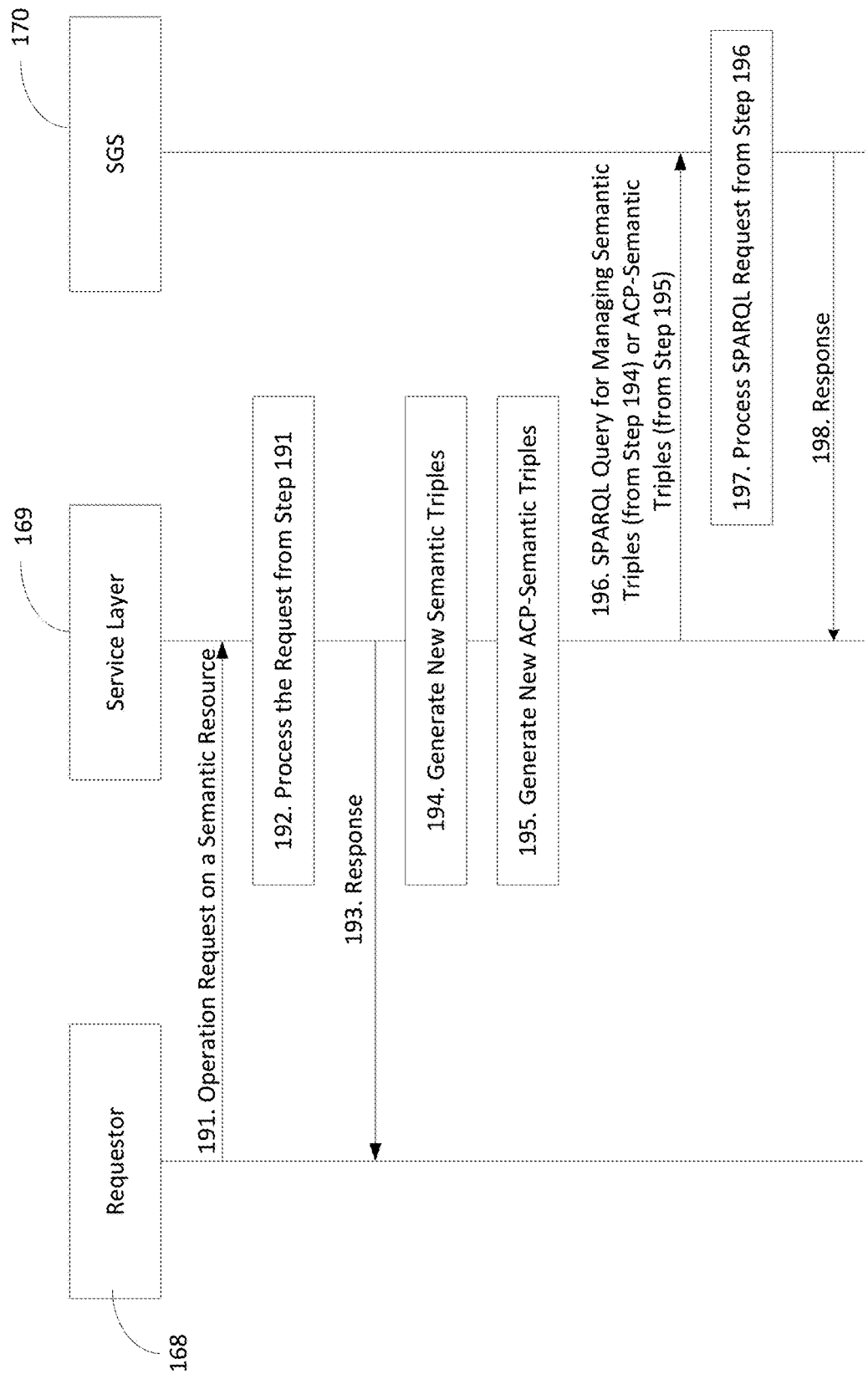
FIG. 23 illustrates exemplary General Procedure for Managing Semantic Triples (and ACP-Semantic Triples)

FIG. 22 and FIG. 23 illustrate methods for managing ACP-related triples and semantic-related triples to achieve synchronization between the service layer and the SGS, as discussed in more detail herein. Semantic-related triples may include "semantic triples (e.g., SD Original Triples)", "SD Relationship Triples", and "ACP-SD Binding Triples". "Semantic-related" triples may be more than "semantic triples." ACP-related triples may include "ACP triples" and "ACP-SD Binding triples." An operation on an ACP resource hosted at the service layer triggers managing of ACP-related triples in the SGS (e.g., create ACP-related triples, update ACP-related triples, or delete ACP-related triples). In contrast, an operation on a semantic resource hosted at the service layer triggers managing of semantic-related triples in the SGS (e.g., create semantic-related triples, update semantic-related triples, or delete semantic-related triples). Note that the SGS in both FIG. 22 and FIG. 23 may be implemented as another service layer or as a special functionality of another service layer. SGS could reside in another service layer, such as being a part of it or as a whole.

Again, FIG. 22 illustrates a general procedure for managing ACP triples (and ACP-semantic triples). At step 181, service layer 169 receives a request to operate an ACP resource from a requestor 168. Requestor 168 may be an application or another service layer. In a first scenario, the request of step 181 may be to create a new ACP resource. The request of step 181 may include the resource representation of the ACP resource to be created. In a second scenario, the request of step 181 may be to update an existing ACP resource. Then the request of step 181 may include the value of attributes or child resource representation of the existing ACP resource to be updated. In a third scenario, the request of step 181 may be to delete an existing ACP resource. Then the request of step 181 may include the identifier (e.g., name) or URI of the existing ACP resource to be removed.

At step 182, service layer 169 processes the request from step 181. If the request is scenario 1 (e.g., the aforementioned first scenario), then service layer 169 creates the requested ACP resources using the resource representation of step 181. If the request is scenario 2 (e.g., the aforementioned second scenario), then the service layer 169 updates the requested ACP resource using the attribute value or child resource representation of step 181. If the request is scenario 3 (e.g., the aforementioned third scenario), then the service layer 169 updates the requested ACP resource as identified by its identifier or URI of step 181. At step 183, service layer 169 may send a response to requestor 168 to notify it of the execution result of step 182. At step 184, service layer 169 may create new ACP triples dependent on the scenario (e.g., scenario 1 or scenario 2). If scenario 1, then ACP triples are generated to model the new ACP resource created in step 182. If scenario 2, then ACP triples are generated to model the updated ACP resource in step 182.

With continued reference of FIG. 22, at step 185, service layer 185 may create new ACP-semantic triples for the first scenario or the second scenario, if the ACP resource has a semantic resource child resource or if the ACP Resource has an attribute which points to or refers to a semantic resource. At step 186, service layer 169 may send a SPARQL query to SGS 170. With reference to the first scenario, SPARQL query in step 186 may be used to add new ACP triples (from step 184) or add new ACP semantic triples (from step 185) in SGS 170. For the second scenario, SPARQL query in step 186 may be used to update ACP triples (from step 184) and update ACP semantic triples (from step 185) in SGS 170. For the third scenario, SPARQL query in step 186 may be used to remove ACP triples (from step 184) or remove ACP semantic triples (from step 185) in SGS 170.

At step 187, SGS 170 processes the SPARQL query in step 186. According, SGS 170 will add new ACP Triples and new ACP-Semantic Triples (scenario 1), update existing ACP Triples and ACP-Semantic Triples (scenario 2), or delete existing ACP Triples and ACP-Semantic Triples (scenario 3). At step 188, SGS 170 sends a response to service layer 169. The response may include the SPARQL execution results of step 187.

FIG. 23 illustrates a general procedure for managing semantic triples (and ACP-semantic triples). At step 191, service layer 169 receives a request to operate semantic resource from a requestor 168. Requestor 168 may be an application or another service layer. In a fourth scenario, the request of step 191 may be to create a new semantic resource. The request of step 191 may include the resource representation of the semantic resource to be created. In a fifth scenario, the request of step 191 may be to update an existing semantic resource. Then the request of step 191 may include the value of attributes or child resource representation of the existing semantic resource to be updated. In a sixth scenario, the request of step 191 may be to delete an existing semantic resource. Then the request of step 191 may include the identifier (e.g., name) or URI of the existing semantic resource to be removed.

At step 192, service layer 169 processes the request from step 191. If the request is scenario 4 (e.g., the aforementioned fourth scenario), then service layer 169 creates the requested semantic resources using the resource representation of step 191. If the request is scenario 5 (e.g., the aforementioned fifth scenario), then the service layer 169 updates the requested ACP resource using the attribute value or child resource representation of step 191. If the request is scenario 6 (e.g., the aforementioned sixth scenario), then the service layer 169 updates the requested semantic resource as identified by its identifier or URI of step 191. At step 193, service layer 169 may send a response to requestor 168 to notify it of the execution result of step 192. At step 194, service layer 169 may create new semantic triples dependent on the scenario (e.g., scenario 4 or scenario 5). If scenario 4, then semantic triples may be generated to model the new semantic resource created in step 192. If scenario 5, then semantic triples may be generated to model the updated semantic resource in step 192.

With continued reference of FIG. 23, at step 195, service layer 195 may create new ACP-semantic triples for the fourth scenario or the fifth scenario, if the semantic resource has a semantic resource child resource or if the semantic resource has an attribute which points to or refers to a semantic resource. At step 196, service layer 169 may send a SPARQL query to SGS 170. With reference to the fourth scenario, SPARQL query in step 196 may be used to add new semantic triples (from step 194) and add new ACP-semantic triples (from step 195) in SGS 170. For the fifth scenario, SPARQL query in step 186 may be used to update semantic triples (from step 194) and update ACP-semantic triples (from step 195) in SGS 170. For the sixth scenario, SPARQL query in step 196 may be used to remove semantic triples (from step 194) and remove ACP-semantic triples (from step 195) in SGS 170.

At step 197, SGS 170 processes the SPARQL query in step 196. According, SGS 170 will add new semantic triples and new ACP-Semantic Triples (scenario 4), update existing ACP Triples and ACP-Semantic Triples (scenario 5), or delete existing semantic triples and ACP-Semantic Triples (scenario 6). At step 198, SGS 170 sends a response to service layer 169. The response may include the SPARQL execution results of step 197.

Discussed below is an advanced ACP ontology. In conventional ACP ontology as discussed in oneM2M TR-0007-Study_on_Abstraction_and_Semantics_Enablement-V2.11.0, it only supports semanticDescriptor level access control, which means all SD original triples in the same semanticDescriptor have the same access control policy, because it binds an acp:accessControlPolicy class instance only to a <semanticDescriptor> resource instance via acp:appliedTo property.

A new property acp:appliedToTriple is disclosed for acp:accessControlPolicy class. The following helps to put into context this new property acp:appliedToTriple.

| | | |
|---|---|---|
| acp:appliedToTriple | rdf:type | rdf:property . |
| acp:appliedToTriple | rdf:domain | acp:accessControlPolicy . |
| acp:appliedToTriple | rdf:range | sd:sdOriginalTriple . |

The sd:sdOriginalTriple is an ontology class for defining a single SD Original Triple. The acp:accessControlPolicy is an ontology class to model oneM2M <accessControlPolicy> resources. With this new property (e.g., acp:appliedToTriple), each SD original triple in a <semanticDescriptor> may be separately bound to the acp: accessControlPolicy class instance. This feature allows for the enforcement of access control in the SGS for sematic queries which handle semantic triples from different <semanticDescriptor> resources. In other words, this new property helps to achieve finer granularity such that the different ACPs may be applied to different triples in a <semanticDescriptor> (e.g., triple level ACP). Again, conventionally a service layer may apply to SD (which may include a first triple and second triple, but now as described herein a service layer may apply ACP to triples with a finer granularity.

Figure 24:
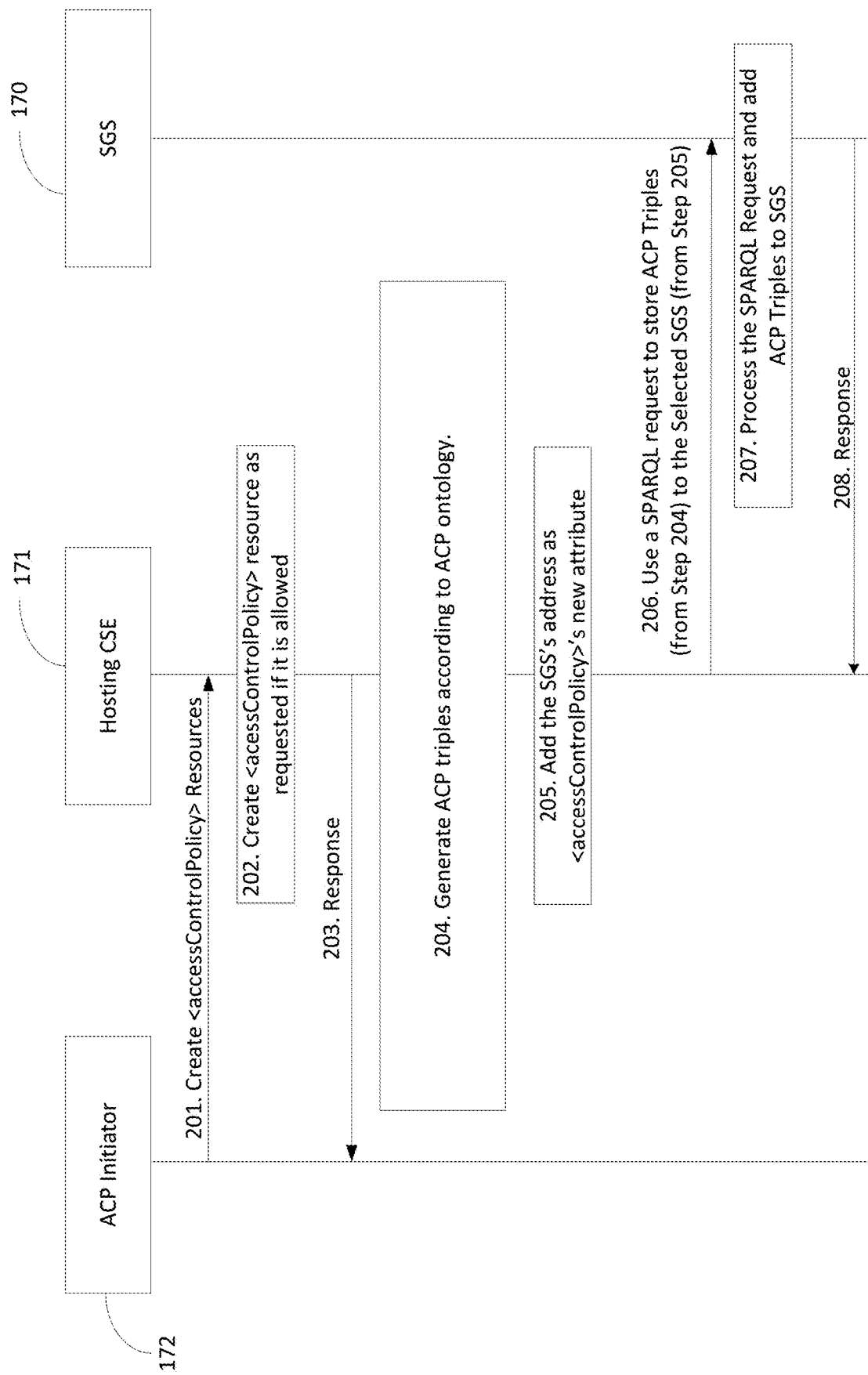
FIG. 24 illustrates exemplary Procedure for Creating ACP Triples in SGS.

Below are considerations with regard to managing ACP Triples. FIG. 24 illustrates a method for creating ACP triples in SGS when an ACP initiator requests to create an <accessControlPolicy> resource at a hosting CSE. At step 201, ACP initiator 172 sends "Create <accessControlPolicy> Resource" request to hosting CSE 171. This message includes the representation of <accessControlPolicy> to be created (e.g., the value of privileges attribute). At step 202, hosting CSE 171 receives the request of step 201 and checks access rights for the ACP initiator to create the resource. If it is allowed, hosting CSE 171 will create the requested <accessControlPolicy> resource accordingly (referred to as <acp1>).

Assumptions associated with step 202 include the following. Assume the URI of the created <accessControlPolicy> is "acp1URI". Also, assume <acp1>'s privileges attribute only has one access control rule (referred it to as acr11) and the URI of accessing the privileges attribute is "acr11URI" although the privileges attribute may include multiple access control rules. FIG. 25 illustrates an example of ACP triples for <acp1> resource. For this example it is assumed that acr11 allows an AE (its ID is "AE-ID-1") to perform DISCOVERY operation. At step 203, hosting CSE 171 sends a response to the ACP initiator to inform it if the request in step 201 is successfully executed. If it is successful, "acp1URI" will be included in the response message of step 203.

At step 204, based on the created <acp1> resource in step 202 and ACP ontology, hosting CSE 171 generates corresponding ACP Triples. The generated ACP triples of step 204 should be able to sufficiently describe each ACP rule as contained in <accessControlPolicy>'s privileges attribute and should also be able to describe the association between each ACP rule and <accessControlPolicy> resource. An example of ACP triples for <acp1> resource created in step 201 is illustrated in FIG. 25. In FIG. 25, the triple on line #1 simply defines prefix "acp" as an example. The prefix "acp" is used in line #2-line #6. In FIG. 25, the triple on line #2 defines a new acp:accessControlPolicy class instance for <acp1> resource created in Step 2. The subject value of this triple (i.e. acp:acp1) is "acp1URI" based on the assumption in Step 2. In other words, based on the subject value of this triple, it is possible to locate the corresponding resource <acp1>. Also, hosting CSE 171 can use "acp1URI" to locate corresponding triples in SGS 170; this is needed when hosting CSE 171 needs to update existing ACP Triples. Basically, ACP triples related to acp1 is stored in SGS and associated with the URI of acp1 (e.g., acp1URI). As a result, if hosting CSE171 knows the URI of acp1 (e.g., acp1URI), it may use it to find all ACP triples corresponding to this URI. So there may be a search of the URI.

In FIG. 25, the triple on line #3 defines that acp:acp1 instance has an associated access control rule acr11. The object value of this triple (i.e. acp:acr11) is "acr11URI" based on the assumption in step 202. In other words, based on the object value of this triple, it is possible to locate the corresponding privileges attribute of <acp1> resource. Also, hosting CSE 171 can use "acr11URI" to locate the corresponding triples in SGS 170; this is needed when hosting CSE 171 needs to update existing ACP Triples. In FIG. 25, the triple on line #4 defines that acp:acr11 (i.e., the object on line #3) is an acp:accessControlRule class instance. In FIG. 25, the triples on line #5 and line #6 give the values of two properties of acp:acr11 based on the assumptions in step 202. Basically, triples on line #4-#6 define the access control rule acr11. If <acp1> has more access control rules, additional access control rules will be defined similarly as line #4-#6.

With continued reference to FIG. 24, at step 205, hosting CSE 171 may add SGS 170's address to the <accessControlPolicy> resource (e.g., <acp1>) created in step 202 in a new attribute. At step 206, hosting CSE 171 sends a SPARQL request to store the ACP Triples created in step 2044 to the selected SGS 170. ACP Triples shown in FIG. 25, as an example, may be included in the SPARQL request. At step 207, SGS 170 receives the SPARQL request, processes it and saves the ACP Triples into its graph store. At step 208, SGS 170 sends a response back to hosting CSE 171 to confirm the request in step 206 is successfully executed.

It should be understood that in oneM2M, access control rules are described in the single attribute privileges of an <accessControlPolicy> resource. In other words, these access control rules may be accessed using the same URI (e.g., " . . . /<accessControlPolicy>/privileges"). However, in ACP ontology, each access control rule is modeled as a different instance which will have a different URI. One way to address this issue is to appendix a sequence number (or the like differentiator) to the URI of privileges attribute as the new URI for each access control rule instance, which will be used in SGS 170. For example, assume the URI for accessing the privileges of an <accessControlPolicy> is privilegesURI and the privileges define three access control rules. Then the URI for each access control rule used in ACP Triples in SGS 170 may be privilegesURI/1, privilegesURI/2, privilegesURI/3, respectively.

Figure 26:
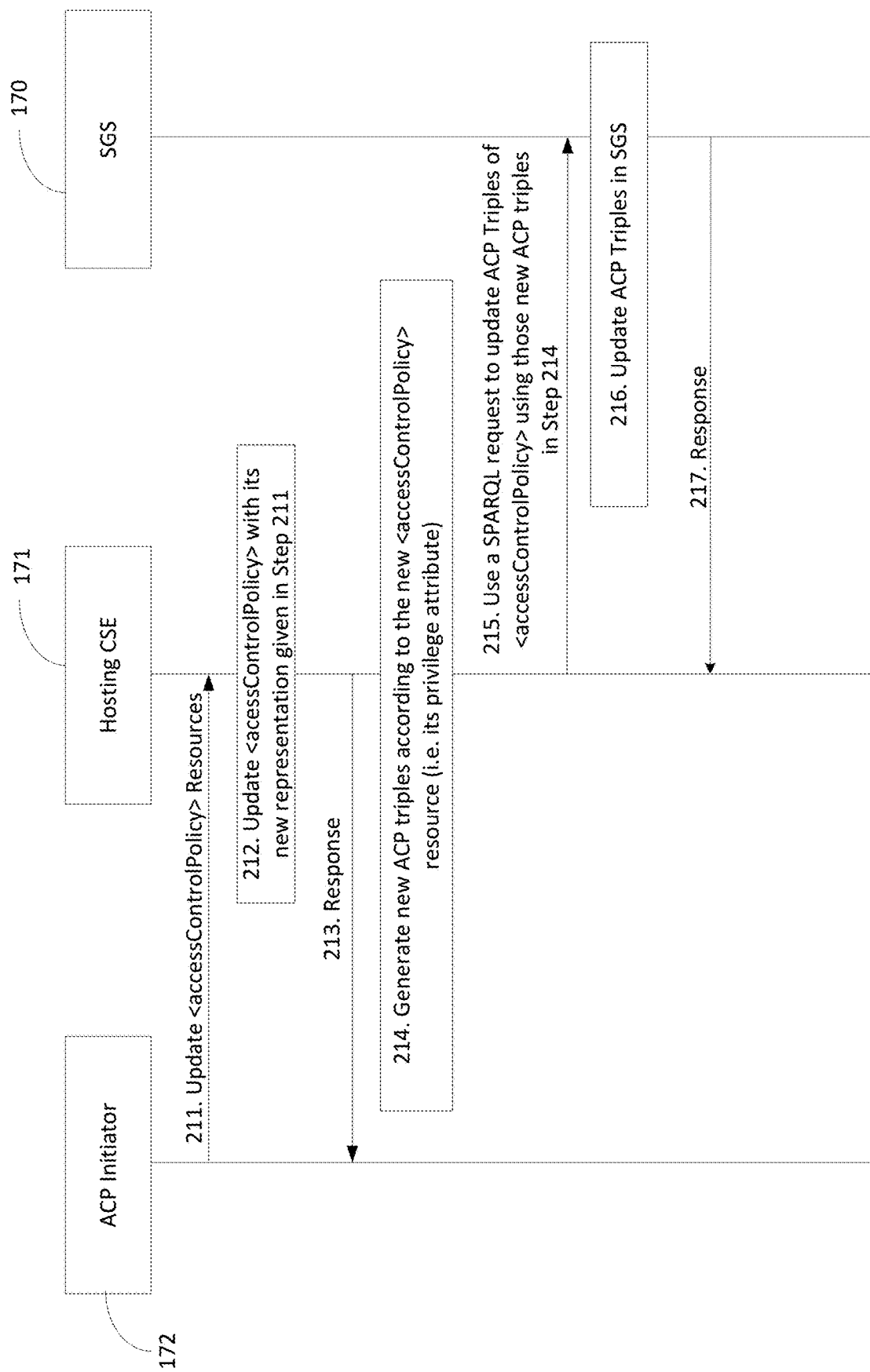
FIG. 26 illustrates exemplary Procedures for Updating ACP Triples in Semantic Graph Store.

FIG. 26 illustrates a method for updating ACP Triples in an SGS 170, which may be triggered by ACP initiator 172 to update the privileges attribute of an existing <accessControlPolicy> resource or by hosting CSE 171 directly. In this example, ACP initiator 172 requests to update the privileges attribute of <acp1> resource which was created according the method of FIG. 24. At step 211, ACP initiator 172 sends "Update <accessControlPolicy> resource" to hosting CSE 171. Here, ACP initiator 172 aims to update the privileges attribute of <acp1> resource with "DISCOVERY" and "RETRIEVE" as the new accessControlOperations. Note that the accessControlOperations of privileges attribute associated with FIG. 24 and FIG. 25 may be considered just "DISCOVERY" only. At step 212, hosting CSE 171 uses the new privileges attribute value given in step 211 to update <acp1> resource. At step 213, hosting CSE 171 sends a response to ACP initiator 172 to inform it whether the requested update in step 211 is successful or not.

At step 214, based on the new value of the privileges attribute of <acp1> resource given in step 211, hosting CSE 171 generates new ACP Triples to reflect this change to the privileges attribute of <acp1> resource. For example, hosting CSE 171 may simply add a new triple "acp:acr11 acp:hasACOperations "RETRIEVE".". Alternatively, hosting CSE 171 may replace the triple on Line #6 in FIG. 25 to the new triple "acp:acr11 acp:hasACOperations "DIS- COVERY", "RETRIEVE".". At step 215, hosting CSE 171 sends a SPARQL request to SGS 170 to update existing ACP triples related to <acp> resource to reflect the change being requested in step 211. As described in step 214, there are multiple options to implement this. As shown below, as a first option, hosting CSE 171 simply adds a new triple. The SPARQL may look like the following:

```
@PREFIX   acp:    <http://accessControlPolicy.org> .
INSERT DATA
{ acp:acrl1   acp:hasACOperations "RETRIEVE" . }
```

In a second option, hosting CSE 171 decides to replace Line #6 in FIG. 25. THE SPARQL may look like the following:

```
@PREFIX   acp:    <http://accessControlPolicy.org> .
DELETE
{ ?acr  acp:hasACOperations   ?operation}
WHERE
{
?acr   acp:hasACOperations   ?operation .
FILTER( ?acr = acp:acrl1 )
}
INSERT DATA
{ acp:acrl1  acp:hasACOperations "DISCOVERY", "RETRIEVE" . }
```

At step 216, SGS 170 processes the received SPARQL request of step 215 and updates the corresponding ACP triples. At step 217, SGS 170 sends a response to hosting CSE 171 to inform it whether the request in step 215 is successfully executed or not.

Figure 27:
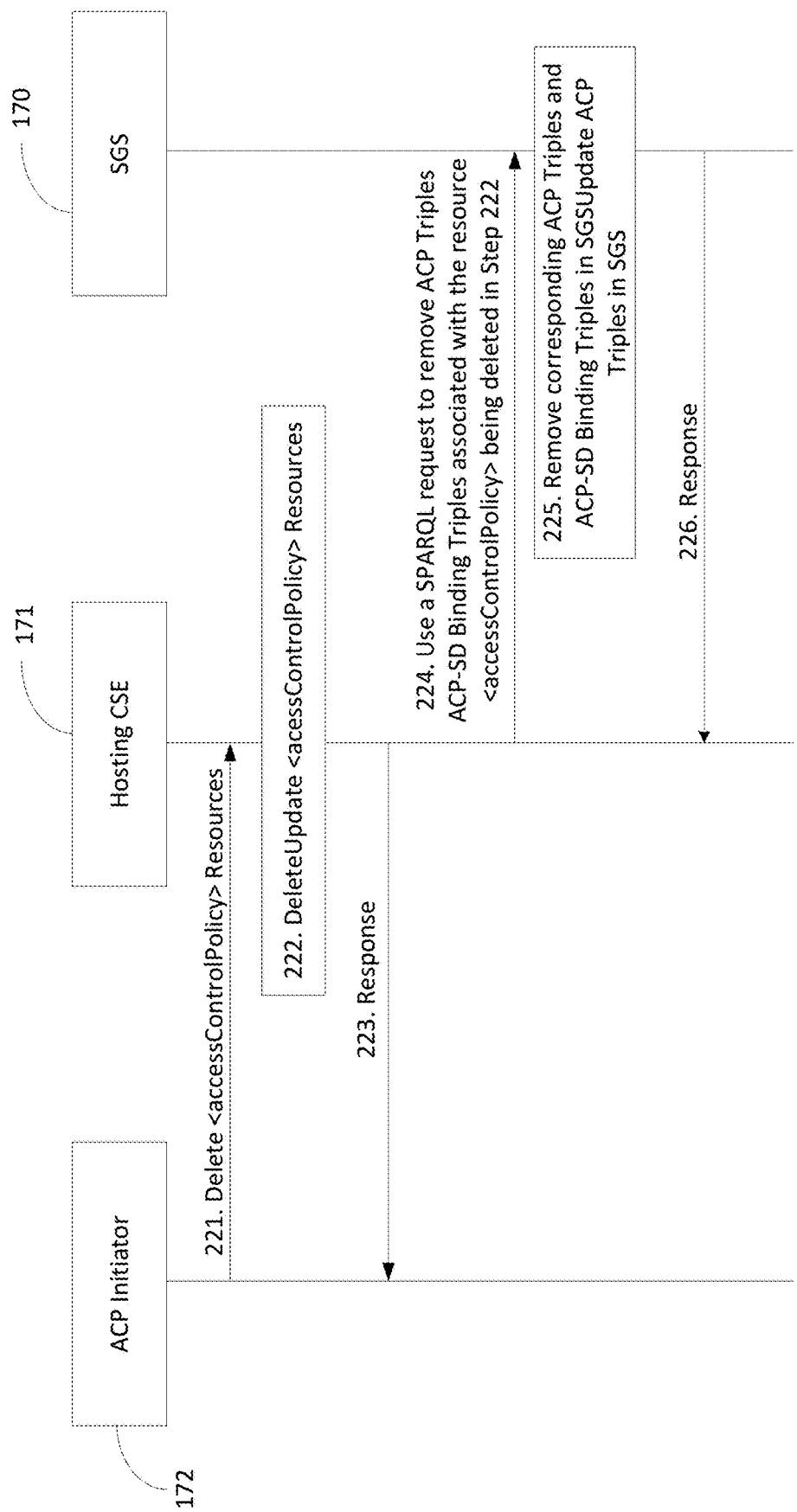
FIG. 27 illustrates exemplary Procedure for Deleting ACP Triples in SGS.

FIG. 27 illustrates the procedure for deleting ACP Triples and ACP-SD Binding Triples in SGS 170, which may be triggered by ACP initiator 172 to delete an existing <accessControlPolicy> resource or by hosting CSE 171 directly. In this example, ACP initiator 172 requests to delete the <acp1> resource which was created according to the method of FIG. 24. At step 221, ACP initiator 172 sends "Delete <accessControlPolicy> Resource" to hosting CSE 171 to delete <acp1> resource. At step 222, hosting CSE 171 uses the new privileges attribute value given in step 221 to update <acp1> resource. At step 223, hosting CSE 171 sends a response to ACP initiator 172 to inform it whether the requested deletion in step 221 is successful or not. At step 224, hosting CSE 171 sends a SPARQL request to SGS 170 to delete existing ACP triples and ACP-SD binding triples related to <acp1> resource. The SPARQL may look like the following:

```
@PREFIX   acp:    <http://accessControlPolicy.org> .
DELETE
{ ?acp     ?p       ?o
  ?s       ?p2      ?acp
  ?acr     ?p1      ?o1
}
WHERE
{
?acp     ?p       ?o
?s       ?p2      ?acp
?acp     acp:hasACPRule    ?acr
?acr     ?p1      ?o1
FILTER ( ?acp = acp:acp1)
}
```

At step 225, SGS 170 processes the received SPARQL request of step 224 and removes the requested ACP triples and ACP-SD binding triples. At step 226, SGS 170 sends a response to hosting CSE 171 to inform it whether the request in step 224 is successfully executed.

Below are additional methods, systems, and apparatuses that may help the performance of management of ACP triples. Discussed previously with regard to FIG. 24-FIG. 27 was how to create, update, or delete ACP triples whenever an <accessControlPolicy> resource is created, updated, or deleted. When such operations to <accessControlPolicy> resources are frequent, the corresponding ACP triple management (e.g., creating, updating or deleting) may cause high overhead to SGS 170. It also may be unnecessary if there is no <semanticDescriptor> resource that is associated with an <accessControlPolicy> resource via <semanticDescriptor>'s accessControlPolicyIDs attribute. The disclosed attributes (e.g., syncFlag, syncTime, sdList) and methods to update the attributes, among other things, which are discussed in more detail herein, may help mitigate frequent and unnecessary ACP triple management.

The syncFlag indicates whether corresponding ACP triples for the <accessControlPolicy> have been stored in and synchronized with SGS 170 (e.g., if syncFlag=1) or not (e.g. if syncFlag=0). The syncTime indicates the last time when ACP triples of this <accessControlPolicy> was synchronized with SGS 170. sdList indicates a list of <semanticDescriptor> resources which may meet the following conditions: 1) their accessControlPolicyIDs attribute points to this <accessControlPolicy> resource; or 2) their corresponding SD original triples or SD relationship triples have been stored in SGS 170.

Hosting CSE 171 dynamically updates the value of these three attributes for each <accessControlPolicy> resource. The default value of syncFlag attribute of an <accessControlPolicy> resource is 0 (i.e., FALSE). When ACP Triples of this <accessControlPolicy> resource are stored to SGS 170 and synchronized with SGS 170, the value of syncFlag attribute may be changed to 1 (i.e., TRUE). Each time <accessControlPolicy> gets updated, hosting CSE 171 first change syncFlag to 0 (i.e., FALSE). After its new ACP triples are stored to SGS 170 and re-synchronized with SGS 170, syncFlag may be changed to 1 (i.e., TRUE) again.

The default value of syncTime attribute of an <accessControlPolicy> resource is zero. After ACP triples of an <accessControlPolicy> resource have been synchronized with SGS 170 (e.g., at time t1), the syncTime attribute of this <accessControlPolicy> resource may be set to t1.

Here, SD Original triples or SD relationship triples of a <semanticDescriptor> resource have been stored in SGS 170. Whenever the accessControlPolicyIDs of this <semanticDescriptor> resource is set (or it uses its parent resource's accessControlPolicyIDs or any system default <accessControlPolicy>), this <semanticDescriptor> resource may be added to the sdList attribute of the corresponding <accessControlPolicy> resources as denoted by the accessControlPolicyIDs (or its parent resource's accessControlPolicyIDs). Whenever the accessControlPolicyIDs of this <semanticDescriptor> resource is removed or changed to empty, this <semanticDescriptor> resource may be removed from the sdList attribute of corresponding <accessControlPolicy> resources as denoted by the accessControlPolicyIDs. When the accessControlPolicyIDs of this <semanticDescriptor> resource is updated, this <semanticDescriptor> resource may be removed from the list in the sdList attribute of old <accessControlPolicy> resources, and added into the sdList attribute of <accessControlPolicy> resources when newly created.

Hosting CSE 171 dynamically managing ACP triples based on syncFlag, syncTime, or sdList attributes is discussed in more detail below. When an <accessControlPolicy> is created for the first time, hosting CSE 171 may not create or store corresponding ACP triples in SGS 170. If so, hosting CSE 171 simply sets its syncFlag=0, syncTime=0, and sdList=empty. When an <accessControlPolicy> is updated at time t2, hosting CSE 171 may perform the following operations: 1) if sdList is empty, do nothing and set syncFlag=0; or 2) if sdList is not empty and syncTime is bigger than zero but smaller than t2, the hosting CSE 171 may use the methods associated with FIG. 26 to update ACP Triples in SGS 170. Then set syncFlag=1 and syncTime=t2. When the sdList attribute of an <accessControlPolicy> resource goes from "empty" to "non-empty," hosting CSE 171 may perform the following operations: 1) if syncFlag=1, do nothing; or 2) if syncFlag=0, hosting CSE 171 may use the methods associated with FIG. 24 or FIG. 25 to creates ACP triples for this <accessControlPolicy> resource and store them to SGS 170. Here, hosting CSE 171 completes this operation at time t3 and then syncFlag=1 and syncTime=t3.

SyncFlag attribute and syncTime attribute of an <accessControlPolicy> resource is updated by the hosting CSE 178 which hosts this <accessControlPolicy> resource. But the sdList attribute of this <accessControlPolicy> may be updated under different cases, such as the following. In a first case, if <semanticDescriptor> resources which use this <accessControlPolicy> resource are stored in this hosting CSE 178 as well, the hosting CSE 178 is responsible for updating sdList. In a second case, if a <semanticDescriptor> resource which use this <accessControlPolicy> resource is stored in a hosting CSE-B, the hosting CSE-B sends a request to the hosting CSE 178 to update the sdList attribute of this <accessControlPolicy> resource (FIG. 28).

Figure 28:
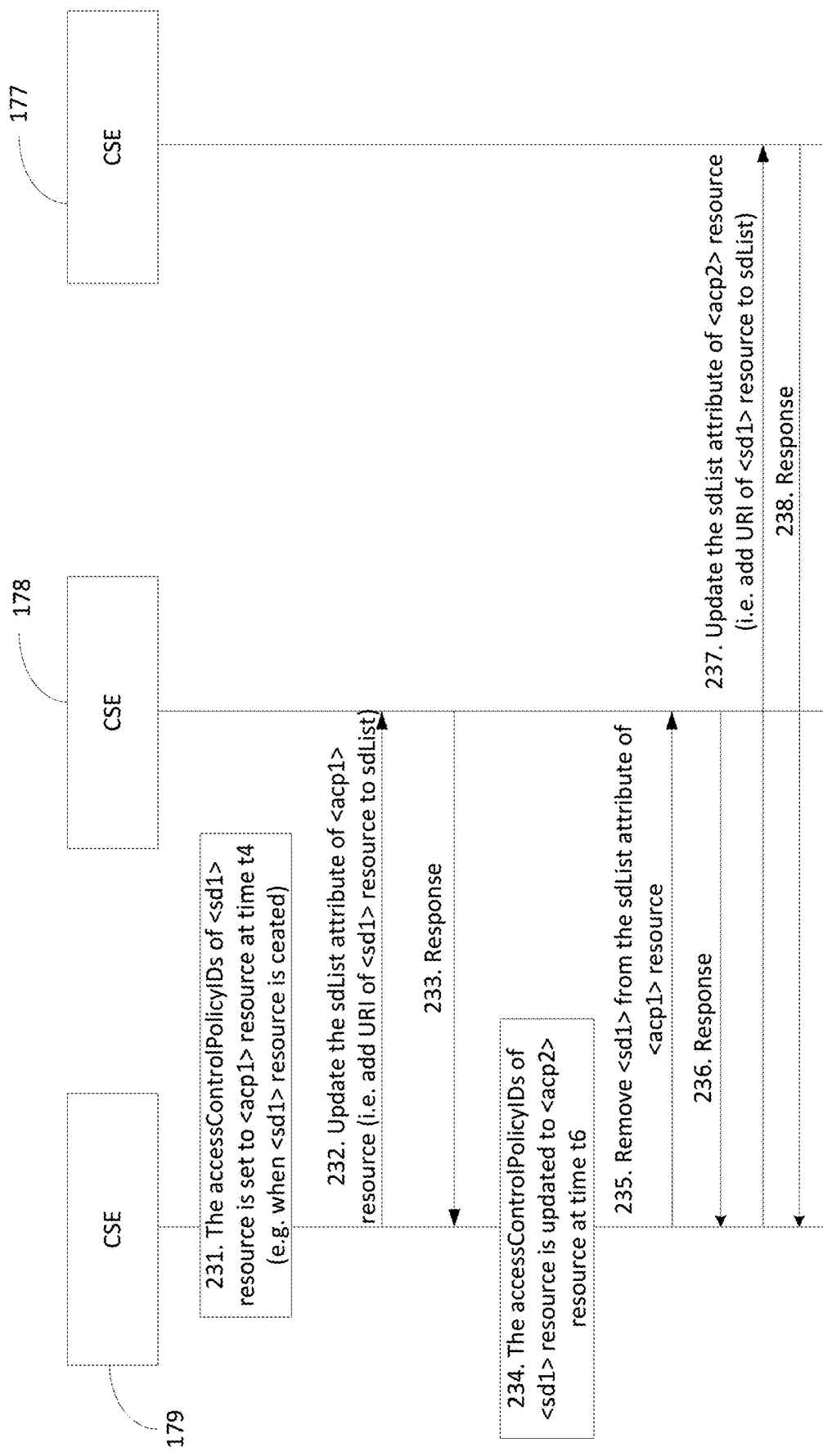
FIG. 28 illustrates exemplary Procedure for Updating sdList Attribute of <accessControlPolicy> Resource.

FIG. 28 illustrates an exemplary method to update sdList attribute of <accessControlPolicy> resource in the context of the aforementioned second case. In this example, the following are given: 1) CSE 179 hosts a <semanticDescriptor> resource (referred to as <sd1>); 2) CSE 178 hosts an <accessControlPolicy> resource (referred to as <acp1>); and 3) CSE 177 hosts an <accessControlPolicy> resource (referred to as <acp2>). At step 231, at time t4, <sd1> resource is created and its accessControlPolicyIDs attribute is set to <acp1> resource. At step 232, CSE 179 sends a request to CSE 178 to update the sdList attribute of <acp1> resource. At step 233, CSE 178 updates the sdList attribute of <acp1> resource accordingly and sends a response back to CSE 179. The response informs CSE179 that the request 232 has been received and processed, and the result of the processing (e.g., success or failure, etc). At step 234, at time t5, the <sd1>'s accessControlPolicyIDs attributes is changed from <acp1> to <acp2>. Accordingly, <sd1> should be removed from <acp1>'s sdList (step 235) and be added to <acp2>'s sdList (step 237). At step 235, CSE 179 sends a request to CSE 178 to remove <sd1> from the sdList attribute of <acp1>. At step 236, CSE 178 removes <sd1> from <acp1>'s sdList attribute and sends a response to CSE 179. The response informs that the request has been received and processed, and the result of the processing (e.g., success or failure, etc). At step 237, CSE 179 sends a request to CSE 177 to add <sd1> to the sdList attribute of <acp2>. At step 238, CSE 177 adds <sd1> to <acp2>'s sdList attribute and sends a response to CSE 179. The response informs that the request has been received and processed, and the result of the processing (e.g., success or failure, etc).

Figure 29:
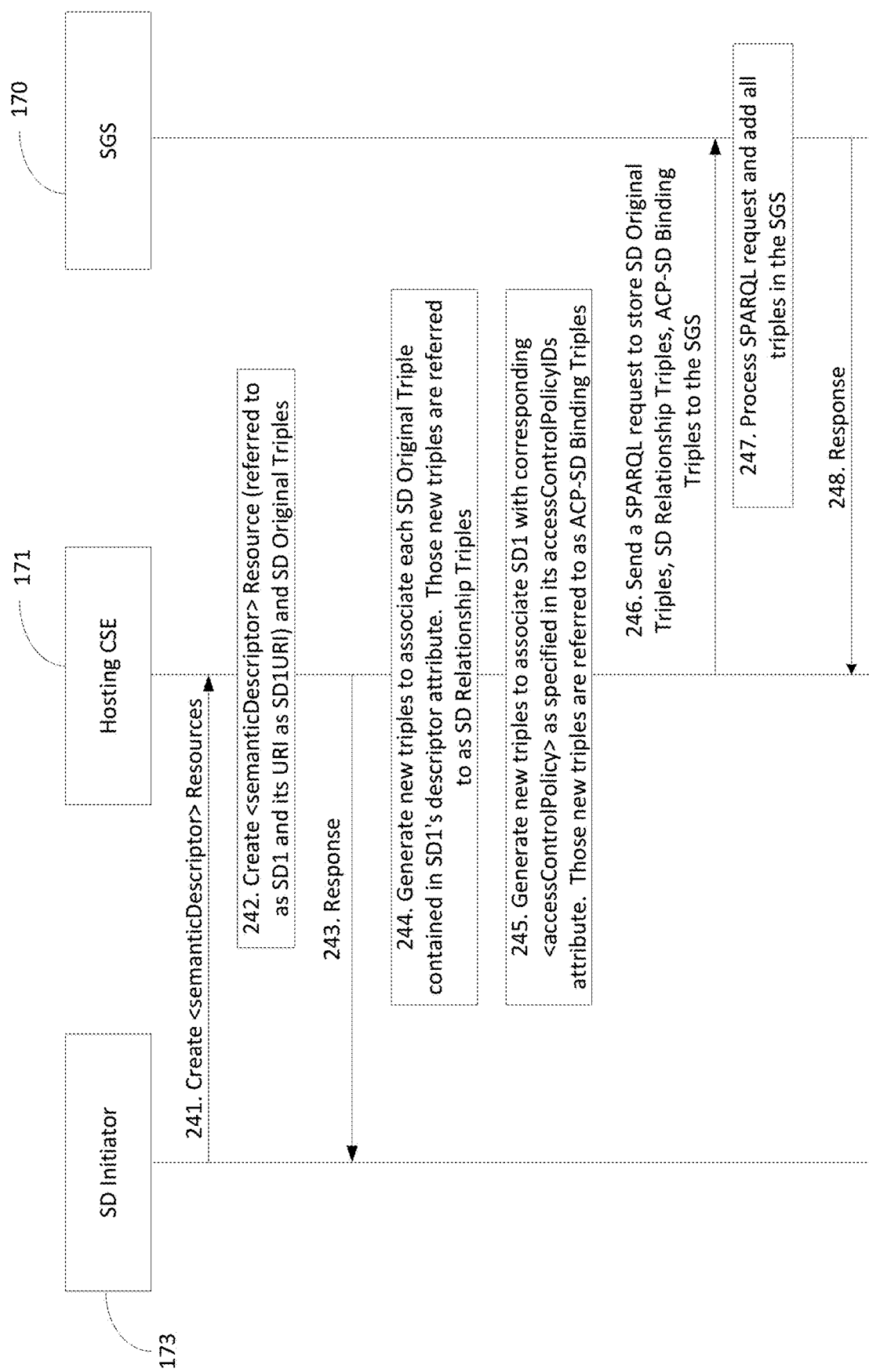
FIG. 29 illustrates exemplary Procedure for Creating SD Relationship Triples and ACP-SD Binding Triples.

Below are considerations with regard to managing (e.g., create, update, delete) triples related to <semanticDescriptor> resources. FIG. 29 illustrates an exemplary method associated with creating ACP-SD binding triples and SD relationship triples in SGS. FIG. 30 illustrates an example of SD Relationship triples. In FIG. 29, SD initiator 173 (e.g., an oneM2M AE or CSE) requests to create a new <semanticDescriptor> resource at hosting CSE 171. After checking the access rights and other related security functions, hosting CSE 171 creates the <semanticDescriptor> resource locally (referred to as SD1 and its URI which is identified here as sd1URI). Then, hosting CSE 171 stores semantic triples as described in the descriptor attribute of SD1 resource to SGS 170. It is noted that hosting CSE 171 generates new SD relationship triples and ACP-SD binding triples and store them to SGS 170 as well. Note that if SD1 has no accessControlPolicyIDs attribute, ACP-SD binding triples may not be generated. With that said, with reference to FIG. 29, at step 241, SD initiator 173 sends a "Create <semanticDescriptor> Resource" request to hosting CSE 171. Here, the value of descriptor attribute and accessControlPolicyIDs attribute of <semanticDescriptor> resource is given in the request message. In this example, the descriptor attribute includes only one SD Original Triple "S1 P1 O1."; here S1 is the subject of this triple, P1 is the predicate of this triple, and O1 is the object of this triple. In addition, the value of accessControlPolicyIDs is "acp1URI" (as associated with FIG. 24 and FIG. 25 herein). In other words, the access control policy acp1 is applied for controlling access to this <semanticDescriptor> resource.

With continued reference to FIG. 29, at step 242, hosting CSE 171 accordingly creates the <semanticDescriptor> resource (referred to as sd1). The URI of sd1 is sd1URI. At step 243, hosting CSE 171 sends a response to SD initiator 173 to inform it if the requested <semanticDescriptor> resource in step 241 was successfully created. At step 244, according to the SD original triple included in the descriptor attribute of sd1, hosting CSE 171 generates SD relationship triples. According to step 241, there is only one SD Original Triple. Accordingly, the SD relationship triples shown in FIG. 30 are generated. At step 245, since sd1's accessControlPolicyIDs attribute points to the acp1 resource, hosting CSE 171 generates the ACP-SD binding triples as shown in FIG. 31. The Line #5 of FIG. 31 shows that the access control policy "acp:acp1" in SGS 170 is applied to the semantic descriptor "sd:sd1" in SGS 170. At step 245, hosting CSE 171 sends a SPARQL request to SGS 170 to store these SD relationship triples and ACP-SD binding triples to SGS 170. At step 247, SGS 170 processes the SPARQL request and stores corresponding SD relationship triples and ACP-SD binding triples in SGS 170. At step 248, SGS 170 sends a response message to hosting CSE 171 to inform it if the SPARQL request in step 246 is successfully executed. In the context of FIG. 29, it is possible that the <semanticDescriptor> resource sd1 being created in step 242 does not have accessControlPolicyIDs attribute being set or its accessControlPolicyIDs attribute does not correspond to a valid <accessControlPolicy> resource. In this case, if the accessControlPolicyIDs attribute of sd1's parent resource is used, new ACP-SD binding triples will also be generated using its parent resource's accessControlPolicyIDs attribute. If the system default access privileges are applied, new ACP-SD binding triples will be generated based on this default privileges.

Figure 32:
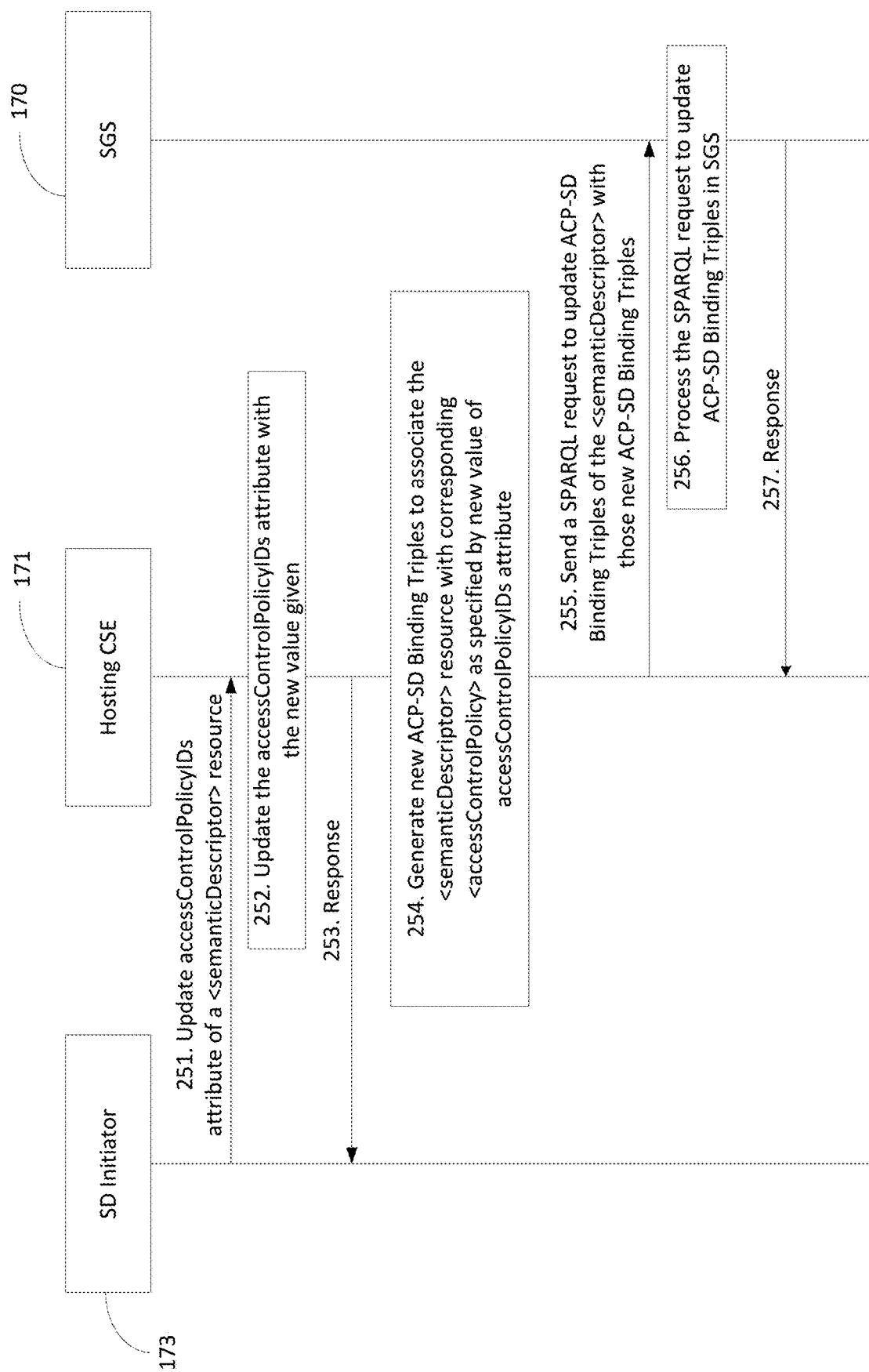
FIG. 32 illustrates exemplary Procedure for Updating ACP-SD Binding Triples in the SGS.

FIG. 32 illustrates an exemplary method associated with updating ACP-SD Binding Triples when the accessControlPolicyIDs attribute of a <semanticDescriptor> resource is changed. In this example, the accessControlPolicyIDs of the sd1 resource created in association with FIG. 29 is changed from acp1 to another <accessControlPolicy> resource (referred to as acp2). Also in this example, the ACP Triples for the resource acp2 has been created as follows:

| @PREFIX | acp: | <http://accessControlPolicy.org> . |
|---|---|---|
| acp:acp2 | rdf:type | acp:accessControlPolicy . |
| acp:acp2 | acp:hasACPRule | acp:acr21 . |
| acp:acr21 | rdf:type | acp:accessControlRule . |
| acp:acr21 | acp:hasACOriginator | "AE-ID-2" . |
| acp:acr21 | acp:hasACOperations | "RETRIEVE" . |

With reference to FIG. 32, at step 251, SD initiator 173 sends a request to update the resource sd1's accessControlPolicyIDs from the URI of the resource acp1 to the URI of the resource acp2. The URI of the resource acp2 (e.g., acp2URI) is included in this request. The URI of the resource sd1 (i.e., sd1URI) is also included in the request of step 251. At step 252, hosting CSE 171 checks access rights. If it is allowed, hosting CSE 171 updates sd1's accessControlPolicyIDs with acp2's URI given in step 251. At step 253, hosting CSE 171 sends a response back to SD initiator 173 to inform it if the request at step 251 is successful or not. At step 254, since the sd1's accessControlPolicyIDs is changed, hosting CSE 171 generates a new ACP-SD Binding Triple ("acp:acp2 acp:appliedTo sd:sd1") to reflect this change. This new ACP-SD binding triple will replace the old ACP-SD Binding Triple (e.g., "acp:acp1 acp:appliedTo sd:sd1")

| (new ACP-SD Binding Triple) acp:acp2 | acp:appliedTo | sd:sd1 |
|---|---|---|
| (old ACP-SD Binding Triple) acp:acp1 | acp:appliedTo | sd:sd1 |

At step 255, hosting CSE 171 sends an SPARQL request to replace the old ACP-SD binding triple in SGS 170 with the new ACP-SD binding triple as shown in above step 254. This SPARQL request may look like below:

```
@PREFIX acp: <http://accessControlPolicy.org> .
@PREFIX sd: <http:semanticDescriptor.org> .
DELETE
{ ?acp acp:appliedTo sd:sd1 }
WHERE
{
?acp acp:appliedTo sd:sd1
}
INSERT DATA
{ acp:acp2 acp:appliedTo sd:sd1 . }
```

At step 256, SGS 170 processes the SPARQL request and updates the specified ACP-SD binding triples in Step 5. At step 257, SGS 170 sends a response to hosting CSE 171 to inform it if the SPARQL request in step 255 is successfully performed. It should be understood that with reference to FIG. 32, if the accessControlPolicyIDs attribute of the <semanticDescriptor> resource was empty to start with, its parent resource's accessControlPolicyIDs should be enforced. The hosting CSE keeps track of that and applies this step based on updates to the accessControlPolicyIDs attribute of the parent resource.

Figure 33:
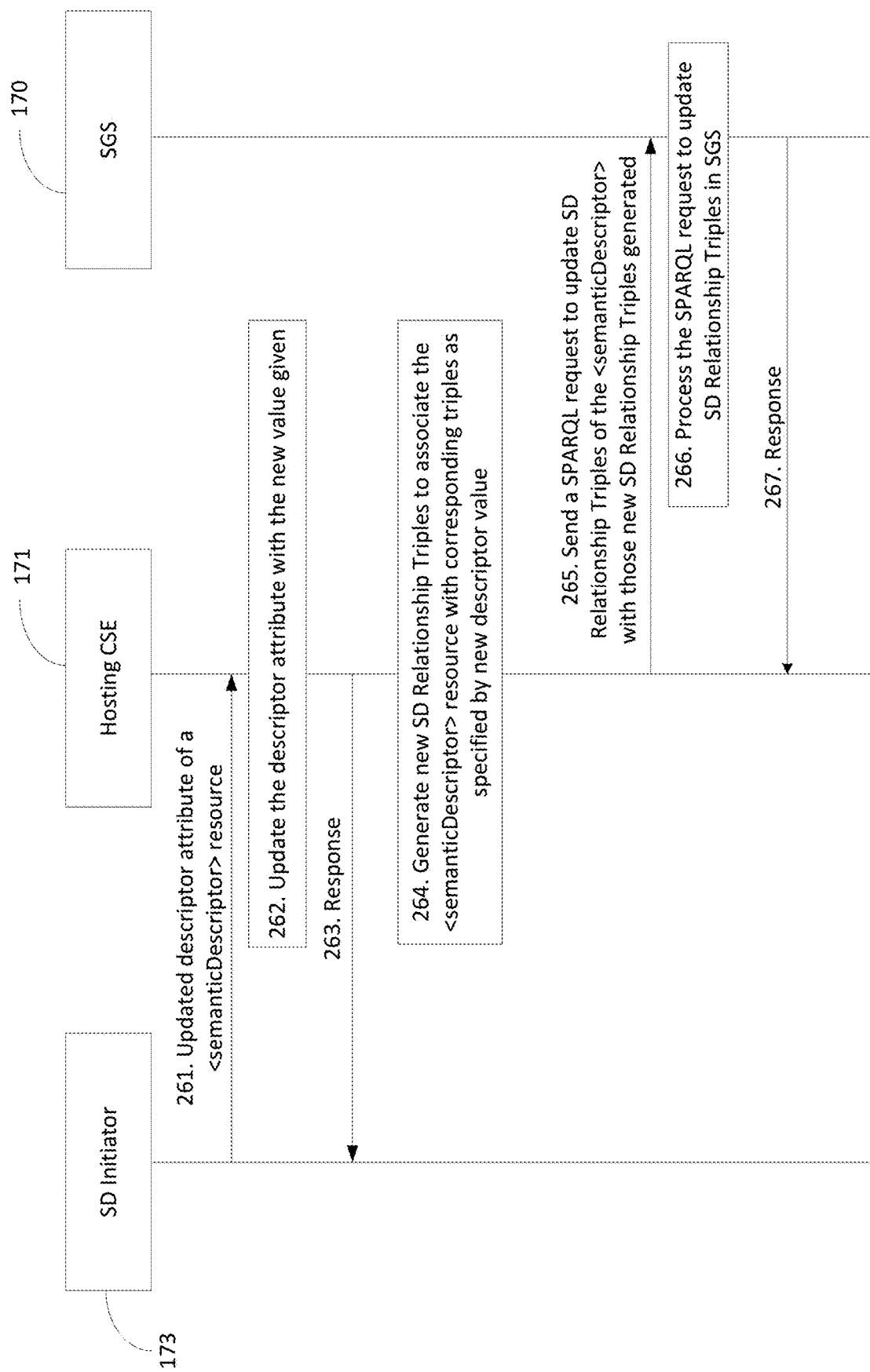
FIG. 33 illustrates exemplary Procedure for Updating SD Relationship Triples in the SGS.

FIG. 33 illustrates an exemplary method associated with updating SD relationship triples when the descriptor attribute of a <semanticDescriptor> resource is changed. In this example, the descriptor of the sd1 resource created in association with FIG. 29 is changed to have two SD Original Triples (Old one—"S1 P1 O1"; New one—"S2 P2 O2"). Note that the update of triples in the descriptor attribute may be performed also by targeting the semanticOpExec attribute of the <semanticDescriptor> parent resource with a SPARQL query. When this SPARQL query is executed, new SD original triples may be added to the descriptor attribute of the <semanticDescriptor> resource. Accordingly, step 264-Step 267 of FIG. 33 is performed. More specifically, SPARQL Update may include DELETE or ADD operations, so the SD relationship triples associated with the old original triples will be deleted, and then new SD relationship triples are created to associate with the new original triples.

With reference to FIG. 33, at step 261, SD initiator 173 sends a request to update the resource sd1's descriptor to include one new SD original triple (i.e. "S2 P2 O2"). The URI of the resource sd1 (e.g., sd1URI) may also be included in this request. At step 262, hosting CSE 171 checks access rights. If it is allowed, hosting CSE 171 updates sd1's descriptor attribute by adding one new SD Original Triple (i.e., "S2 P2 O2"). At step 263, hosting CSE 171 sends a response back to SD initiator 173 to inform it if the request in Step 1 is successful or not. At step 264, since the sd1's descriptor attribute is changed, hosting CSE 171 generates new SD relationship triples below to reflect this change.

| sd:tripleInstance12 | rdf:type | sd:sdOriginalTriple . |
|---|---|---|
| sd:tripleInstance12 | sd:describedIn | sd:sd1 . |
| sd:tripleInstance12 | sd:hasSubject | sd:S2 . |
| sd:tripleInstance12 | sd:hasPropertysd:P2 . | |
| sd:tripleInstance12 | sd:hasObject | sd:O2 . |

At step 265, hosting CSE 171 sends a SPARQL request to replace old SD relationship triples or add new SD relationship triple in SGS 170 with the new SD relationship triple generated in step 264. This SPARQL request may look like below, in which hosting CSE 171 simply adds a new triple.

```
@PREFIX acp: <http://accessControlPolicy.org> .
@PREFIX sd:  <http://semanticDescriptor.org> .
INSERT DATA
{ sd:tripleInstance12  rdf:type            sd:sdOriginalTriple .
  sd:tripleInstance12  sd:describedIn      sd:sd1 .
  sd:tripleInstance12  sd:hasSubject       sd:S2 .
  sd:tripleInstance12  sd:hasPropertysd:P2 .
  sd:tripleInstance12  sd:hasObject        sd:O2 .
}
```

At step 266, SGS 170 processes the SPARQL request and adds new SD relationship triples included in step 265. At step 267, SGS 170 sends a response to hosting CSE 171 to inform it if the SPARQL request in step 265 is successfully performed. Note that if an old SD original triple is removed or updated by a new SD Original Triple, the corresponding SD Relationship Triples related to this old SD Original Triple will be removed from SGS 170.

Figure 34:
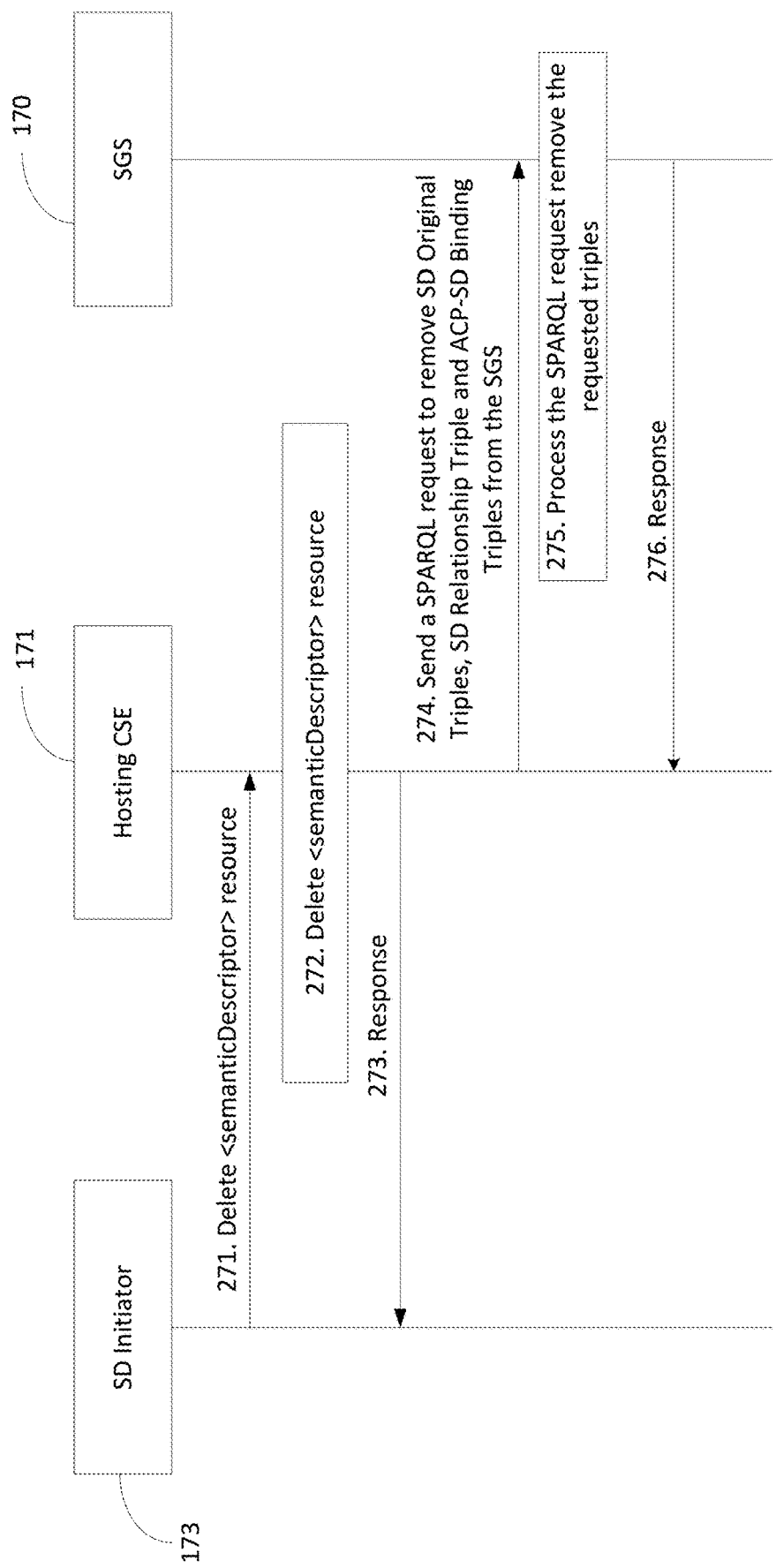
FIG. 34 illustrates exemplary Procedure for Deleting SD Relationship Triples and ACP-SD Binding Triples from the SGS.

FIG. 34 illustrates an exemplary method for deleting SD Relationship Triples and ACP-SD Binding Triples from SGS 170, which may be triggered by the Initiating AE/CSE or hosting CSE 171 to delete a <semanticDescriptor> resource. In this example, sd1 resource created in in association with FIG. 29 is removed. Note that semanticOpExec attribute of a <semanticDescriptor> resource includes a SPARQL query; if this SPARQL query is executed, existing SD Original Triples may be deleted from the descriptor attribute of the <semanticDescriptor> resource; accordingly, step 274-step 276 of FIG. 34 will be performed.

At step 271, SD initiator 173 sends "Delete <semanticDescriptor> Resource" to hosting CSE 171 to delete sd1 resource. The URI of sd1 resource (e.g., sd1URI) is included in this request. At step 272, hosting CSE 171 deletes sd1 resource locally. At step 273, hosting CSE 171 sends a response to SD initiator 173 to inform it if the deletion request in step 271 is successful. At step 274, hosting CSE 171 sends a SPARQL request to SGS 170 to remove SD relationship triples and ACP-SD binding triples related to sd1 resource. The SPARQL may look like the following:

```
@PREFIX acp:    <http://accessControlPolicy.org> .
@PREFIX sd:     <http:semanticDescriptor.org> .
DELETE
{ ?sd  ?p   ?o
  ?tripleInstance      ?p1  ?o1
  ?acp  acp:AppliedTo?sd
}
WHERE
{
  ?sd   ?p   ?o.
  ?tripleInstance ?p1  ?o1.
  ?tripleInstance sd:describedIn ?sd .
  ?acp   acp:AppliedTo?sd
  FILTER ( ?sd = sd:sd1)
}
```

At step 275, SGS 170 processes the SPARQL request in step 274 and removes corresponding SD Relationship Triples and ACP-SD Binding Triples. At step 276, SGS 170 sends a response to hosting CSE 171 to inform it if the SPARQL request in step 274 is successfully performed.

Figure 35:
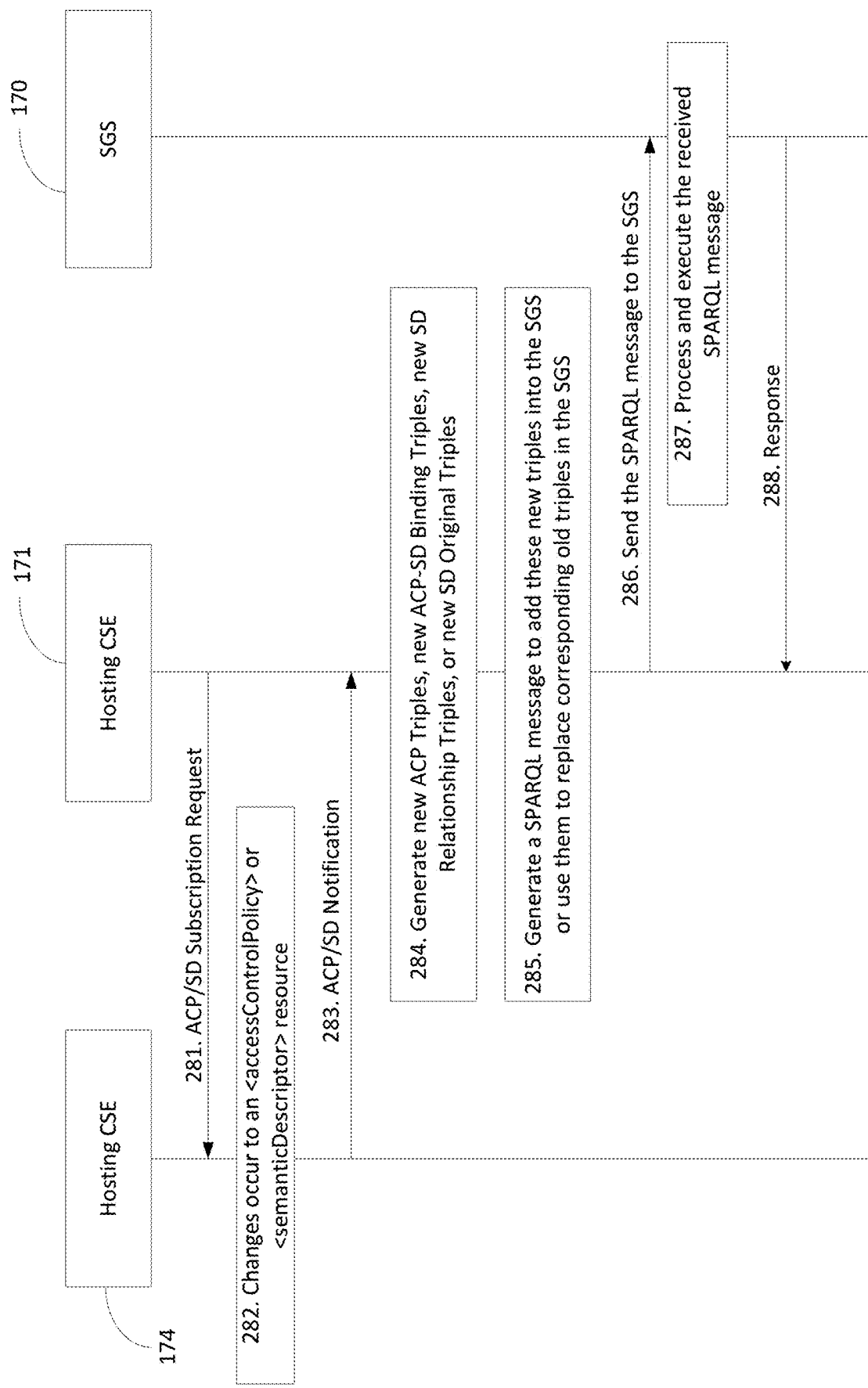
FIG. 35 illustrates exemplary Procedure for Proxy-based Management of ACP-related and SD-related Triples.

FIG. 35 illustrates an exemplary method of proxy-based management of ACP-related and SD-related triples. Sometimes, hosting CSE 171 may not support SPARQL interface and this makes it difficult to perform direct interactions with SGS 170. Instead, this hosting CSE 171 may leverage other hosting CSE 171s which may directly interact with SGS 170 to manage ACP-related triples and SD-related triples on its behalf. FIG. 35 illustrates such as example where: 1) hosting CSE 171 supports SPARQL interface and have direct interaction with SGS 170; 2) hosting CSE 174 does not support SPARQL interface and cannot not talk to SGS 170 directly; and 3) the hosting CSE 174 leverages hosting CSE 171 as a proxy to manage ACP-related and SD-related Triples which are related to <accessControlPolicy> or <semanticDescriptor> resources hosted at hosting CSE 174.

With reference to FIG. 35, at step 281, hosting CSE 171 sends "ACP/SD Subscription Request" to hosting CSE 174. This message may inform hosting CSE 174 that an automatic notification should be sent to hosting CSE 171 if there is a change to <accessControlPolicy> or <semanticDescriptor> messages hosted at hosting CSE 174. At step 282, changes occur to an <accessControlPolicy> or <semanticDescriptor> resource. At step 283, hosting CSE 174 sends "ACP/SD Notification" to the hosting CSE 171. This message includes the changes to an <accessControlPolicy> or <semanticDescriptor> resource. For example, it may be the representation of a new <accessControlPolicy> the new value of privileges attribute of <accessControlPolicy>, the representation of a new <semanticDescriptor>, or the new value of descriptor attribute of <semanticDescriptor>. At step 284, hosting CSE 171 generates some new triples (e.g., new ACP triples, new ACP-SD Binding triples, new SD Relationship triples, or new SD original triples) dependent on which changes are received at step 283. Details have been discussed herein with regard to managing ACP triples and managing SD-related triples.

With continued reference to FIG. 35, at step 285, the hosting CSE 171 generates a SPARQL message to add these new triples from step 284 into SGS 170 or use them to replace corresponding old triples in SGS 170. Details have been discussed herein with regard to managing ACP triples and managing SD-related triples. At step 286, hosting CSE 171 sends the SPARQL message from step 285 to SGS 170. At step 287, SGS 170 processes the received SPARQL message. At step 288, SGS 170 sends a response to the hosting CSE 171. The response informs the hosting CSE 171 to if the SPARQL request in Step 286 is successfully performed or not.

Figure 36:
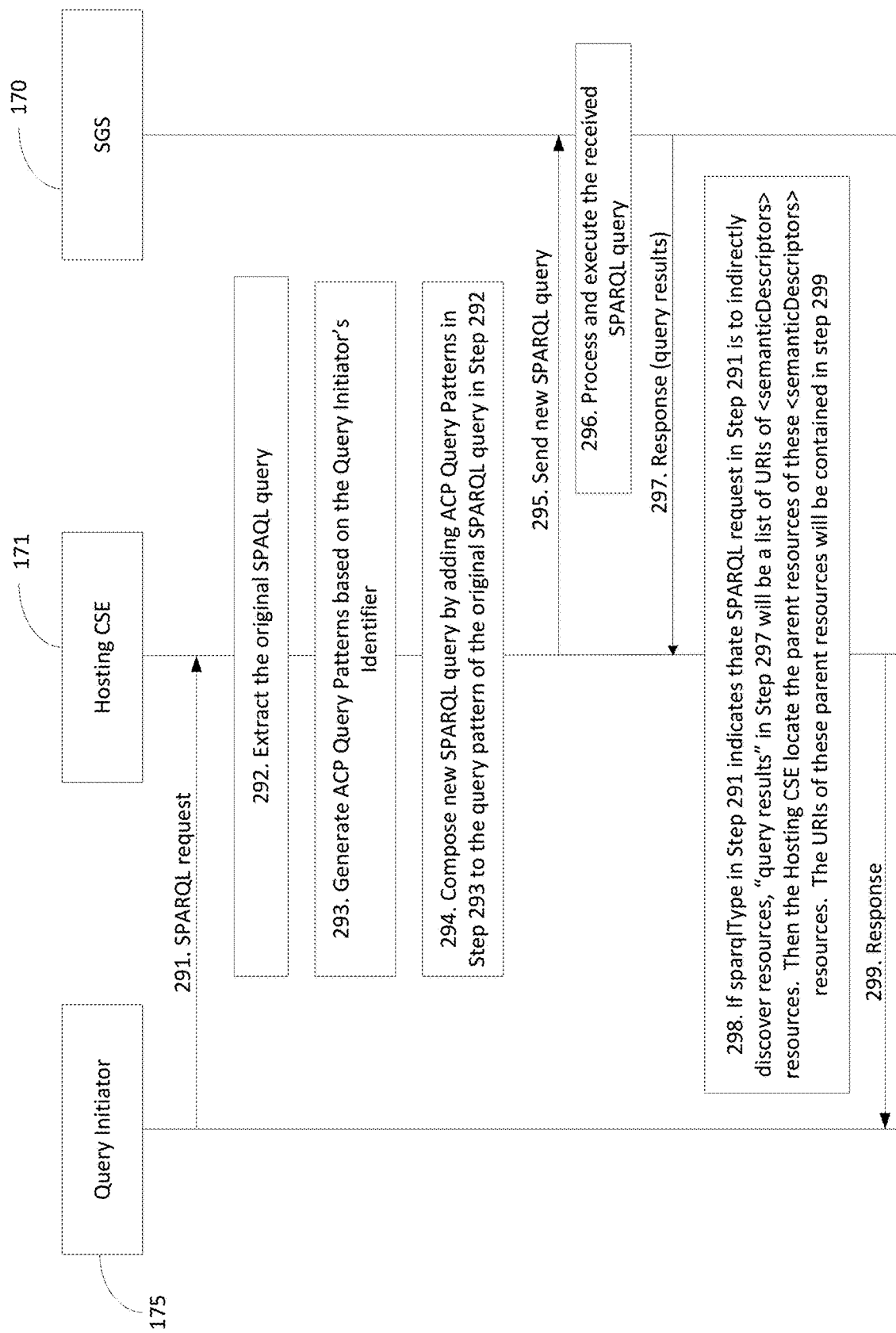
FIG. 36 illustrates exemplary Procedure for Performing Semantic Queries with Access Control in the SGS.

FIG. 36 illustrates an exemplary method for performing semantic queries over a SGS with access control. At step 291, query initiator 175 (e.g., a oneM2M AE or CSE) sends a SPARQL request or a RESTful retrieve operation which includes a SPARQL request to hosting CSE 171. In this example, the following are considered: 1) the request of step 291 is for "DISCOVERY" operation; and 2) query initiator 175 is a oneM2M AE and its identifier is "AE-ID-1". The query initiator 175's identifier is included in this request message of step 291. The request of step 291 may include a new parameter sparqlType to indicate if this request is: 1) to directly discover triples or information included in <semanticDescriptor> resources (e.g. sparqlType=1); or 2) to indirectly discover resources which child-resources <semanticDescriptor> meet the query pattern in the SPARQL request (e.g., sparqlType=2).

With continued reference to FIG. 36, at step 291, hosting CSE 171 extracts the SPARQL query message from the received request in step 291. At step 293, hosting CSE 171 generates the following ACP Query Patterns based on the query initiator 175's identifier included in step 291.

| | | |
|---|---|---|
| ?accessControlPolicy | acp:hasACPRule | ?accessControlRule . |
| ?accessControlRule | acp:hasACOriginator | "AE-ID-1" . |
| ?accessControlRule | acp:hasACOperations | "DISCOVERY" . |
| ?accessControlPolicy | acp:appliedTo | ?semanticDescriptor . |
| ?tripleInstance | sd:describedIn | ?semanticDescriptor . |

At step 294, hosting CSE 171 adds the ACP query patterns to the SPARQ message extracted in step 292. If the request in step 291 is a RESTful operation, hosting CSE 171 generally converts RESTful operation message from step 291 to a standard SPARQL message. It is understood herein that if step 293 and step 294 are not done, then the SGS may not know which SPARQL query is from which initiator. If steps 293 and 294 were skipped, then original SPARQL request would be sent in step 295, and so SGS 170 does not know that this query is from which initiator, and then it may not enforce the proper access control policy.

At step 295, hosting CSE 171 sends the new SPARQL message to SGS 170. At step 296, SGS 170 processes and executes the received SPARQL message. At step 297, SGS 170 sends a response with query results to hosting CSE 171. If sparqlType in step 291 indicates the request in step 291 is to discover resources, the query results include a list of <semanticDescriptor> resources. Otherwise, the query results include values of selected variables as shown in the SELECT result clause of SPARQL message included in step 291.

At step 298, if sparqlType in Step 1 indicates that the SPARQL request in step 291 is to indirectly discover resources (e.g., sparqlType=2), "query results" in step 297 is a list of URIs of <semanticDescriptor> resources. Then this step 298 may be required for hosting CSE 171 to locate the parent resources of these <semanticDescriptor> resources. The URIs of these parent resources may be included in the response of step 299. In this step 298, hosting CSE 171 converts the received response in step 297 to a response message for the request in step 291. In step 298, hosting CSE 171 1) locates parent resources of <semanticDescriptors> resources which are returned as query result in step 297; or 2) simply accepts the query result in step 297. Which action to do may be dependent on the sparqlType parameter contained in step 291. The format of the response message for the request in step 291 may be different than the format of received response in step 297. At step 299, hosting CSE 171 sends results to the query initiator 175 as a response to the request in step 291. The results may include one of the following: 1) the list of parent resources as identified in step 298, if step 298 is performed; or 2) the query results as included in step 297, if step 298 is not performed. An implementation option for this method of FIG. 36 may use the information provided by sparqlType as follows: 1) if sparqlType=1 in step 291, hosting CSE 171 sends it to SGS 170 to be processed as query as shown in FIG. 36; or 2) if sparqlType=2 in step 291, hosting CSE 171 may alternatively process the request message in step 291 locally as discovery based on direct access control in the resource tree without contacting SGS 170.

Below are additional examples in consideration of oneM2M. Table 8 provides three attributes that may be used, which are discussed herein in more detail.

TABLE 8

New Attributes of <accessControlPolicy> Resource

| Attributes of <accessControlPolicy> | Description |
| --- | --- |
| syncFlag | Indicates if the corresponding ACP triples of this <accessControlPolicy> resource is created and synchronized with the SGS. |
| syncTime | Indicates the latest time when the corresponding ACP triples of this <accessControlPolicy> resource is synchronized with the SGS. |
| sdList | Includes a list of identifiers of <semanticDescriptor> resources, which accessControlPolicyIDs points to this <accessControlPolicy> resource. |

For oneM2m there may be new request parameters, such as sparqlType. The sparqlType is proposed as a new parameter which may be included in an oneM2M request message. sparqlType indicates if SPARQL message included in this request is to discover oneM2M resources or to query triples and related information as included in <semanticDescriptor> resources. Whenever the request message includes a SPARQL message, sparqlType may be included in the request as well. As an example, the values of sparqlType may be set as follows:
  sparqlType=0: To discover oneM2M resources based on semantic information included in their child resource <semanticDescriptor>.
  sparqlType=1: To discover semantic information included in <semanticDescriptor> resources.

Figure 37:
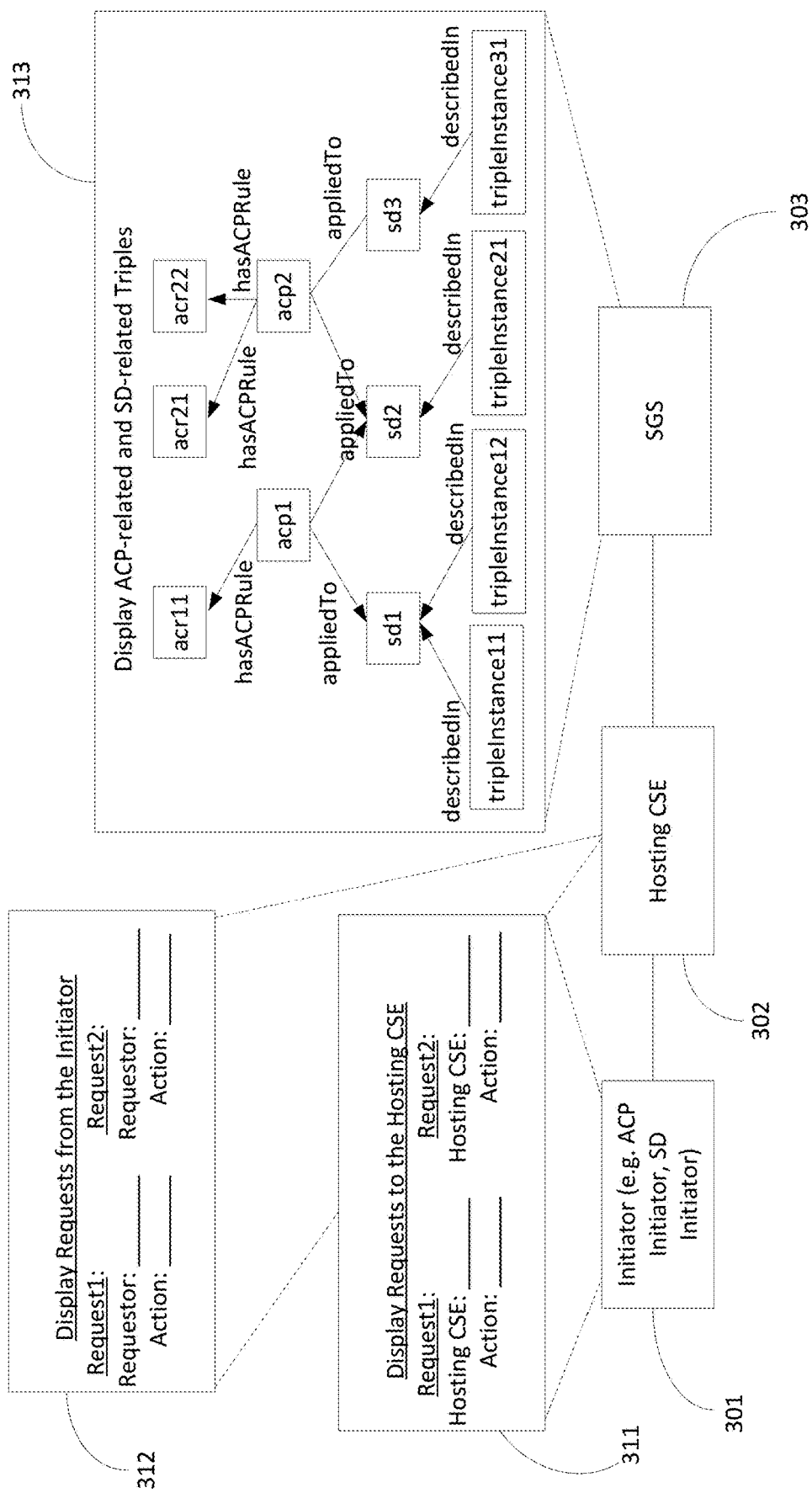
FIG. 37 illustrates exemplary Use Interfaces.

FIG. 37 illustrates exemplary user interfaces for the Initiating AE/CSE (initiator 301), hosting CSE 302, and SGS 303. Use interface for initiator 301 (e.g., ACP initiator 172, SD initiator 173) is designed to display requests sent to hosting CSE 302, as shown in block 311. For each request that is sent the shown parameters may be displayed. The parameter "hosting CSE" shows the address of hosting CSE 302 and the parameter "Action" shows the action represented by the request (e.g. Create an <accessCotrolPolicy> resource, Update an <accessControlPolicy> resource, Delete an <accessControlPolicy> resource, Create a <semanticDescriptor> resource, Update the descriptor attribute of a <semanticDescriptor> resource, Update the accessControlPolicyIDs attribute of a <semanticDescriptor> resource, Delete a <semanticDescriptor> resource).

With continued reference to FIG. 37, the user interface 312 of hosting CSE 302 may be designed to display requests received from initiator 301. For each request that is sent, the parameters as shown in block 312 may be displayed. The parameter "Requestor" stands for the address of initiator 301 and the parameter "Action" shows the action represented by the request (e.g., Create an <accessCotrolPolicy> resource, Update an <accessControlPolicy> resource, Delete an <accessControlPolicy> resource, Create a <semanticDescriptor> resource, Update the descriptor attribute of a <semanticDescriptor> resource, Update the accessControlPolicyIDs attribute of a <semanticDescriptor> resource, Delete a <semanticDescriptor> resource). The user interface 313 for SGS 170 may be designed to show the relationship among ACP-related and SD-related triples in graph.

Figure 38:
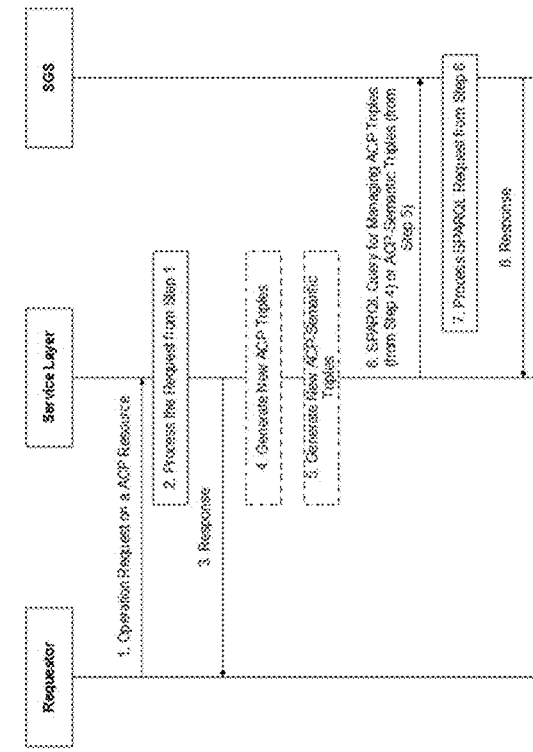
FIG. 38 illustrates an exemplary display (e.g., graphical user interface) that may be generated based on the methods and systems discussed herein.

FIG. 38 illustrates an exemplary display (e.g., graphical user interface) that may be generated based on the methods and systems discussed herein. Display interface 901 (e.g., touch screen display) may provide text in block 902 associated with access control policy synchronization or other semantics matters discussed herein, such as the parameters of Table 7 and Table 8. In another example, progress of any of the steps (e.g., sent messages or success of steps) discussed herein may be displayed in block 902. In addition, graphical output 903 may be displayed on display interface 901. Graphical output 903 may be the topology of the devices in access control policy synchronization or other semantics matters discussed herein, or a graphical output of the progress of any method or systems discussed herein, among other things.

Without in any way unduly limiting the scope, interpretation, or application of the claims appearing herein, a technical effect of one or more of the examples disclosed herein is to provide for semantic ACP synchronization as disclosed herein. Semantic ACP synchronization (also disclosed as semantic ACP sync) is a new problem that may occur when semantics functionalities are introduced to M2M/IoT service layer. Therefore, this was generally not an issue in conventional systems (e.g., conventional semantic systems or conventional M2M/IoT service layer). The disclosed semantic ACP sync enables direct access control in the semantic triple store while executing semantic operations, which may be more efficient and superb (e.g., in term of resulted execution time due to access control) than operating semantic operations first in the semantic triple store and then enforcing access control on M2M/IoT service layer. Further, in conventional M2M/IoT service layer, access control is enforced on its service layer resource tree, not on the semantic triple store. So conventionally, when a semantic operation is executed in the semantic triple store, corresponding service layer access control policies cannot be enforced and actually could be violated, which means triples stored in the semantic triple store could be accessed although they should not be accessed according to the service access control policy. Conventional systems may rely on access control on the service layer resource tree.

Figure 39A:
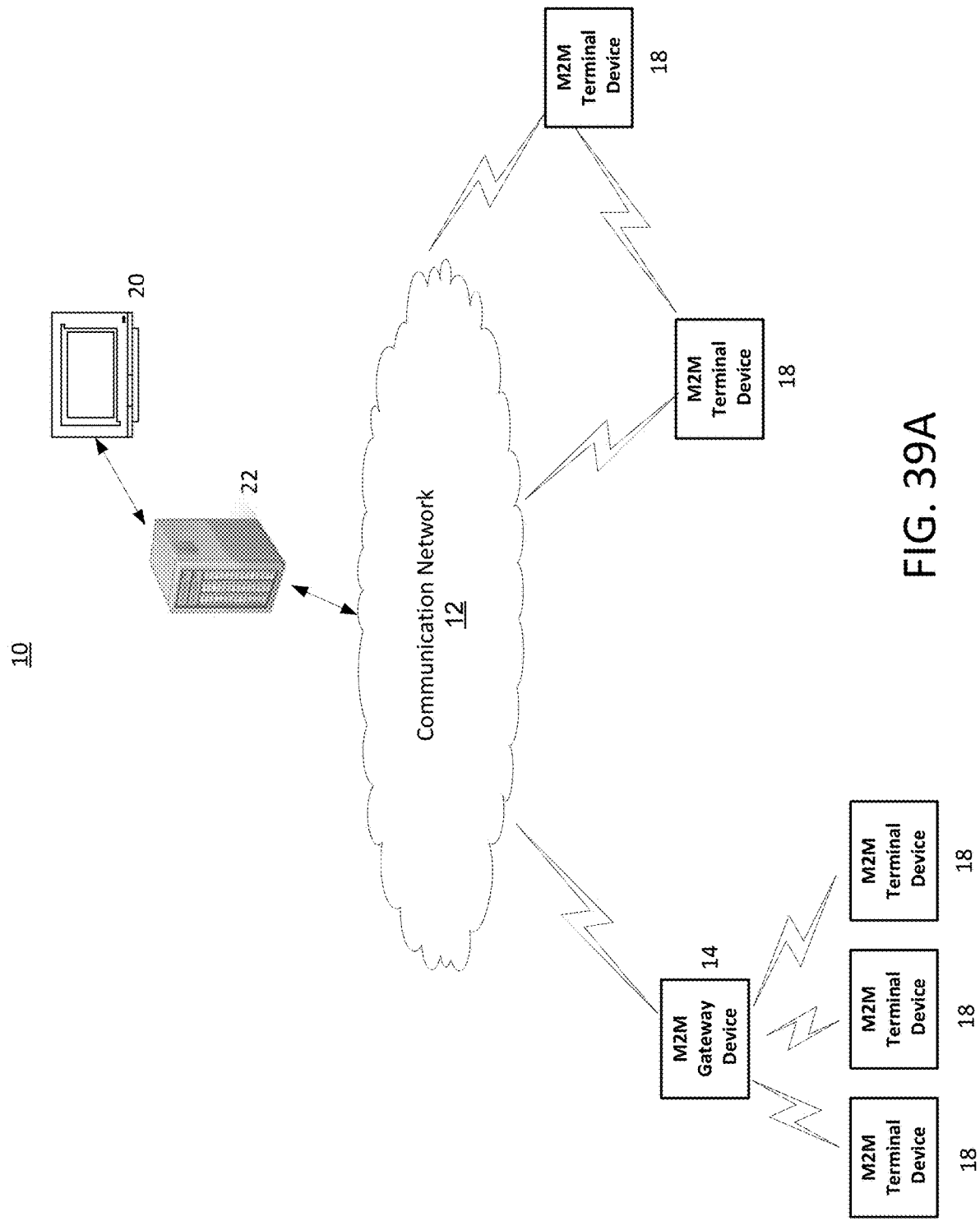
FIG. 39A illustrates an exemplary machine-to-machine (M2M) or Internet of Things (IoT) communication system in which the disclosed subject matter may be implemented.

FIG. 39A is a diagram of an example machine-to machine (M2M), Internet of Things (IoT), or Web of Things (WoT) communication system 10 in which one or more disclosed concepts associated with access control policy synchronization or other semantics matters discussed herein may be implemented (e.g., FIG. 20-FIG. 38 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 39A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 39A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 39B:
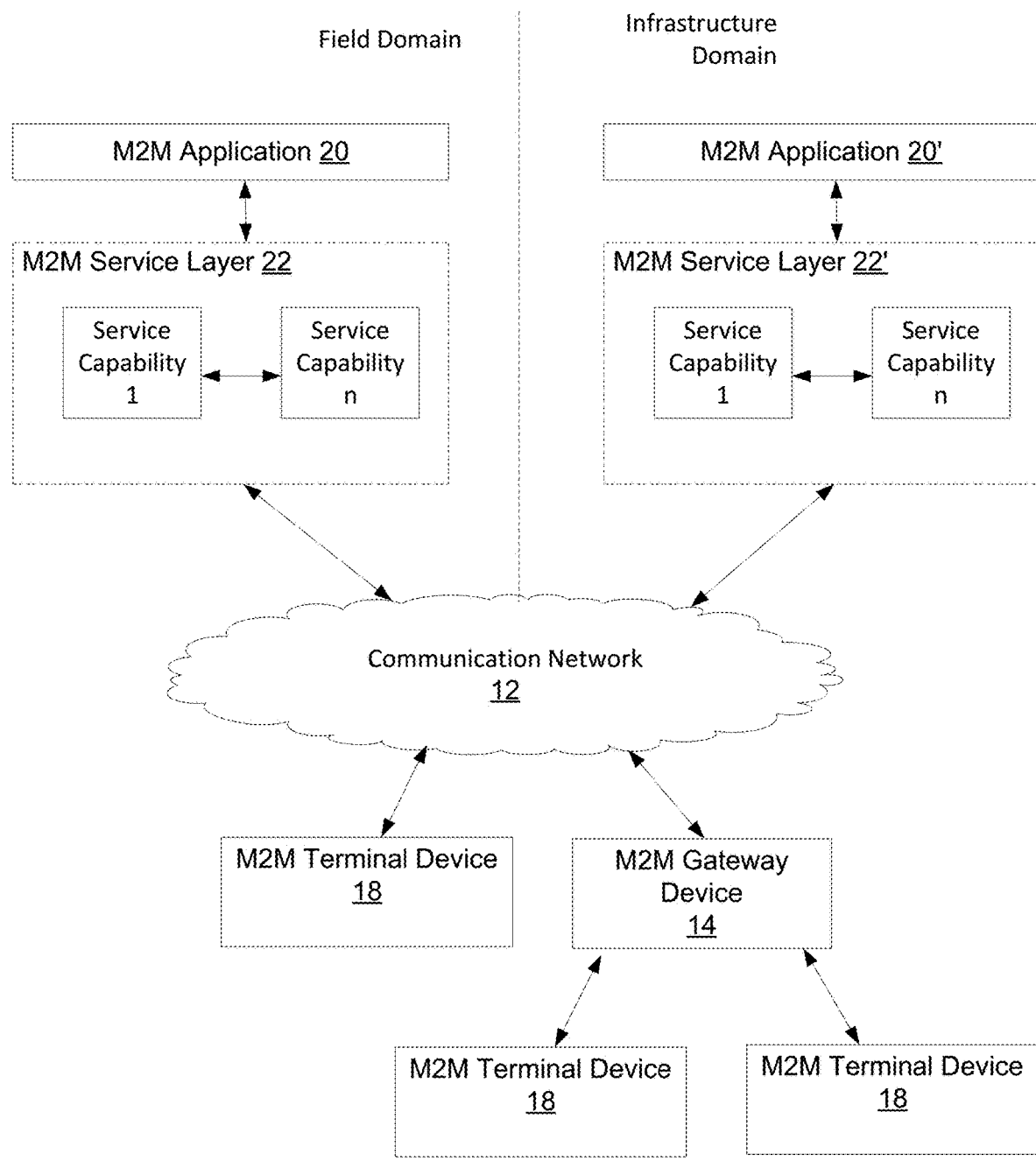
FIG. 39B illustrates an exemplary architecture that may be used within the M2M/IoT communications system illustrated in FIG. 39A.

Referring to FIG. 39B, the illustrated M2M service layer 22 (e.g., hosting common service entity 171 as described herein) in the field domain provides services for the M2M application 20 (e.g., SD initiator 173 or ACP initiator 172), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 39B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using access control policy synchronization or other semantics matters, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The access control policy synchronization or other semantics matters discussed herein of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the access control policy synchronization or other semantics matters discussed herein of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the access control policy synchronization or other semantics matters discussed herein of the present application can be implemented as part of an M2M network that uses a Service Oriented Architecture (SOA) or a resource-oriented architecture (ROA) to access services such as the access control policy synchronization or other semantics matters discussed herein of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 39C:
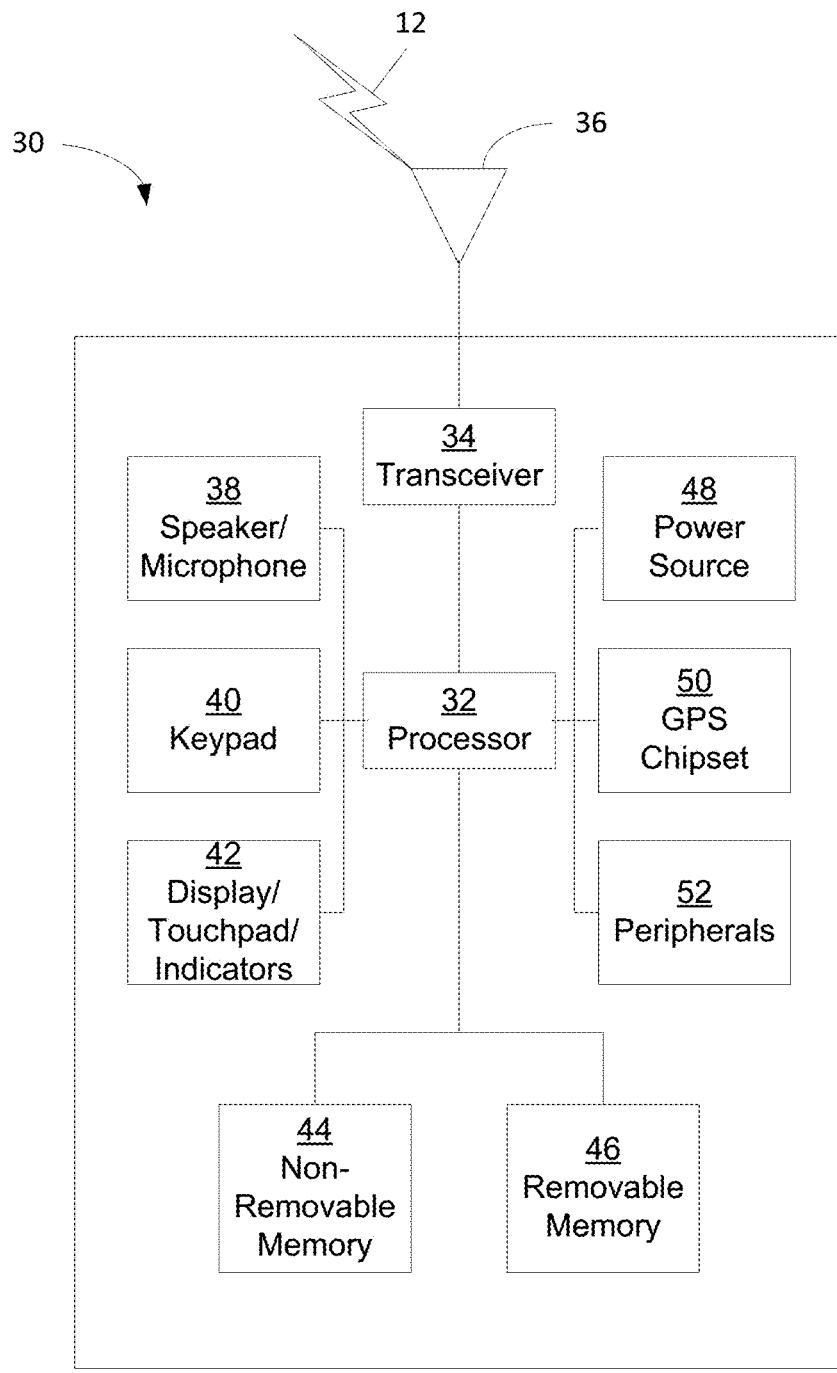
FIG. 39C illustrates an exemplary M2M/IoT terminal or gateway device that may be used within the communications system illustrated in FIG. 39A.

FIG. 39C is a system diagram of an example M2M device 30, such as an M2M terminal device 18 (which may include ACP initiator 172 or doctor 151) or an M2M gateway device 14 (which may include hosting CSE 171), for example. As shown in FIG. 39C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., ACP initiator 172, patient 152, doctor 151, hosting CSE 171, and others) may be an exemplary implementation that performs the disclosed systems and methods for access control policy synchronization in the service layer or other semantics matters discussed herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 39C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 39C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the access control policy synchronization or other semantics matters discussed herein in some of the examples are successful or unsuccessful (e.g., updating a access policy control resource.), or otherwise indicate a status of access control policy synchronization in the service layer or other semantics matters discussed herein and associated components. The control lighting patterns, images, or colors on the display or indicators 42 may be reflective of the status of any of the method flows or components in the FIG.'s illustrated or discussed herein (e.g., FIG. 18-FIG. 38, etc). Disclosed herein are messages and procedures of access control policy synchronization or other semantics matters discussed herein. The messages and procedures can be extended to provide interface/API for users to request information associated with attributes or resources or access control policy synchronization in the service layer or other semantics matters discussed herein via an input source (e.g., speaker/microphone 38, keypad 40, or display/touchpad 42) and request, configure, or query information associated with access control policy synchronization or other semantics matters discussed herein, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 39D:
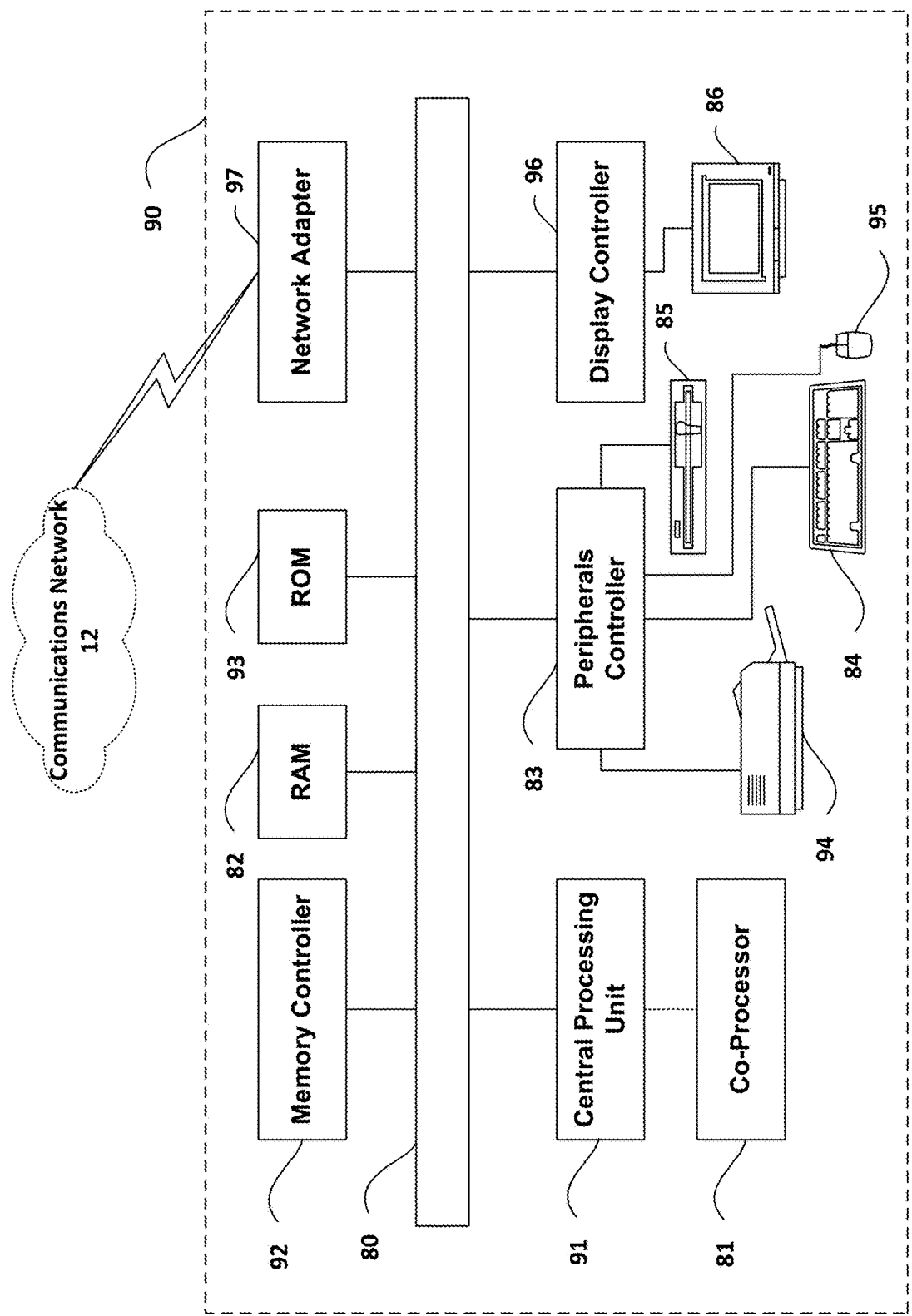
FIG. 39D illustrates an exemplary computing system in which aspects of the communication system of FIG. 39A may be embodied.

FIG. 39D is a block diagram of an exemplary computing system 90 on which, for example, the M2M service platform 22 of FIG. 39A and FIG. 39B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 or coprocessor 81 may receive, generate, and process data related to the disclosed systems and methods for access control policy synchronization in the service layer or other semantics matters discussed herein, such as generating uniform resource indicators.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may include peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include network adaptor 97 that may be used to connect computing system 90 to an external communications network, such as network 12 of FIG. 39A and FIG. 39B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer. A computer-readable storage medium may have a computer program stored thereon, the computer program may be loadable into a data-processing unit and adapted to cause the data-processing unit to execute method steps when the computer program is run by the data-processing unit.

In describing preferred methods, systems, or apparatuses of the subject matter of the present disclosure—access control policy synchronization in the service layer or other semantics matters discussed herein—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. Although a SPARQL request or the like is mentioned throughout the disclosure it is contemplated herein that an associated RESTful operation may be used. Terminology used herein is for purposes of illustration only and certain functions may have different names in future implementations.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for access policy synchronization for a service layer. A method, system, computer readable storage medium, or apparatus has means for receiving a request message to create a resource by an application, wherein the resource is for an access control policy; creating the resource based on a determination that the application has access rights to create the resource; based on the resource and an ontology of the access control policy, generating a triple associated with the resource and the ontology; and providing instructions to send the triples to a semantics graph store for storage. The method, system, computer readable storage medium, or apparatus has means for providing instructions to send a response message to the application, the response message including a uniform resource identifier for the resource, which may be in response to or otherwise based on the request message. The method, system, computer readable storage medium, or apparatus has means for adding an address of the semantics graph store to the resource. The method, system, computer readable storage medium, or apparatus has means for adding an address of the semantics graph store to the resource to a new attribute. The request message includes a representation of the resource to be created. The representation may be a value of a privileges attribute. The resource may include a privileges attribute that includes a plurality of access control rules. The resource may include a syncFlag attribute, a syncTime attribute, or a sdList attribute. All combinations in this paragraph (including the removal or addition of steps) are contemplated in a manner that is consistent with the other portions of the detailed description.

Methods, systems, and apparatuses, among other things, as described herein may provide for means for access policy synchronization for a service layer. A method, system, computer readable storage medium, or apparatus has means for receiving a request message to update an attribute from an application, the attribute comprising a first access control policy identifier for a resource, wherein the resource is for an access control policy; based on a determination that the application has access rights to update the resource, updating the resource to include a second access control policy identifier instead of the first access control policy identifier; and based on the updating of the resource, generating a new binding triple associated with the access control policy and a semantic descriptor. The method, system, computer readable storage medium, or apparatus has means for providing instructions to display the status of the resource of the application on a graphical user interface. The method, system, computer readable storage medium, or apparatus has means for receiving a message from the semantics graph store confirming the replacement of the old binding triple on the semantics graph store. The method, system, computer readable storage medium, or apparatus has means for providing instructions to display the status of the resource of the application on a graphical user interface. The new binding triple may replace an old binding triple associated with the first access control policy identifier. The first access control policy identifier may be indicated by a first uniform resource identifier. The second access control policy identifier may be indicated by a second uniform resource identifier. The attribute may be an attribute of the semantic descriptor. The apparatus may be a hosting common service entity.

What is claimed:

1. A first apparatus for access policy synchronization for a service layer, the apparatus comprising:
a processor; and
a memory coupled with the processor, the memory comprising executable instructions that when executed by the processor cause the processor to effectuate operations comprising:
receiving a first request message to create or update a first resource by an application, wherein the first request message is received by the service layer of the first apparatus, the first resource is for an access control policy resource;

creating or updating the first resource, wherein the created first resource is stored in the service layer and the first resource comprises a plurality of access control rules;

based on the first resource and an access control policy ontology, generating a plurality of access control policy triples associated with the first resource and the access control policy ontology, wherein the generated access control policy triples describe all access control rules included in the first resource;

storing the access control policy triples in a semantic graph store of a second apparatus;

receiving a second request message that requests a semantic operation, wherein the second request message is received by the service layer of the first apparatus;

forwarding the second request message to the semantic graph store of the second apparatus for processing; and receiving a response from the semantic graph store, wherein the response comprises results qualified by the access control policy triples in the semantic graph store.

2. The apparatus of claim 1, further operations comprising adding an address of the semantics graph store to the first resource.

3. The apparatus of claim 1, further operations comprising adding an address of the semantics graph store to the first resource to a new attribute.

4. The apparatus of claim 1, further operations comprising based on the request message, providing instructions to send a response message to the application, the response message comprising a uniform resource identifier for the first resource.

5. The apparatus of claim 1, wherein the request message comprises a representation of the first resource to be created.

6. The apparatus of claim 1, wherein the request message comprises a representation of the first resource to be created, the representation a value of a privileges attribute.

7. The apparatus of claim 1, wherein the first resource comprises a privileges attribute, the privileges attribute comprising a plurality of access control rules.

8. The apparatus of claim 1, wherein the apparatus is a hosting common service entity.

9. A method for access policy synchronization for a service layer, the method comprising:

receiving a first request message to create or update a first resource by an application, wherein the first request message is received by the service layer of a first apparatus, the first resource is for an access control policy resource;

creating or updating the first resource, wherein the created first resource is stored in the service layer and the first resource comprises a plurality of access control rules;

based on the first resource and an access control policy ontology, generating a plurality of access control policy triples associated with the first resource and the access control policy ontology, wherein the generated access control policy triples describe access control rules included in the first resource;

storing the access control policy triples in a semantic graph store of a second apparatus;

receiving a second request message that requests a semantic operation, wherein the second request message is received by the service layer of the first apparatus;

forwarding the second request message to the semantic graph store of the second apparatus for processing; and receiving a response from the semantic graph store, wherein the response comprises results qualified by the access control policy triples in the semantic graph store.

10. The method of claim 9, further comprising responsive to receiving the request message, providing instructions to send a response message to the application, the response message comprising a uniform resource identifier for the first resource.

11. The method of claim 9, wherein the request message comprises a representation of the first resource to be created.

12. The method of claim 9, wherein the request message comprises a representation of the first resource to be created, the representation a value of a privileges attribute.

13. The method of claim 9, wherein the first resource comprises a privileges attribute, the privileges attribute comprising a plurality of access control rules.

14. The method of claim 9, further comprising adding an address of the semantics graph store to the first resource.

15. The method of claim 9, further comprising adding an address of the semantics graph store to the first resource to a new attribute.

16. The method of claim 9, wherein the apparatus is a hosting common service entity.

17. A computer readable storage medium storing computer executable instructions that when executed by a computing device cause said computing device to effectuate operations comprising:

receiving a first request message to create or update a first resource by an application, wherein the first request message is received by the service layer of a first apparatus, the first resource is for an access control policy resource;

creating or updating the first resource, wherein the created first resource is stored in the service layer and the first resource comprises a plurality of access control rules;

based on the first resource and an access control policy ontology, generating a plurality of access control policy triples associated with the first resource and the access control policy ontology, wherein the generated access control policy triples describe access control rules included in the first resource;

storing the access control policy triples in a semantic graph store of a second apparatus;

receiving a second request message that requests a semantic operation, wherein the second request message is received by the service layer of the first apparatus;

forwarding the second request message to the semantic graph store of the second apparatus for processing; and receiving a response from the semantic graph store, wherein the response comprises results qualified by the access control policy triples in the semantic graph store.

18. The computer readable storage medium of claim 17, further operations comprising adding an address of the semantics graph store to the first resource.

19. The computer readable storage medium of claim 17, further operations comprising adding an address of the semantics graph store to the first resource to a new attribute.

20. The computer readable storage medium of claim 17, further operations comprising based on the request message, providing instructions to send a response message to the application, the response message comprising a uniform resource identifier for the first resource.

* * * * *